(12) United States Patent
Krippene

(10) Patent No.: US 9,453,494 B2
(45) Date of Patent: Sep. 27, 2016

(54) BUILDING INTEGRATED WIND ENERGY POWER ENHANCER SYSTEM

(71) Applicant: Brett C Krippene, Rimrock, AZ (US)

(72) Inventor: Brett C Krippene, Rimrock, AZ (US)

(*) Notice: Subject to any disclaimer, the term of this patent is extended or adjusted under 35 U.S.C. 154(b) by 0 days.

(21) Appl. No.: 14/960,286

(22) Filed: Dec. 4, 2015

(65) Prior Publication Data

US 2016/0084227 A1 Mar. 24, 2016

Related U.S. Application Data

(63) Continuation-in-part of application No. 13/607,614, filed on Sep. 7, 2012, now Pat. No. 9,273,665, which is a continuation-in-part of application No. 13/352,259, filed on Jan. 17, 2012, now Pat. No. 8,403,623, which is a continuation-in-part of application No. 12/834,722, filed on Jul. 12, 2010, now abandoned, which is a continuation-in-part of application No. 12/355,411, filed on Jan. 16, 2009, now Pat. No. 7,753,644, which is a continuation-in-part of application No. 11/608,658, filed on Dec. 8, 2006, now Pat. No. 7,488,105.

(60) Provisional application No. 60/766,003, filed on Dec. 29, 2005.

(51) Int. Cl.
| | | |
|---|---|---|
| F03D 1/04 | (2006.01) | |
| F03D 3/00 | (2006.01) | |
| F03D 3/04 | (2006.01) | |

(52) U.S. Cl.
CPC .................. *F03D 1/04* (2013.01); *F03D 3/002* (2013.01); *F03D 3/005* (2013.01); *F03D 3/04* (2013.01); *F03D 3/0409* (2013.01); *F03D 3/0427* (2013.01); *F03D 3/0481* (2013.01); *F03D 9/39* (2016.05); *F05B 2240/13* (2013.01); *F05B 2250/5012* (2013.01); *Y02B 10/30* (2013.01); *Y02E 10/72* (2013.01); *Y02E 10/74* (2013.01)

(58) Field of Classification Search
CPC ...... F03D 3/04; F03D 3/0409; F03D 3/0427; F03D 3/0436; F03D 3/0481; F03D 9/002
See application file for complete search history.

(56) References Cited

U.S. PATENT DOCUMENTS

| | | | | |
|---|---|---|---|---|
| 129,567 A | * | 7/1872 | Jones ........................ | F03D 1/04 236/45 |
| 299,127 A | * | 5/1884 | Garrigus ................... | F03D 1/04 415/145 |
| 4,018,051 A | * | 4/1977 | Gay ......................... | F03D 3/04 290/55 |
| 4,122,675 A | | 10/1978 | Polyak | |

(Continued)

*Primary Examiner* — Woody Lee, Jr.
(74) *Attorney, Agent, or Firm* — Invention To Patent Services; Alex R Hobson

(57) ABSTRACT

An omnidirectional building integrated wind energy power enhancer system is configured to produce electrical power from a wind turbine(s) concealed within and/or on top of a building by means of a flow of pressurized air from the prevailing wind that enters and flows through a portion of a building. A building may provide large exterior surface areas for receiving and directing airflow to the turbine(s). At least a portion of the wind energy power enhancer system is configured within a building, such as between floors, on a single floor, and/or a roof structure. The wind turbine(s) may be configured to receive airflow directly from an inflow chamber that is configured with a building, or from a flow tube coupled with the inflow chamber. Air deflectors may be fixed or dynamic to direct air flow into a flow tube regardless of the direction of the incoming airflow relative to the building.

20 Claims, 71 Drawing Sheets

(56) References Cited

U.S. PATENT DOCUMENTS

| | | |
|---|---|---|
| 4,319,141 A | 3/1982 | Schmugge |
| 4,398,096 A * | 8/1983 | Faurholtz ............... F03D 1/04 290/55 |
| 4,433,544 A | 2/1984 | Wells et al. |
| 4,452,046 A | 6/1984 | Valentin |
| 4,801,811 A | 1/1989 | Assaf et al. |
| 6,043,565 A * | 3/2000 | Les Strange ............ F03D 1/04 290/44 |
| 6,717,285 B2 | 4/2004 | Ferraro |
| 2010/0244453 A1 * | 9/2010 | Dornan .................. F03D 9/00 290/55 |

\* cited by examiner

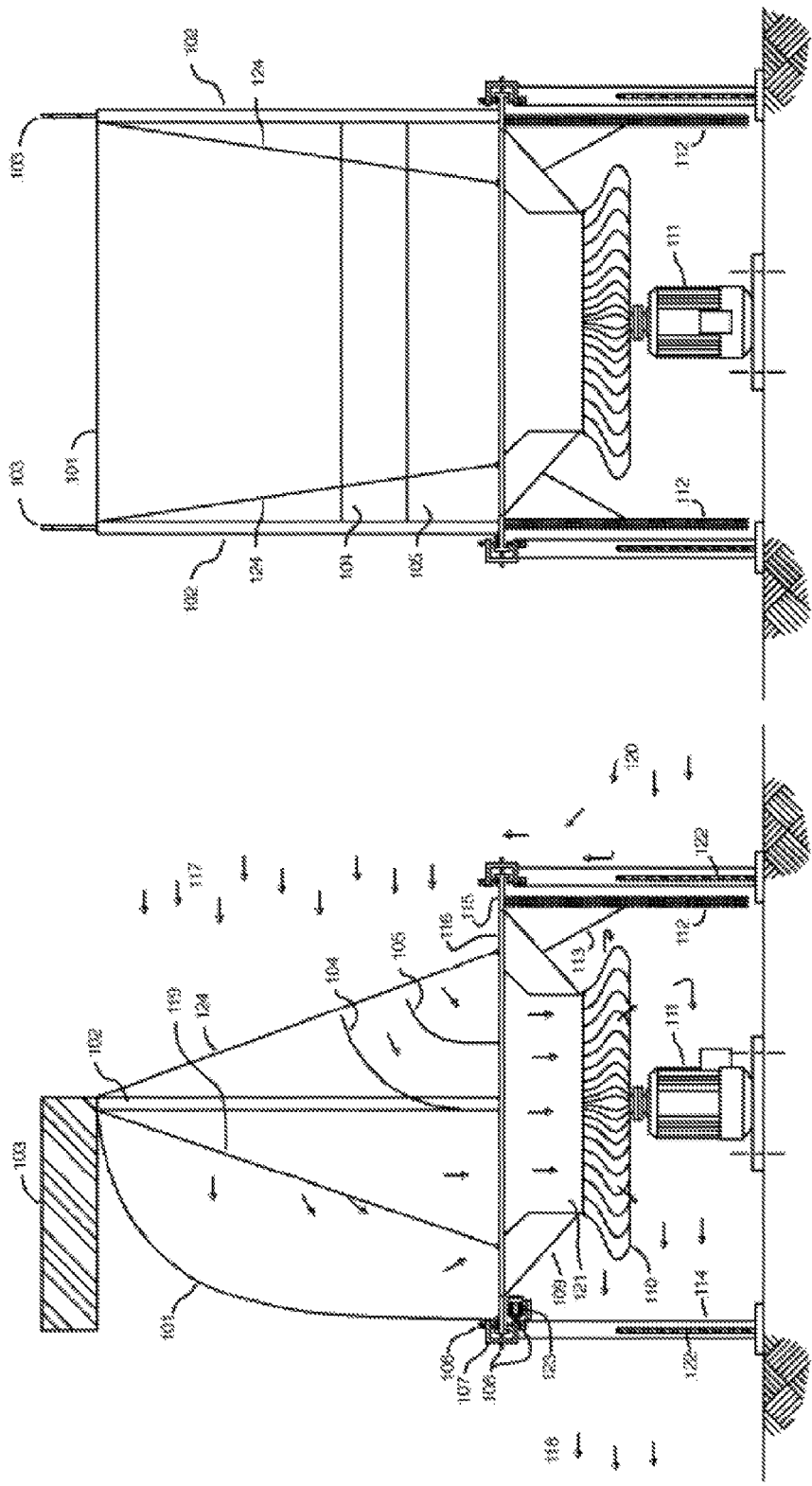

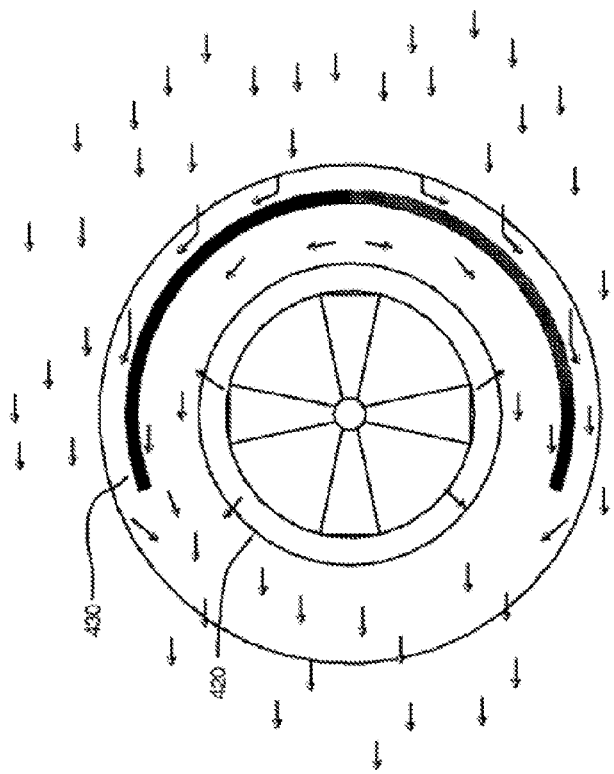
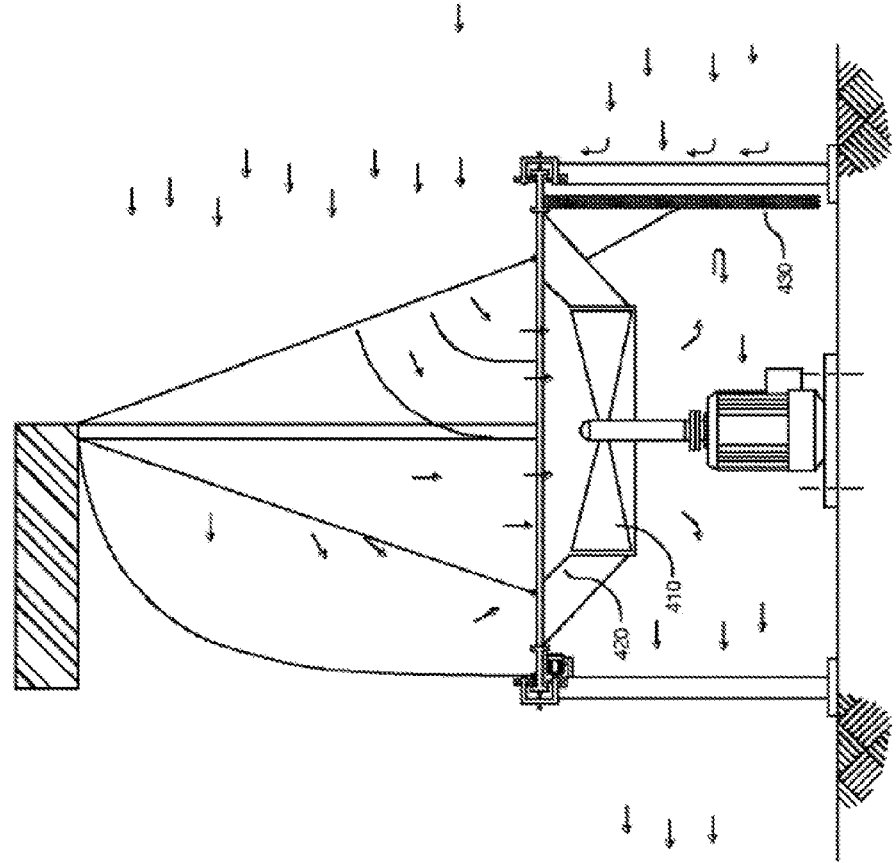
Fig. 4B
Fig. 4A

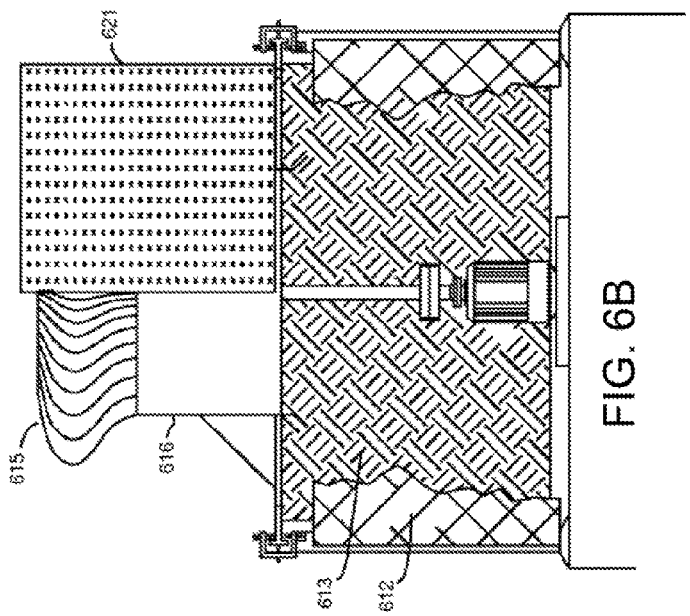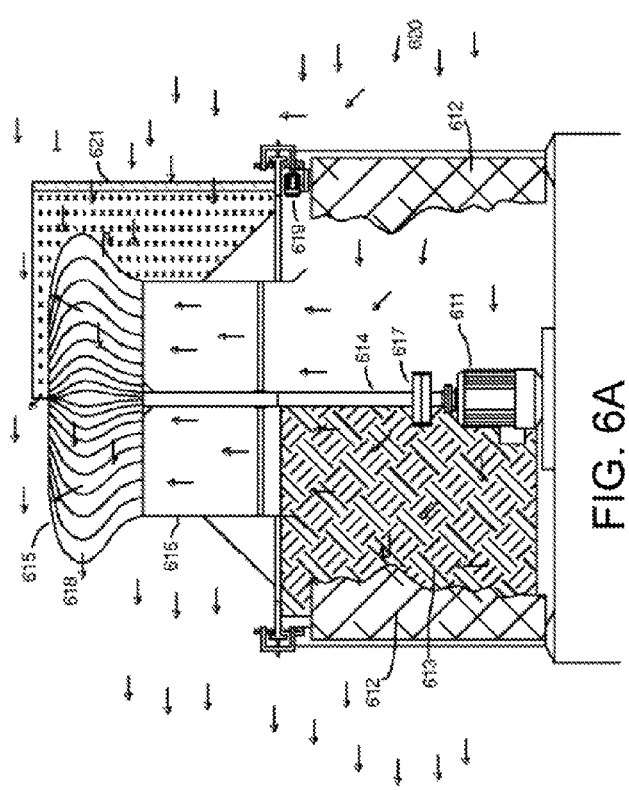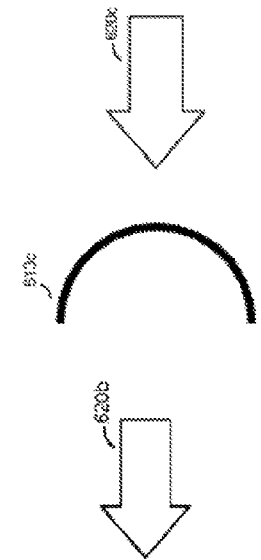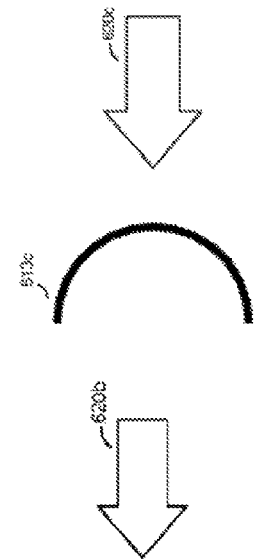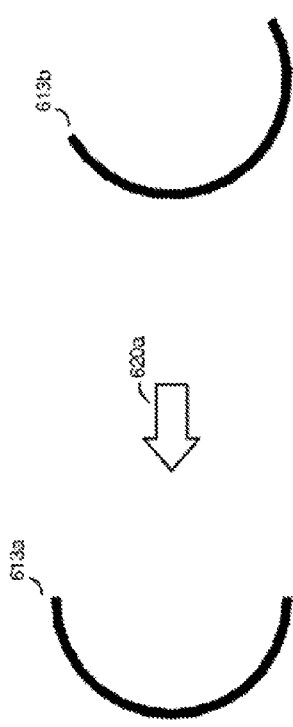

BUILDING INTEGRATED WIND ENERGY POWER ENHANCER SYSTEM

CROSS REFERENCE TO RELATED APPLICATIONS

This application is a continuation in part of U.S. patent application Ser. No. 13/607,614, entitled Dual Wind Energy Power Enhancer System, filed on Sep. 7, 2012 and currently pending, which is a continuation in part of U.S. patent application Ser. No. 13/352,259 filed on Jan. 17, 2012 and issued as U.S. Pat. No. 8,403,623, which is a continuation in part of U.S. application Ser. No. 12/834,722 filed on Jul. 12, 2010 and currently abandoned, which is a continuation in part of U.S. patent application Ser. No. 12/355,411 filed on Jan. 16, 2009 and issued as U.S. Pat. No. 7,753,644, which is a continuation in part of U.S. patent application Ser. No. 11/608,658 filed on Dec. 8, 2006 and issued as U.S. Pat. No. 7,488,105 which claims the benefit of U.S. Provisional Application No. 60/766,003 filed on Dec. 29, 2005; all of which, are incorporated in their entirety by reference herein.

BACKGROUND OF THE INVENTION

1. Field of the Invention

This invention is directed toward a building integrated wind energy power enhancer system that, in an exemplary embodiment, is omnidirectional and is configured to receive airflow from a perimeter of a building and comprises a wind power generating turbine that is concealed, such as within and/or on top of a building.

2. Description of Related Art

There have been a number of patent applications and issued patents which are related to wind power generating systems. The most common commercial methods to date have been turbines with blades that are directly driven by the wind without a collector or wind concentrator. Horizontal axis (i.e. axis of rotation is horizontal) turbines are probably the most common with vertical axis systems also being significant. These systems are simple, reasonably efficient, and commercially successful.

Wind power has surprisingly good economics and is capable of producing electricity at cost structure significantly less than 10 cents per kWh, commonly at 5-6 cents per kWh. Economics of wind power are constantly being studied and compared to existing methods of producing power which may be approximately 4 cents per kWh for large customers. This alternative energy production method has also been encouraged by tax incentives and special grants. There is now an expectation that each year increasing amounts of electricity will be generated by wind power, as well as other alternative energy based technologies.

Unfortunately, existing wind turbine designs have not been as widely adapted as is economically feasible. There are unforeseen problems with public reaction to the unsightly nature of the turbines and their visual dominance on a landscape, especially where there may be multiple installations of air turbines, often moving at different speeds and rotations with respect to each other, which may be viewed at the same time by a casual observer. There have been other issues. Existing wind turbines are often high off the ground, which increases maintenance costs due to poor accessibility. Some turbines have to reduce their operating speeds due to birds colliding with the turbine blades. There are infrastructure problems, where high voltage transmission lines are unavailable in favorable wind areas.

An example of a vertical axis turbine is described in U.S. Pat. No. 4,017,205 where a vertical turbine is integrated into a dome structure and the prevailing wind from any direction is meant to create an updraft. The goal is to create an upward force through a turbine which is useful for any wind direction. However, the practicality of the design is highly questionable. The air is not uniformly and forcibly directed through the generating turbine in a highly efficient and effective manner. The entrainment of the turbine exhaust air back into the wind is poorly thought out, and the lower directing surface would allow the turbine inlet air to flow easily around it horizontally without moving vertically.

Another example of the use of a vertical axis turbine is U.S. Pat. No. 4,309,146 where a vertical turbine is meant to be driven by a vertical airflow from a horizontal wind, which is directed upwardly by use of curved blades. An upper venturi creates a draft for the vertical air stream. The practical aspects of the design are highly limited. There is relatively little surface area where the wind is 'caught' and directed upwardly compared to the surface area of the power generating blades. The upper venturi, as illustrated, is poorly thought out from a flow re-entrainment and throughput standpoint as a large volume of horizontal wind is required to move a relatively small amount of vertical air. Moreover, as described in the previous paragraph, the vertical flow of air is not forced upwardly through the inner chamber. The draft is generated more from the venturi effect, which is known to be a weaker force. The airflow is more likely to move around the blades than be directed vertically.

Similar to the previously described patents, U.S. Pat. No. 4,365,929 discloses a vertical axis turbine that uses a building to 'catch' the wind and direct it vertically upward into the turbine. Various blades are installed on the building surface in a design attempt to force the air to flow upwardly into the turbine. The venturi design does not consider appropriate methods to re-entrain the turbine exhaust air back into the prevailing wind in an efficient manner, and the design is overly complicated. Additionally, as stated for previous patents, the air is not forcibly directed through the generating turbine, and the lower directing surface would allow the air to easily flow around it horizontally without moving vertically. As illustrated, the amount of surface area that is engaged with the prevailing wind compared to the complexity of the overall system is small. Also, the efficiency of the wind 'catch' and wind 'discharge' has not been carefully planned. Further, the building is a fixed size, and it is difficult to optimize the whole design when the wind 'catch' area is a constant size. Varying wind speeds require different surface 'catch' areas for efficient operation. It is less appealing to have the air intake close to the ground as the wind speed is lower.

U.S. Pat. No. 6,962,478 shows a vertical axis windmill that uses a unique outer wall with specially designed moving baffles to create a force on one side of the vertical rotating axis to cause rotation. However, the design of the air stream through the central opening of the framework and the closed baffles is inadequate. The surface area of the outer baffles far surpasses the ability of the framework to vent any air directed inside the framework.

U.S. Pat. No. 4,963,761 discloses a vertical axis fan turbine utilizing the prevailing wind to draw air upwardly through the turbine by a Bernoulli effect. As stated previously, a relatively large volume of air is needed to create the vacuum needed to draw a significant amount of air vertically, and the effect is not as efficient as other methods.

EP0003185 teaches the use of a large flexible canopy over a land area, such as a canyon, to create air movement through an air turbine. This design is not configured to catch a prevailing wind from any direction, and the simple structure is likely to be damaged in a high wind. The overly large design is meant to catch the movement of air from a thermal effect when the air is heated by the sun.

U.S. Pat. No. 4,116,581 discloses a windmill comprising a spherical structure that is divided into two hemispheres with the upper hemisphere rotating to catch the wind. One side of the upper hemisphere is cut away to direct the wind downwardly into the lower hemisphere and through a vertical axis air tube and turbine. An axial structure supports a shaft carrying a multi-bladed turbine of selected diameter centered in the air tube exit opening. The shaft is connected to a generator inside the axial structure. Only the air through the upper hemisphere provides power. No thought is given to providing a large exit space just after the turbine blades where the prevailing wind is allowed to enter and additionally generate power by rotating the turbine blades.

U.S. Pat. No. 993,120 discloses a vertical wind-mill which utilizes a vertical axis shaft, a casing having surface openings, a large cylinder with scoop-like vanes or blades mounted on a shaft, and the cylinder rotates to generate power. U.S. Pat. No. 4,017,204 describes wind motors which are propelled by the impact of the wind against the vanes of an impeller wheel, and wind channeling plates to gather the wind from a large area and funnel it at increased density and pressure to apply against the vanes. Again, in both of these patents no thought is given to providing a large exit space just after the turbine blades where the prevailing wind is allowed to enter and additionally generate power by rotating the turbine blades.

U.S. Pat. No. 6,952,058 discloses a wind energy conversion system, which includes upper and lower wind turbines having counter-rotating blade assemblies supported for rotation about a vertical rotation axis. A hood for supplying intake air to a wind turbine and an exhaust plenum for exhausting air from the wind turbine, with the hood and the exhaust plenum being directionally positioned is provided. U.S. Pat. No. 4,398,096 describes a wind-powered electric generator using a large opening/collector which routes the wind through an inner ducting and exhaust ducting in an "s" or "z" shaped flow. U.S. Pat. No. 4,516,907 discloses a wind collector with a side by side pair of power generators. None of these patents provide a large exit space just after the turbine blades where the prevailing wind is allowed to enter and additionally generate power by rotating the turbine blades.

BRIEF SUMMARY OF THE INVENTION

The intention of this invention is to overcome the difficulties, problems, obstacles, visual distaste, and poor economics of previous designs. In an exemplary embodiment, a building integrated wind energy power enhancer system is integrated into a building and a wind power generating turbine utilizes air received within an inflow chamber, configured within a building, to produce useful power. The wind power generating turbine may be concealed, wherein it is configured within, or on top of a building and may be configured within an enclosure, such as screened enclosure. An exemplary building integrated wind energy power enhancer system is omnidirectional and is configured to receive airflow from around the perimeter of the building, depending on the direction of the prevailing wind. A building integrated wind energy power enhancer system comprises an inflow chamber that is integrated into the building, such as between floors of the building or within a roof structure. At least a portion of the air received from the prevailing wind into the inflow chamber is directed to the wind power generating turbine as a first phase airflow. A wind power generating turbine may be vertically offset from an inflow chamber, whereby the inflow chamber is between a first and second floor of the building and the wind power generating turbine is configured between a third and a fourth floor of the building, or within a roof structure, or configured above the roof of the building. In another exemplary embodiment, an inflow chamber is configured in a roof structure and a wind power generating turbine is configured above the roof structure and coupled to the inflow chamber by a flow tube that directs a first phase airflow into the turbine. A second phase air may impact the air blades directly as the wind power generating turbine in configured above the roof structure and in the prevailing wind. An enclosure may be configured around the wind power generating turbine to conceal the turbine while allowing a second phase of air to enter the enclosure and impact the air blades directly. In still another embodiment, a first inflow chamber receives an airflow that is directed into wind power generating turbine as a first phase air flow through a flow tube, and the wind power generating turbine is configured within a second inflow chamber that receives an airflow that impacts the air blades directly in a second phase airflow. Sector deflectors may be used to direct and channel airflow into a flow tube, as first phase airflow, or toward a wind power generating turbine as a second phase airflow. In an exemplary embodiment, a dual building integrated wind energy power enhancer system comprises utilizes a first and a second inflow chamber that are offset vertically and on opposing sides of wind power generating turbine to provide first phase airflow to the turbine. The turbine in this embodiment is configured in a third inflow chamber that receives airflow from the third inflow chamber as a second phase airflow that impacts the air blades directly. Any number of configurations are envisioned for a building integrated wind energy power enhancer system.

In one embodiment, the present invention uses an adjustable air scoop inlet section, an air turbine section, and an adjustable outlet section—each having variable geometry and of a unique design—to utilize a first phase of the prevailing wind to provide power. The air turbine and outlet sections can also utilize a second phase of the prevailing wind as a second stage of power production. This second phase wind, flowing directly through and/or around the air turbine and outlet sections, can also utilize an additional full or partial exit drag curtain and/or exit barrier to enhance second stage power production from the overall air turbine system. The air turbine rotor and outlet section can additionally be configured such that the turbine exhaust air enters the outlet section in a manner that re-entrains the exhaust air into the downstream prevailing wind at reduced velocities and at negative pressure conditions. These negative pressure conditions can be further enhanced by use of an adjustable exit drag curtain and/or exit barrier.

In one embodiment, the present invention is comprised of an adjustable air scoop inlet section, an air turbine section of unique design, and an adjustable outlet section, which may include an adjustable drag curtain or exit barrier for energy efficiency and system capacity considerations, to use the prevailing wind to produce power from the air turbine. The air turbine may also utilize a second phase or multi-phases of prevailing wind flowing through and/or around the outlet section to provide additional drive directly or indirectly to the turbine blades in a second stage of power production.

The air turbine's exhaust flows into the outlet or exit section or sections, which re-entrains the exhaust air into the downstream prevailing wind.

For the purposes of this patent application, the terms "outlet section", "outlet chamber", "outflow chamber" and "exit space" are considered synonymous. The "impingement chamber" serves as a special feature of the outlet section when used with multi-phased wind applications. The terms "inlet section", "inlet chamber" and "inflow chamber" are also considered synonymous. Drag curtains, located downstream of the air turbine in the direction of exhaust air flow, are configured to create an enhanced vacuum effect within the outlet section. Exit barriers, located in the upstream air flow to the air turbine rotor assembly, are configured to more efficiently inject at least a part of the second phase air flow into the air turbine rotor for enhanced power production.

As used herein, the term "phase" refers to the first and second phases of total air flow provided from the prevailing wind as introduced to the system in its entirety. First phase airflow is created from the "first phase wind", with second phase airflow created from the "second phase wind". The combined "first phase wind" and "second phase wind" can also be referred to as "multi-phased wind".

The term "stage" refers to the first and second stages of airflow as injected into the air turbine specifically for power production.

The term "area ratio" refers to the cross sectional flow area of the air scoop inlet to the cross sectional flow area of the downstream flow tube inlet, although other changes in the cross sectional flow area within or outside of the overall enclosure system may also apply.

The term "aspect ratio" refers to the length to width ratio of any and all the ducts located at the inlet, the outlet, and/or anywhere else either within or outside of wind power generating system enclosure.

Concealed, as used herein with reference to the wind energy power enhancer system, means that the power generating turbine is concealed from view, wherein it is within the building or in an enclosure or a roof structure, where it is not visible from outside of the building. In an exemplary embodiment, a concealed power generating turbine is configured within and/or on top of a building. A wind power enhance system conceals power generating turbines including propeller, helical, and reverse flow fan types, within and/or on top of building type structures, existing or new. A wind power enhance system conceals power generating turbines in one embodiment by having the wind power generating turbine within an enclosure, such as a screened in enclosure. For the purposes of this definition, the outer periphery of an exposed to atmosphere reverse flow fan type wind turbine rotor is considered to be a concealed power generating turbine, as it gives the appearance of an opaque body and does not kill birds and is relatively quiet.

Multidirectional, as used herein with reference to the wind energy power enhancer system, means that air from the prevailing wind may be d into an inflow chamber from a plurality of directions about a building and in an exemplary embodiment the building has at least two opening configured on different sides of the building to receive airflow from the prevailing wind.

Omnidirectional, as used herein with reference to the wind energy power enhancer system, means that air from the prevailing wind may be received into an inflow chamber from any direction around the building. In an exemplary embodiment, an omnidirectional building integrated wind energy power enhancer system consists of an inlet section of fixed or rotatable design which faces into the wind, a flow tube and integrated wind turbine section of rotatable or fixed design and of any inclination which may or may not face the wind, and an outlet section of fixed or rotatable design which may or may not face directly away from the wind.

As a special consideration for the building integrated wind energy power enhancer system applications, the term Kinetic Energy Envelope (KEE) is used for the purposes of math modeling studies and design to describe an abstract boundary layer or envelope around a building that has wind energy entering, flowing through and leaving the building and the building's related systems and equipment. A KEE extends outside of a physical perimeter of a building whose kinetic and heat related energy potential, both globally and incrementally at every point on the envelope, is defined by the aerodynamic and thermodynamic effects of the wind flow, relative to the building, produced both internally (i.e. available wind energy) and externally (i.e. theoretical wind energy) by the physical geometry of the building and the building's integrated wind energy power enhancer system being considered therein. A building geometry or shape may be engineered to compliment a building integrated wind energy power enhancer system, wherein more of the wind energy approaching, surrounding, or flowing past the boundary of the KEE from any direction, is more effectively and efficiently utilized within the boundary to produce power. The goal of the building integrated wind energy power enhancer system is to maximize the amount of potential energy that is produced and utilized by the wind flowing around, entering and leaving the KEE. As shown in FIG. 79 a KEE 940 is configured around a building 580 and a plurality of openings in the outer surface of the building lead to inflow conduits 992 and to a centrally located flow tube 530. A dynamic air deflector 888, such as a rotating air scoop, directs the air from the prevailing wind into the flow tube. There is a pressure drop produced by the wind approaching and flowing around a building, resulting from the upstream side total pressure relative to the opposing side stream and downstream total pressures. An exemplary building integrated wind energy power enhancer system utilizes this total pressure drop, along with the associated air flows through the building, to produce power. An exemplary building integrated wind energy power enhancer system is comprised of an air flow inlet or inlets that direct airflow from the approaching wind through the building and turbine and out an airflow outlet or outlets to produce power. It should be noted that any changes to the wind flow conditions and direction relative to any specific design or operation of the building or the building integrated wind energy power enhancer system will have a cause and effect type relationship on the overall kinetic energy envelope's overall and incremental potential surrounding the KEE with regard to that building.

In an exemplary embodiment of the present invention, at least a portion of the building integrated wind energy power enhancer system is comprised of at least one component of the system being within or an integral part of the building, such as an inflow chamber, outflow chamber, flow tube, or the power generating turbine. In one example, a building integrated inflow chamber is a physical structure within the building and forms at least a part of the roof. In another example, a building integrated inflow chamber is located between floors of a building. A power generating turbine may be configured to be completely above the building or at least partially within the building, such as within the roof structure or between a first and a second floor of the building.

In an exemplary embodiment, the function of the building integrated wind power inflow chamber is to utilize the upstream surfaces of the building to the maximum extent possible, in order to increase the static pressure to the entrance of the inflow chamber for increased pressure differential creation across the wind turbine rotor assembly and the resulting increased power output. For this purpose, a passively or actively actuated inlet air scoop may be mounted in most cases within the building or within the ducting itself and may be designed to have an oversized inlet cross sectional flow area to reduce the pressure losses associated with the incoming wind. A passively or actively actuated inlet air scoop, configured within the an inlet flow tube or ducting within the building, may direct the incoming air flow from a horizontal to a vertical direction and into a flow tube that leads to a vertical axis type wind turbine.

With building integrated wind energy power enhancer systems the total pressure to the inflow chamber may be higher than the total pressure available from the approaching wind as there may be an increased static pressure resulting from the large upstream impact surface area and configuration of the building relative to the inlet chamber cross sectional flow area. An entire side of a building may funnel airflow into an inflow chamber and the ratio between the upstream building surface area and the inflow chamber cross sectional flow area can be very large. This large ratio increases the pressure in the flow tube and enables higher power generation.

In an exemplary embodiment, a building integrated inflow chamber is configured as a part of the building, wherein the inflow chamber is configured at least partially within the interior of the building structure. The entrance to a building integrated inflow chamber may be located within an open interior or on an exterior surface of a building, such as along the side of or perpendicular to the building or in an alcove. It may be located within or on a roof or roof structure of a building. In an exemplary embodiment, the inflow chamber will be configured between a first and second floor of the building, wherein the inflow chamber extends in from the exterior of the building in a direction substantially parallel with the floors and sides of the building. In an exemplary embodiment, a building integrated inflow chamber between a first and second floor has a plurality of openings around the perimeter of the building, such as on each side of the building. For example, a building may have four sides and a building integrated inflow chamber may have one or more openings on each of the four sides of the building. The inflow chamber may extend from each of these openings to a central and common inflow chamber or plenum area. The power generating turbine may be configured between or at least partially between the same first and second floors as a building integrated inflow chamber and receive first and/or second phase airflow to drive the air blades and create power. In another embodiment, the power generating turbine is vertically offset from the first building integrated inflow chamber between the floors of the building, such as above or below the inflow chamber. In an exemplary embodiment, the power generating turbine is configured above the building integrated inflow chamber, such as between floors that are above the inflow chamber, within the roof structure or above the roof structure. An inflow chamber between floors may be comprised of a vertical flow tube extension, which extends from the inflow chamber between floors to the wind power generating turbine. A separation panel may be configured between the power generating turbine and an inflow chamber to separate a first phase of airflow from a second phase of airflow and in some cases may be part of the wind turbine rotor assembly's front and back side enclosure walls. In this configuration, the flow tube may be of an indeterminate length, such as anywhere between the thickness of the wind turbine side wall enclosure plates as a minimum to several floor levels in length under certain design situations. In another example, the separation panel may be a floor separation, wherein the power generating turbine is separated from a first inflow chamber by a building floor, ceiling or roof enclosure wall and the like. The wind turbine rotor assembly may or may not be configured with front and/or back enclosure plates as may be required by a specific design. Where either a front and/or a back enclosure plate is/are utilized, they may also serve as separation plates or panels under certain conditions of design in order not to duplicate a given purpose of the design.

In another embodiment, a building integrated inflow or outflow chamber is configured in a roof structure. The roof structure may consist of either load bearing or non-load bearing floor and roof sections. In some cases, both the floor and the roof sections may be load bearing for specific purposes, such as for snow loads and for light foot traffic in more Northern climates. Where these sections will only be required to withstand the internal pressures created by the wind channeled within them, these sections may be designed only for pressure containment for gusty high wind purposes if found to be cost effective yet still meeting all required building codes and standards. Wherein there are no floors above the inflow and/or outflow chamber, wherein a substantial portion of the top of the inflow and/or outflow chamber is defined by a roof and configured at the top of the building, wherein this is the uppermost enclosed space of the building, a building integrated inflow and/or outflow chamber may be comprised of an enlarged air capture and/or air exhaust portion that extends both upward and outward from a portion of the building perimeter and may be made up of said plurality of openings for receiving and/or exhausting said airflow more effectively or efficiently both into and above the said inflow or outflow chambers. Put another way, the roof may extend at least partially out from the outer perimeter of the building on at least the upper surface and openings into the roof structure inflow chamber and/or outflow chamber may be configured between the roof and the upper most load bearing floor of the building. In those cases where the inflow and outflow chambers are common in usage to the omnidirectional design of the overall wind energy power enhancer system configuration, these functions become interchangeable with benefits to the overall wind energy power enhancer system design and performance achieved at both the inlets and outlets of the overall system. A power generating turbine may be configured above, below, within, or at least partially within a roof structure inflow chamber. In an exemplary embodiment, a power generating turbine is configured within the roof structure inflow chamber and receives first phase air flow from the roof structure inflow chamber. In some embodiments first phase air flow is also received from a second inflow chamber, such as a building integrated inflow chamber configured below the roof structure inflow chamber and between a first and second floor of the building. A power generating turbine may be configured above a roof structure inflow chamber. A vertical flow tube extension may direct air flow from the roof structure inflow chamber into the turbine. In another embodiment, a power generating turbine may be configured below a roof structure inflow chamber and between a first and second floor of the building. In this embodiment, air may pass through the power generating turbine and exit the building between the first and second floors. A second building integrated inflow chamber may provide additional airflow to the power generating turbine.

In an exemplary embodiment, a building integrated wind power system is comprised of two building integrated inflow chambers, such as a first building integrated inflow chamber between first and second floors of the building and a second building integrated inflow chamber between the third and a fourth floors of the building. In another embodiment, a first building integrated inflow chamber is configured between a first and second floor of the building, and a second building integrated inflow chamber is configured in a roof structure. A power generating turbine may be configured between a first and second building integrated inflow chamber. The turbine would then receive airflow from a flow tube from each inflow chamber, making it a dual inlet power generating turbine. In an exemplary embodiment, the airflow enters a dual inlet power generating turbine substantially from two opposing directions—from the top and the bottom of a common inflow and outflow chamber, or, from an inflow chamber above and an inflow chamber below the power generating turbine. A power generating turbine may be configured within a building and be coupled to an outflow chamber that is comprised of an opening in the exterior of the building for airflow to exit the building after passing through the power generating turbine. In an exemplary embodiment, the outflow chamber and opening are between floors of a building or in a roof structure. With some single or dual air flow wind turbine systems, both the inflow and outflow chambers as well as the integrated wind turbine rotor assembly may be located on the same floor with the first phase wind or first stage of air flow entering into the center of the wind turbine rotor from the top and bottom of a common inflow/outflow chamber and with the second phase wind air flow entering the outer periphery of the wind turbine rotor assembly through the central impingement area of the common inflow/outflow chamber and exiting through the same central impingement/exhaust area of the wind turbine outer periphery through the same downstream inflow/outflow chamber to the atmosphere.

A building integrated inflow chamber may be comprised of air deflectors that extend out from an exterior of the building to direct air to flow more effectively and efficiently into the inflow chamber. These air deflectors may be fixed or dynamic and may be controlled by a controller based on the airflow direction incident on and to the building. Air deflectors may also be used to direct an airflow from the prevailing wind around a power generating turbine, which is configured out from the exterior of the building. In addition, a building integrated inflow chamber may be configured with inflow dampers that allow air to flow into the inflow chamber but prevent air from exiting back out of the inflow chamber through these same inflow dampers. This may be important when an inflow chamber is comprised of a plurality of openings on various sides of the building. In order to prevent air from passing through an inflow chamber from one inlet opening to exit from another inlet opening, the airflow dampers may be configured to only open when the pressure external to an airflow damper, or outside of the building, is greater than the pressure within the inflow chamber. A dynamic inflow chamber deflector, such as a passively or actively actuated air impact type inlet air scoop, may be configured within an inflow chamber to direct airflow within the chamber into a flow tube, such as a vertical flow tube extension of a flow tube. For example, an inflow chamber may be configured between first and second floors of a building and may be comprised of inflow chamber conduits from a central area to each side of the building. A dynamic inflow chamber deflector may be configured to rotate to direct flow from one or more of these inflow chamber conduits into a vertical flow tube extension.

A building integrated wind power system may be comprised of a second wind power generating device, such as a second wind power generating turbine. The first and second devices may be coupled together either electrically or mechanically by the use of a common drive shaft, whereby both devices drive the same shaft to create power. In one embodiment, first and second power generating devices are vertically offset from each other. For example, a first power generating device may be configured between a first and second floor of a building and a second power generating device may be configured in a roof structure or between a third and fourth floor. In another embodiment, a first power generating device is configured above the roof or otherwise outside of the exterior of the building and a second power generating device is configured within the building, such as in the roof structure or between a first and second floor.

Either as a supplement or in addition to the above means to force the incoming wind and air streams into the flow tube and wind turbine assembly or assemblies, a series or compliment of automatically controlled guillotine type dampers may be employed for more stable wind flows coming from more or less fixed directions relative to the building and wind turbine system. Alternatively, for more gusty and variable wind flows and/or variable direction of wind flows to and around the building, a compliment of either passively or actively actuated flexible inlet, and in some cases even outlet flexible curtains or sheets may be employed around the building at the various inlets and outlets to the inlet and outlet flow chambers, as appropriate, to enhance and/or sustain the pressure differentials developed by the upstream and downstream wind flows. The flexible curtains or sheets may be configured to maintain a more stable differential pressure with resultant increased wind inflow and/or outflow across the wind turbine rotor assembly and thereby enhance the effective performance with an improved capacity factor for the overall wind turbine system under more gusty wind conditions of operation. These flexible air curtains or sheets shall be designed in both size and aerodynamic weight or buoyancy so as to operate with essentially no pressure loss of the wind through the flexible curtains or sheets and yet shall also be engineered in size and location within the inflow and outflow chambers to cause a minimum of random or harmonic noise generation while operating in their most effective and efficient manner possible and as required.

Where there are discrepancies between the disclosure of the present application and a disclosure of a prior application listed in the cross reference to related applications herein, the disclosure herein shall dominate and supersedes all prior applications.

BRIEF DESCRIPTION OF THE SEVERAL VIEWS OF THE DRAWINGS

FIGS. 1A-1B show an embodiment of the general arrangement of the invention.

FIGS. 4A-4B show an embodiment where the axial flow type turbine blades are located before, after or within an air flow tube.

FIGS. 6A-6B show another embodiment of the general arrangement of the invention.

FIGS. 6C-6E show how the inlet air scoop may be utilized to vary the air turbine power output by various rotations relative to the prevailing wind.

DETAILED DESCRIPTION OF THE INVENTION

Figure 2B:
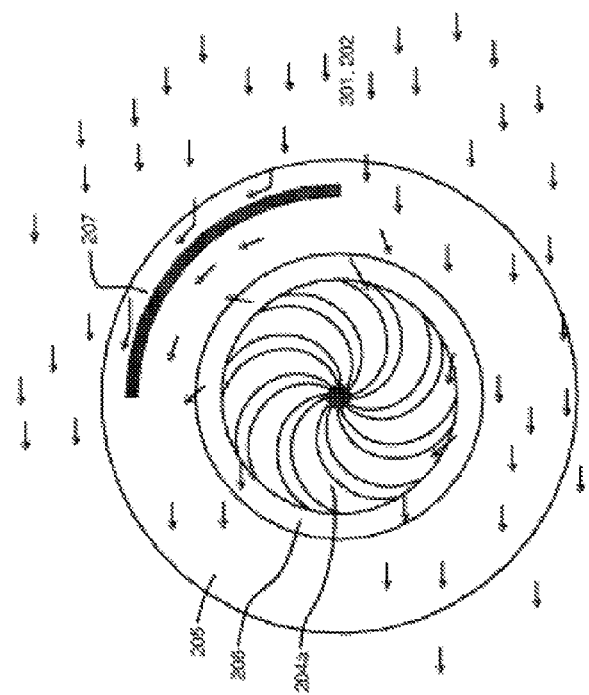
FIGS. 2A-2I show additional preferred embodiments of the system which include lower section enhancements to utilize in various ways the second phase portion of the prevailing wind.

The present invention is a system designed to produce electricity at cost effective rates in an environmentally friendly manner at power outputs of approximately 0.10 to 1 MWe. It is especially useful in areas where the wind velocity and turbulence increases in places that occur around small hills and tall buildings. It may be employed successfully in the heavily populated downtown sections of major cities. Multiple units can be utilized and may be sized for any given location as the opportunity may arise. Generally speaking, areas with average wind speeds of at least 12 mph are considered to be the most favorable locations for wind power.

FIGS. 1A-1B show two cross-sectional views of a preferred embodiment, general arrangement of the invention. A large air scoop 101 made from a flexible material, such as used in the sailing industry, is hoisted above a vertical axis power generating turbine 110, 111 in order to utilize the upper prevailing wind 117 and direct the maximum air flow possible at maximum available velocity head pressure downward and through the integrated flow tube and power generating turbine assembly. The air scoop 101 is held in place by two masts 102 which are stabilized with suitable guy wires 119, 124 and are mounted on a circular rotating T-rail 115 and support cage assembly 116. A directing air flow tube 121 directs the incoming air flow and air pressure uniformly and downwardly into the turbine rotor assembly 110. The air from the flow tube 121 is routed most appropriately in a more or less radial direction from the inside to the outside edge of the reverse fan type turbine rotor assembly 110 which is connected to the power generator 11. The flow tube 121 is connected to the circular rotating T-rail 115 and support cage assembly 116 and both are held and stabilized in position relative to each other by three or more sector type support plates and struts 109. Additionally, and optionally, directing frontal air scoops 104, 105 are added to provide a more even air flow and pressure distribution into the flow tube 121. The air scoop 101 is positioned to optimally face the prevailing wind by the moment arm created between the center of the rotating air scoop assembly and the prevailing wind's force upon two stabilizing vanes 103 which are fixed to the two masts. The stabilizing vanes 103 will most naturally be positioned by this self-correcting moment arm parallel to the direction of the prevailing wind. The stabilizing vanes also move the circular rotating T-rail 115 and support cage assembly 116 so that the air scoop 101 continuously faces directly into any useful amount of wind in an optimal manner. A small stand-off type support strut 124, projecting directly upwind from each of the two masts in parallel, extends the leading edge of the air scoop at the elevation of the T-rail and support cage assembly to the up-wind edge of the air tube assembly to increase the wind capturing effectiveness and efficiency of the air scoop. In one embodiment, the stabilizing vanes are air foils as described later.

A suitable design, as conceived in this invention, for the rotating T-rail 115 and support cage assembly 116 is a circular, 360 horizontal T or I beam ring type structure 115 which rotates within a vertical channel beam ring type structure 107 by means of the three or more rubber wheel type support assemblies 108. The rotating T-rail 115 and support cage assembly 116 also supports the air scoop, the flow tube and the exit drag curtain sections 112 of the vertical wind turbine assembly 110. The rotating T-rail also maintains their relative positions and alignments with respect to the incoming prevailing wind 117 and the vertical wind turbine assembly 110, 111 respectively. The floor of the support cage assembly 116 surrounding the flow tube inlet comprises a heavy duty hurricane fence, wire mesh type material that is designed for light foot traffic only. The wire mesh floor is in turn covered with a flexible material similar to that used on the air scoop 101 and exit drag curtain 112 assemblies to help direct the collected wind's air flow downwardly into the flow tube assembly. As an option, the inlet portion of the flow tube 121 may also be covered over with the same heavy duty hurricane fence type material used for the floor of the support cage type structure for safety considerations, if appropriate, but is not covered over with the flexible material. The inlet to the flow tube can be provided with a converging type conical or bell mouthed configuration to reduce the pressure losses through the flow tube.

The circular rotating T-rail 115 and support cage assembly 116 is held in place, yet is free to rotate horizontally by three or more stationary supporting structures, each of which is located more or less equally spaced around the outer periphery of the T-rail and support cage assembly and is detailed as follows. Multiple support posts 114 are firmly anchored to the ground and attached to the 360°, circular and stationary, half box channel support beam 107 with the three hardened rubber wheels 108 mounted at three or more equal spaced intervals around the stationary channel beam support structure. The T-rail 115 is contained by the three wheels 108 to only allow rotation of the circular rotating T-rail and support cage assembly in a horizontal plane 116. If necessary, an optional jogging motor 123 may be employed on one wheel to optimally orient the air scoop based on wind direction sensors, which are incorporated as part of the one or more stabilizing vane 103 assemblies. Alternatively, the T-rail system may be located at the bottom of the support cage assembly to provide a simpler, more cost effective design.

To prevent the lower prevailing wind 120 from adding back pressure to the turbine blades 110 and lowering overall efficiency, an exit drag curtain 112 or blocking plate (exit barrier) is attached to the circular mounting T-rail and support cage assembly. The exit drag curtain or exit barrier may be of a flexible sail cloth type material similar to that used for the inlet air scoop and suitably stiffened or backed up by a lattice work or ribbing, such as heavy duty hurricane fencing. The exit drag curtain 112 protects the area under the circular mounting T-rail and support cage assembly from the lower prevailing wind 120 for approximately 180° in circumference on the up-wind side. Stiffening gussets or struts 113 are used to provide additional stiffness to the exit drag curtain assembly 112 both to hold the desired shape of the exit drag curtain against the force of the prevailing wind and to prevent wind damage. The primary purpose of the exit drag curtain 112 is to prevent back pressure on the turbine blades and allow the turbine exhaust air to re-entrain with the downstream prevailing wind 118 in an efficient and slightly negative pressure manner.

In FIG. 1A, the air caught by the flexible air scoop 101 plus the inherent vacuum generating characteristics of the 180° circumference exit drag curtain 112 design create the total motive force for the preferred embodiment. Variations to this preferred design are discussed in other figures. These variations provide for additional enhanced power generation capabilities. These wind turbine power enhancements are a result of the various amounts of vacuum or negative pressure that can be created within and at the exit plane of the outlet section or exit space by various adjustments to the exit barrier or drag curtain. The amount of negative pressure depends on the physical construction of the air scoop and the shape of the exit drag curtain upstream of the air turbine exhaust, as well as the relative velocities realized throughout the invention. A larger air volume caught by the air scoop compared to the air flow through the turbine, along with an optimally designed exit drag curtain, creates an overall favorable differential pressure across the turbine and a higher power output. An oversized inlet air scoop or inlet section is designed with an inlet area to flow tube cross sectional area ratio greater than one so as to increase the positive static pressure at the inlet to the inlet section or flow chamber and, thus, the wind turbine, As shown elsewhere herein, the larger this area ratio, the larger the increased static pressure becomes up to a certain limit. The drag curtain, where used, is designed to increase the negative pressure at the outlet of the turbine and in the exit space. For the purposes of this application, the term 'exit barrier' is used to refer to the drag curtain, and also refers to a less efficient barrier that is not designed to increase the negative pressure at the outlet of the turbine and exit space.

For protection and security of the overall system, an optional hurricane fence type enclosure 122 may be employed at ground level and incorporated into the support posts 114 in a manner that allows for free air flow.

FIGS. 1A and 1B do not show any details of the turbine blade design. The type of blade and number of blades are based on an engineering design that provides high efficiency for any given size and for the projected and prevailing wind conditions available for each site. However, at least one elongated blade that rotates about its center is necessary, and preferably there is a plurality of blades. The blade design must be highly efficient at extracting power from the air flow, such as commonly seen in various fan blade and turbine blade designs. A detail of the seal between the flow tube and turbine blades is not shown. However, the seal should be flexible and allow the blades to rotate in a safe and reliable manner without any significant loss of power resulting from air leakage around the turbine. It may be possible to align the equipment to a close tolerance with minimal clearance so that a mechanical seal is not necessary. Any seal system utilized should also provide a reasonable service life. The electrical generator system may be directly connected to the turbine blades, or a belt system may be used. Alternatively, a gearing system may also be used.

In one embodiment, the flow tube and blades are aligned axially, but the fan blades are not inside the flow tube. That is, they are not within the volume defined by the geometry of the flow tube. The flow tube acts as a transitional piece to convey the air efficiently from the air scoop and to direct the air toward the air fan or air blades. In another embodiment, the air blades are within the flow tube.

The turbine blades may be a reverse flow "centrifugal fan rotor" type design and mounted on the discharge end of the flow tube assembly. This design can potentially exceed the Betz limit factor of 59.3% energy recovery of the available wind's air flow through the flow tube. The blades may be of a helical design, similar to turbine roof vents as used on top of buildings, such that the prevailing wind energy is imparted in multiple phases to the wind turbine in a multiple staged effect from both the inside and the outside of the wind turbine assembly. The "reverse flow fan design" means that most of the air flows from the inside smaller diameter of the fan rotor blades to the outside larger diameter of the fan rotor blades. The remaining air flow, powering the second turbine stage, comes from a second phase of the prevailing wind that enters through the exit section directly on to the periphery of the air turbine assembly, which is especially effective at generating power from the air turbine at lower wind speeds. The air turbine design may be of a combination type, including any suitable combination of air blade types including a combination backwardly-curved and air foil type blade configuration, such that the turbine exhaust air flows counter to the direction of rotation of the fan rotor assembly at lower wind and turbine rotor speeds, (i.e. reaction flow) so that the force of the air flow against the fan blades is on the reverse side of the blades. This causes the generator to rotate in a direction counter to the air flow discharging from the outer diameter of the reverse fan type air turbine rotor.

One embodiment of the present invention is to design the air turbine blades to be inherently over-speed limiting in relation to the speed or velocity of the prevailing wind. This can be accomplished to some extent by a careful selection of particular blade features. Another embodiment is to have a combination of air foil and bucket type turbine blade design features utilized in the air turbine blades so that both the highest and lowest wind speeds possible are most efficiently accomplished with a maximum range of wind speeds utilized. The combined moving bucket or impulse (i.e. drag) plus reaction type design of air turbine blades as is utilized with multi-phased wind flow type wind turbine rotor and air blade configurations provides for maximum torque at the lowest possible wind speeds, while an air foil type design (i.e. lift) of the same air turbine blades provides for more optimum combinations of overall wind turbine performance and torque at the higher wind speeds.

Assuming a constant 28 mph prevailing wind speed, a suitable design for the flow tube internal diameter is approximately 10 feet in diameter, which will provide sufficient air flow to the turbine rotor to generate approximately 3,000 to 10,000 watts of useful power. The amount of useful power depends on the overall efficiency of the specific wind turbine, the turbine blade design and the type of electrical power system utilized for any specific application. Suitable gearing, pulley, and belt drive systems can be employed between the air blades and generator to provide normal generator rotational speeds. Additionally, a variable frequency type induction generator with a frequency converter could be used either alone or in combination with the mechanical rotational speed increasing type drive systems to accomplish the same purpose.

A low pressure loss protective screen made of the same heavy duty hurricane fence type construction used for the floor of the T-rail and support cage assembly can also be provided at the inlet to the flow tube or the air scoop, where necessary, to protect operating personnel, flying birds, etc. from being drawn into the turbine blades.

The cross-sectional area ratio of the air scoop perpendicular to the prevailing wind and the turbine blade inlet section or flow tube section should be at least 1:1 for most single-phase wind energy power enhancer system embodiments; and it could practicably be up to 6:1, depending upon the available wind energy. There is no maximum ratio, only a ratio that is practical and economical for each application and intended purpose. In some multi-phased wind energy power enhancer system embodiments, the ratio may be less than 1:1, such as 0.01:1.0 or greater. The air scoop could be adjustable in size, perhaps utilizing an auto sail rigging system, to vary the air scoop to flow tube cross-sectional area ratio based on the available wind velocity. The air scoop size may be fixed for a given application, or it may be varied in shape or size to provide power based on wind conditions, such as average wind velocity and direction.

The present invention, which, in some embodiments, comprises the air scoop inlet section, integrated flow tube and air turbine assembly section, and air outlet section which may contain an exit section blocking barrier or drag curtain may be of a variety of cylindrical and rectangular shapes. The materials of construction can be metal, wood, plastic (especially fiberglass), or fabric (i.e. sails, scoops, or curtains) of either a clear, transparent or opaque construction as is best suited for the environment where the present invention is to be installed. Various stiffening structures for rigidity may be employed, where appropriate or required.

The security fencing system, previously mentioned, may be employed to surround, yet be an integral part of the power generating structure that complies with any required code or regulation for public safety. The fence will protect the public from rotating parts and electrical components. A security fence has other known benefits. It is important, however, that the fence type enclosure structure does not hinder the air flow into the present invention in any significant way.

The present invention has a more pleasing, aesthetic appearance as it conceals the turbine rotating generating parts from public view. As contrasted to conventional, high visibility wind turbines mounted on towers, the present invention provides a more fixed geometry which has more of an appearance of a building with an air scoop or sail mounted on top and facing the wind rather than a mechanical windmill and support tower fluttering in the wind. In visibly sensitive areas, such as inside city limits or within visible sight from public transportation areas, the present invention clearly provides less eye disturbance.

The preferred embodiment shown in FIGS. 1A-1B does not have to be installed at the ground level. It is possible, and perhaps desirable, to install the invention on top of a building structure, such as a tall office building. If the structure is installed on the side of a hill, the orientation of the air scoop may need to be rotated about an axis that is substantially perpendicular to ground orientation. In this case, the concept of vertical would be relative to the ground orientation. Alternately, the angle may be somewhat misaligned relative to the ground orientation, but still substantially vertical.

The arrangement shown in FIGS. 1A-1B is a preferred embodiment. As an alternative, the air scoop may be located below the vertical axis turbine and the exit drag curtain or exit barrier may be located above it.

For easy installation in a variety of locations, the flow tube and circular rotating T-rail and support cage assembly may be shipped in two or more segments to facilitate transportation requirements and assembled in the field.

Figure 2A:
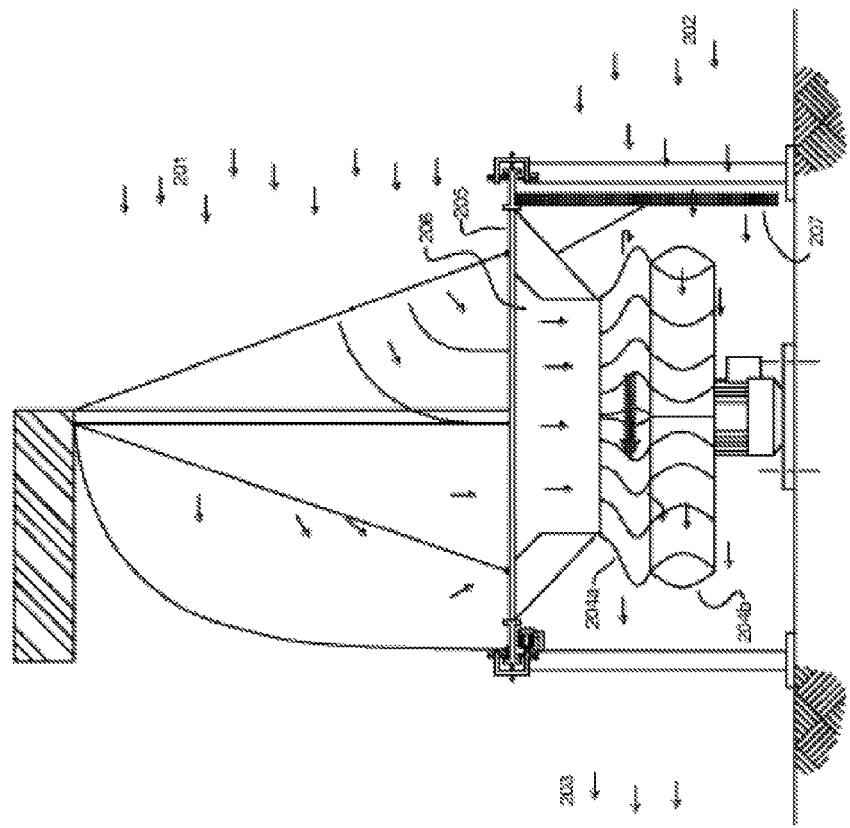

FIGS. 2A-2B show another embodiment of the power generating system. Again, a large air scoop made from a flexible material and shape is raised above a vertical axis power generating turbine as already explained for FIGS. 1A-1B. An upper prevailing wind 201 and lower prevailing wind 202 are used to generate electricity through power generating turbine blades 204a, 204b and exhaust the air into the downstream wind 203. However, in this embodiment, the upper turbine blade section 204a is connected to a lower turbine blade section 204b that is specifically designed to utilize the lower prevailing wind 202 to provide additional rotating force for power generation. Equally, the two blade sections could be designed to be integrated into one overall turbine blade section or assembly to obtain any desired performance requirement. FIG. 2B is an abbreviated top view which shows only the circular rotating T-rail and support cage assembly 205, the flow tube 206, the upper turbine blades 204a, and the top of the exit drag curtain 207. As shown, the exit drag curtain 207 has been reduced to provide only a 908 coverage and allow the lower prevailing wind 202 to become partially concentrated and to pass over only the lower turbine blade section or sections 204b on the down-spin side while producing additional drag on the up-spin side with improved, more effective exhaust air flow conditions accomplished from the air turbine. In this view, the turbine blade rotation is clockwise.

Figure 2D:
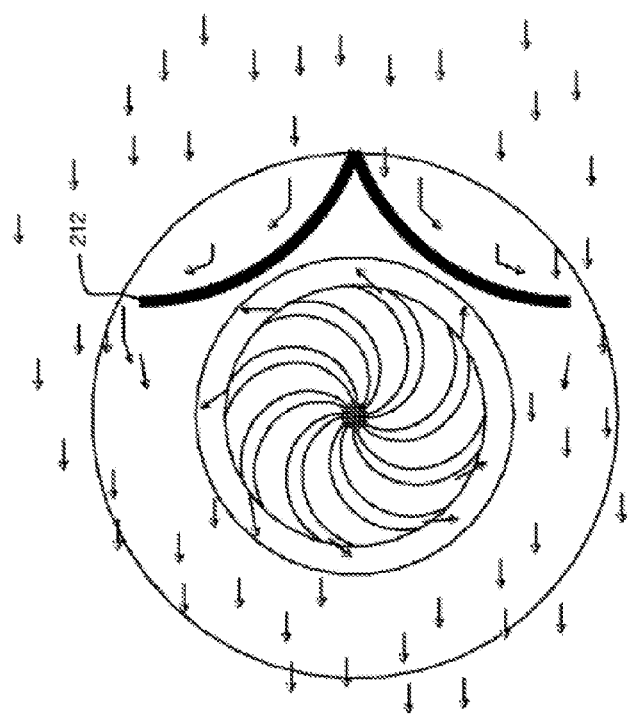
Figure 2C:
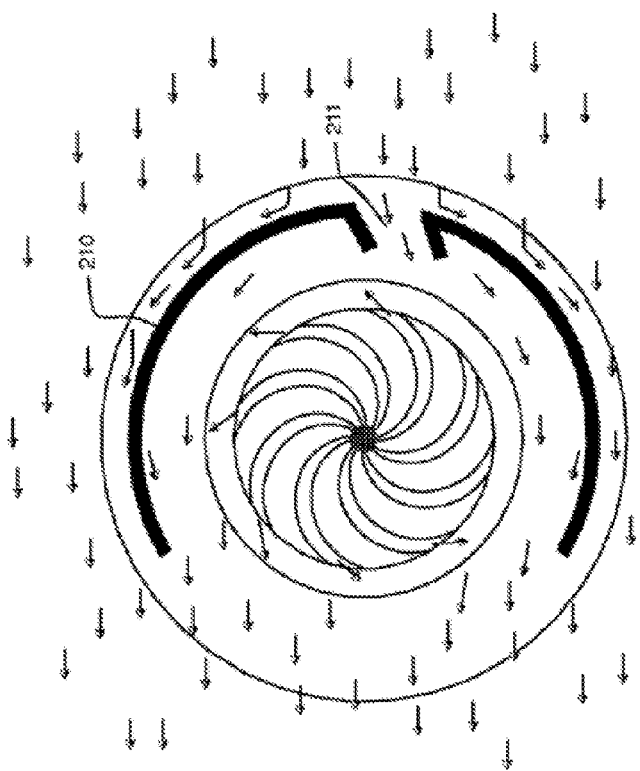
Figure 2F:
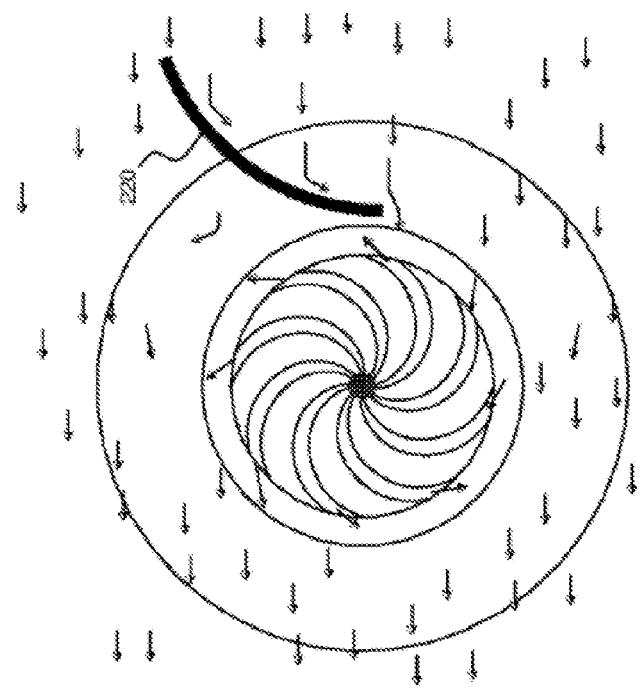
Figure 2E:
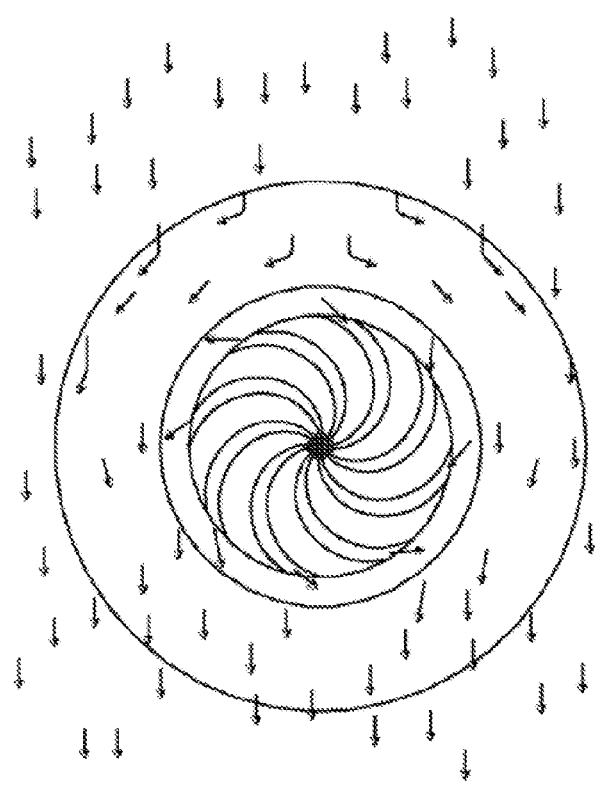

Similarly to FIG. 2B, FIG. 2C shows an exit drag curtain 210 containing a slotted type air injection nozzle 211 which has been formed to direct a concentrated air jet from the prevailing wind onto the down spin outer periphery of the air turbine, yet wraps the upstream side of the air turbine assembly with more than a 180° arc in a more air form manner. FIG. 2D shows another exit drag curtain 212 geometry with potential use in some applications. FIG. 2E shows the projected air flow pattern if no exit drag curtain is used, and the air turbine blades are designed to utilize the lower prevailing wind in addition to the air provided by the air scoop. FIG. 2F shows another possible exit section or space-partial drag curtain 220 geometry.

Figure 2I:
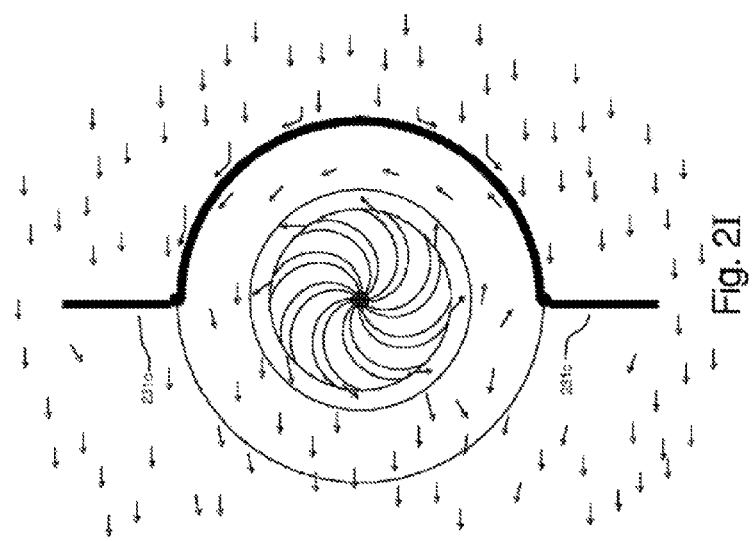
Figure 2G:
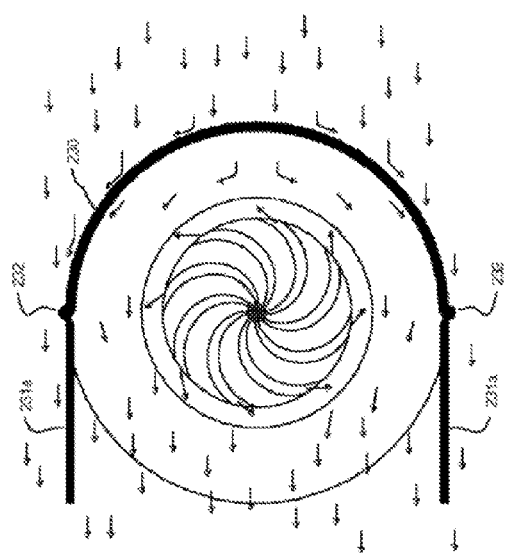
Figure 2H:
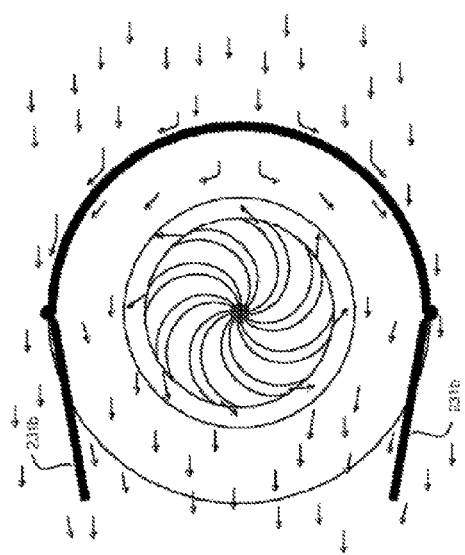

Similarly, FIGS. 2G, 2H, and 2I show another embodiment of the exit drag curtain in plane view 230, 231a which has an adjustable, variable geometry type design to change the exit drag curtain's drag coefficient either manually or automatically, as required. A curved, fixed portion 230 is attached to two straight portions that are parallel to each other 231a and connected by hinges 232. FIG. 2H shows the straight portions 231b which have been slightly directed inward from the parallel position, toward the center of the exit space on each side. An angle of 10° inward from the parallel position, as illustrated, may be advantageous in some wind conditions to create a more air form type drag effect. The angle could also be varied by mechanical means to as much as 90° outward from the parallel position, to the position 231c as shown in FIG. 2I, on each side to accomplish a "bluff body," also referred to as a flat plate or collar, type drag effect of the drag curtain according to the prevailing wind velocity. In these cases, the exit curtain has a variable geometry, and can be varied or adjusted dynamically when the winds change or whether a particular geometry provides appropriate optimum power for a given wind condition.

Figure 3A:
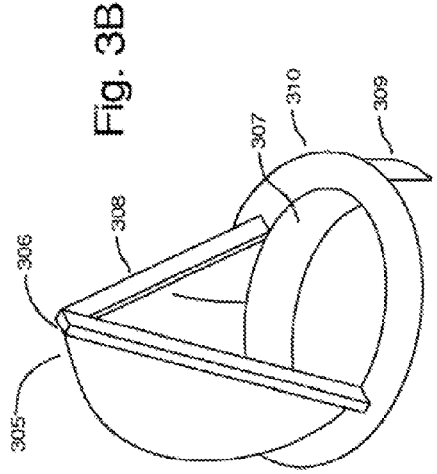
FIGS. 3A-3H illustrate several air scoop geometry shapes and exit drag curtain arrangements as mounted on a rotating circular T-rail and support cage assembly.

FIGS. 3A-3D show alternate arrangements of the air scoop and exit drag curtain. FIG. 3A shows the air scoop as outlined in the embodiment shown in FIGS. 1A-1B, except the flexible air scoop 301 lower edge matches the opening of the flow tube 302. The exit drag curtain 304 covers a 210° arc around the power generating area with enhanced power generating effect and, as previously illustrated, is attached to the circular rotating T-rail and support cage assembly 303.

Figure 3B:
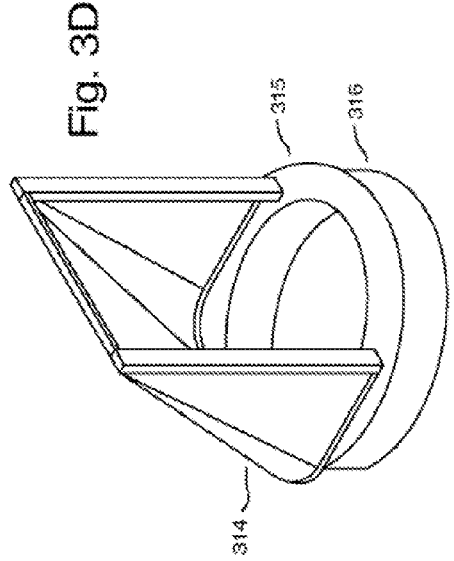

FIG. 3B shows an embodiment where the flexible air scoop 305 terminates at substantially a single point 306 above the flow tube opening 307 and utilizes an A-Frame mast 308. The lower exit drag curtain 309 only covers a 90° arc around the power generating area under the rotating circular T-rail and support cage assembly 310.

Figure 3C:
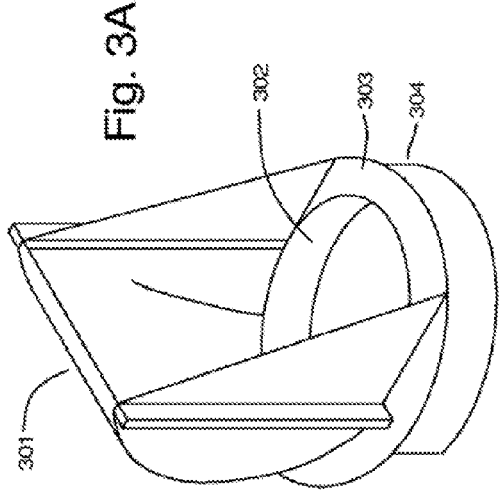

FIG. 3C shows an embodiment where the air scoop is a multiple hinged awning 311 that may be raised to a suitable height on the circular rotating T-rail and support cage assembly 312. The lower exit drag curtain 313 covers a 120° arc around the power generating area. The flexible air scoop illustrated in FIG. 3C does not have to be made from a flexible material. Rigid material could also be used to create the air scoop and still provide the variance in shape and size needed for optimal power generation. There could also be more than the two multiple awning sections 311 illustrated, and they may all be a different shape.

Figure 3D:
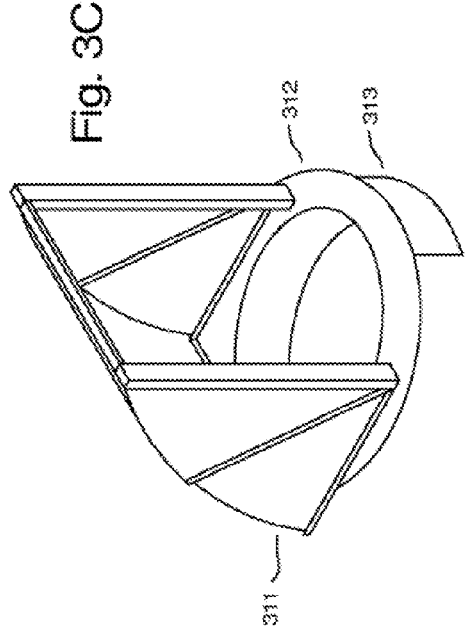

In FIG. 3D the flexible air scoop 314 is substantially triangular in style and mounted on the rotating circular T-rail and support cage assembly 315. The lower exit drag curtain 316 is wrapped in approximately a 270° arc, and is aerodynamically formed around the power generating area with the intent being to create a maximum vacuum type effect at the outlet of the air turbine to enhance the output power capability.

Figure 3F:
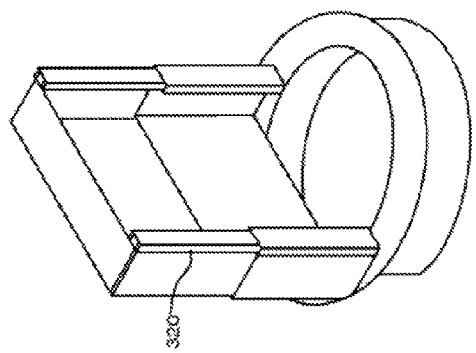
Figure 3H:
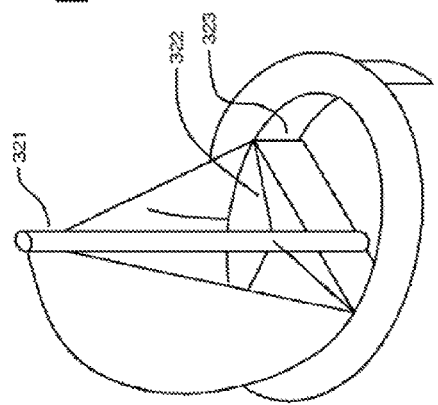
Figure 3E:
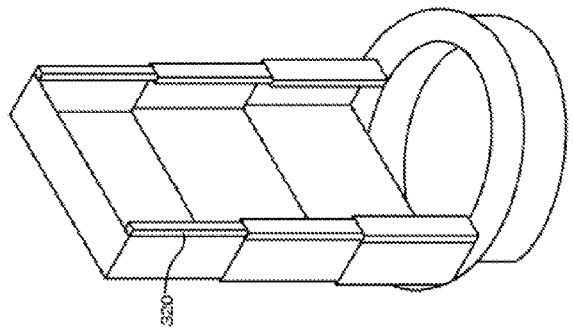
Figure 3G:
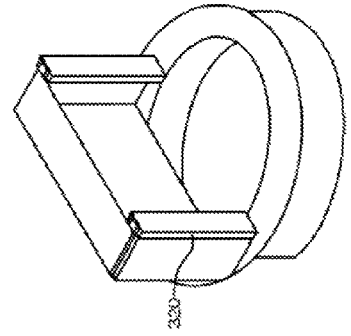

In FIG. 3E, the adjustable air scoop is supported by two telescoping masts 320 of adjustable height. The air scoop is shown configured for collecting wind when the prevailing wind speed is low or more turbulent. In FIG. 3F, the same adjustable air scoop is reduced in size by partially lowering the telescoping masts and scoop sections. The air scoop is then configured for collecting wind when the prevailing wind speed is moderate. In FIG. 3O the same adjustable air scoop is reduced to a minimum size by completely lowering the telescoping portions of the masts and scoops. The air scoop is then configured to collect wind when the prevailing wind speed is very high. Alternatively, sailboat type sails could be used here that could be "let in" or "let out" as desired or required, and the sails could be rolled up as appropriate with most sailing vessels.

FIG. 3H shows an embodiment where the flexible air scoop is supported by a central vertical mast 321 which is, in turn, supported by gussets 323 or guy wires 322. In this case, the rigging may be similar to sailboat rigging, and used to raise and lower the flexible air scoop.

In FIGS. 4A-4B, a cross-section of various embodiments of the present invention, similar to FIGS. 2A and 2B is shown where a propeller 410 is located within the flow tube 420. This simplified design is a lower capital cost, but provides lower efficiency and capacity. FIG. 4B shows the exit drag curtain 430 with 208° arc coverage. This arc coverage is a preferred embodiment and provides an optimum design in some situations.

Optionally, the exit drag curtain may be fixed to the direction of the prevailing wind, and may be varied in size rather than rotated with the air scoop. For example, the exit drag curtain may be provided in adjacent and over-lapping damper or louver type segments on vertical axis orientated support shafts that are each opened and closed through a mechanical means to provide a similar end result to rotating a fixed geometry curtain with the air scoop.

The exit drag curtain, or exit barrier, as described herein, is designed to utilize the air drag effect created by the upstream air flow from the prevailing wind around the exit drag curtain. Conversely, exit barriers could also be used in certain applications as wind concentrators when located on the upstream side of and in parallel with the air turbine blades in the downstream direction only in the second phase of the prevailing wind. The average or bulk velocity of the exit air, after being exhausted from the air turbine through the exit air space, is lower than the average prevailing wind velocity to both enhance the downstream drag effect and reduce the internal exit air velocity to thus increase the total pressure differential created across the wind turbine. The entrainment between the two air streams can thus be designed to occur in an efficient manner by an appropriate exit drag curtain design which incorporates the most optimal drag effect possible from the prevailing wind to create a slight vacuum or negative pressure within the exit section or exit space at the point of re-entrainment.

One distinct advantage of the present invention is the ability to regulate the amount of air that is brought through the turbine air blades, and to regulate the power output. It is desirable to maintain power production in a high speed wind by reducing the size of the air scoop. The amount of air throughput can easily be reduced with or without the air turbine system being in operation to prevent over-speeding of the turbine blades. It is also desirable to design the size of the air scoop to match a particular location. For example, if there is a lower amount of average wind, the air scoop size may be enlarged. In this way, an optimization may be more readily found in a variety of locations utilizing a more standardized turbine design.

The power generated from the prevailing wind energy may be employed in creating compressed air, hydraulic pressure, pumping water, or reciprocating motion. It is not a requirement that the system is employed to generate electricity. However, electrical generation is a preferred embodiment.

The present invention may be adapted to smaller operations that utilize wind energy for the creation of needed power. For example, the teachings of the present invention may utilize existing structures as an air scoop and direct the air flow through a vertical axis turbine. A sailboat, for example, may use the wind pressure on the sail and direct a small portion of the air captured by the sail through a vertical axis turbine. The inlet section would be an inlet duct on the upwind side of a sail, and the outlet would be ducted to the downwind side of the same or other sails on the vessel. The inlet section, outlet section, and associated ductwork could be of a fixed or flexible design, and could then be routed to some convenient location where the turbine would be located. This same air flow could also be used to ventilate below deck quarters within the sailing vessel in series with the air turbine system through a suitable duct type system. This same concept could also be utilized on a non-powered barge type vessel. The power generating system could be used to charge batteries for general sailboat or barge power, or to power a small auxiliary electric outboard motor.

A prevailing wind exit drag curtain to protect the air exhaust space, or exit space, downstream of the air blades is not necessarily a requirement of the present invention. However, it provides an important improvement in operational efficiency and enhanced capacity. In some cases, operational efficiency and enhanced capacity is not a paramount concern, such as in a remote area where the power need is infrequent.

Figure 5B:
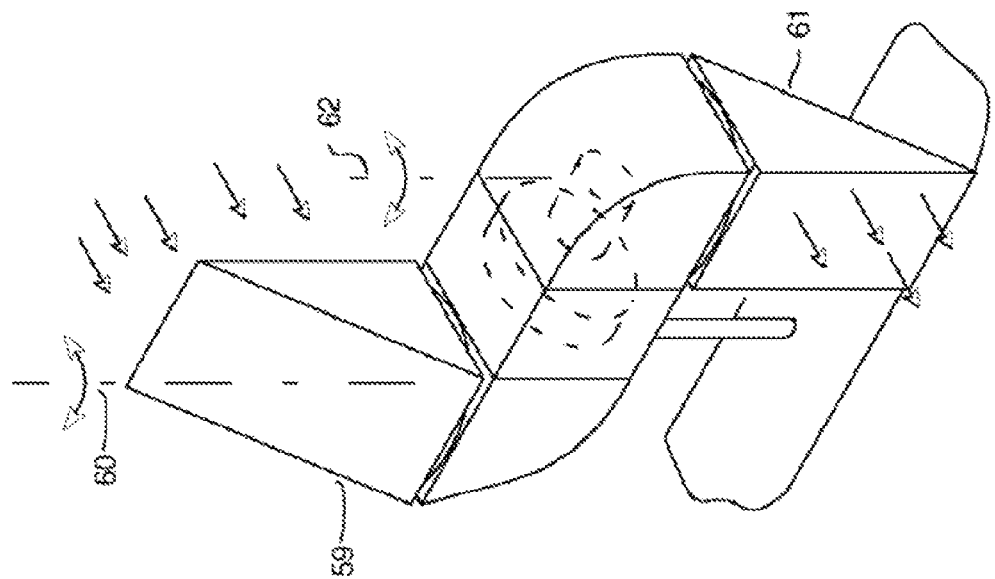
FIGS. 5A-5B show how the present invention may be adapted for use as a horizontal axis turbine incorporating important features for the air scoop and exit drag curtain.
Figure 5A:
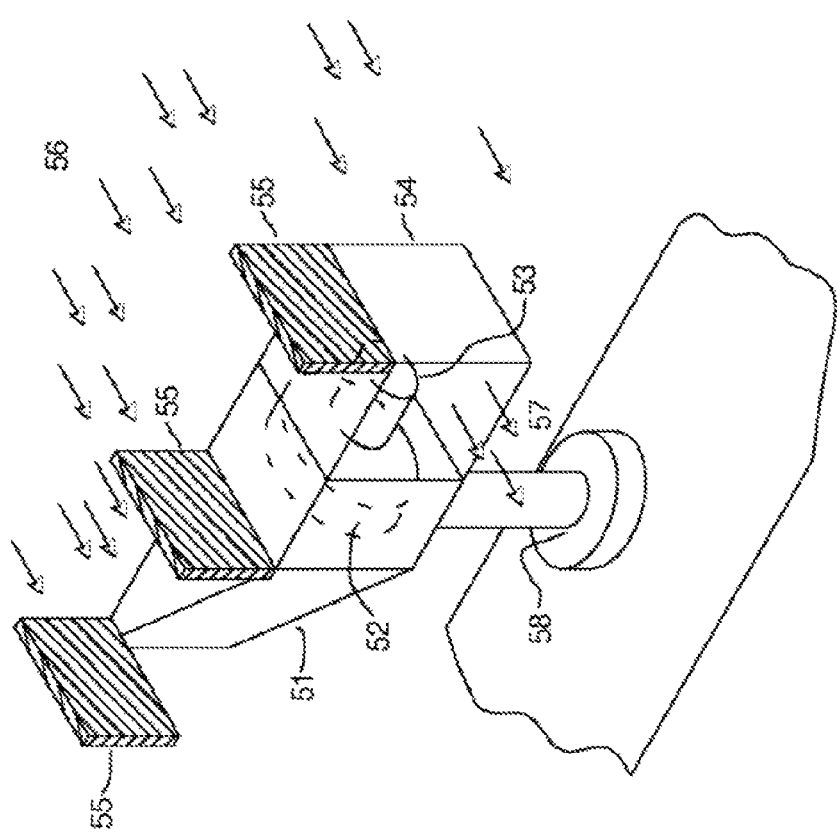

FIG. 5A shows another embodiment of the present invention and is preferred in some situations. A rigid air scoop 5I directs air from the prevailing wind 56 horizontally through air blades 52 which drive a power generator 53. An exit blocking curtain 54, similar to the inlet air scoop in design, but rotated approximately 180 degrees from the direction of the prevailing wind, protects the turbine air exit space and allows the exit air 57 from the turbine air blades to reenter the prevailing wind in an optimal manner. Stabilizing or directional air vanes which may or may not be of an opposing air foil design 55 cause the entire structure to rotate on a rotating base 58 based on the prevailing wind direction, to keep the air scoop 51 facing the prevailing wind. Alternatively, a Fachheimer type-highly directionally sensitive-velocity sensing probe could be used to help optimize the position of the air scoop and drag curtain via an air scoop jogging motor relative to the prevailing wind. This structure may be useful for smaller power generating systems.

Similarly, FIG. 5B shows another embodiment where the air scoop 59 is oriented vertically and allows rotation about the vertical axis 60 as illustrated. This air scoop can easily be directed to face the prevailing wind via a jogging motor. The exit drag curtain arrangement 61 comprises a second air scoop type structure which also rotates about a vertical axis 62, but always discharges in the downwind direction of the prevailing wind. Other wind blocking arrangements, such as illustrated in previous figures, could also be employed.

The air turbine does not necessarily need to be of a vertical axis-down-flow design to work cost effectively and efficiently. However, the air scoop section should always face into the wind, and the outlet drag section should most desirably face away from the prevailing wind in a multiple wind phased, multiple turbine staged wind energy effect for optimum wind turbine system effectiveness and power capacity.

Data from a test rig, where a prevailing wind was captured by a combined air scoop and exit drag curtain system designed according to the teachings of this invention, is shown in a table below. The test rig was designed so as to direct the captured air flow downward from the adjustable inlet air scoop into a vertical duct, turned 90° into a horizontal duct or air tube where the air velocity was measured, and then turned 90° again into an adjustable exit drag curtain configuration which discharged in the downwind direction from the prevailing wind. Air velocity measurements were made using a rotary vane type wind meter and a hot wire anemometer of the prevailing wind and the air in the horizontal duct or air tube respectively and simultaneously:

| Prevailing Wind Velocity (fpm) | Horizontal Air Tube or Duct Flow Velocity (fpm) |
| --- | --- |
| 411 | 641 |
| 521 | 652 |
| 554 | 563 |
| 810 | 837 |
| 818 | 906 |
| 623 Avg. | 720 Avg. |
| Increase | 16% |

Great care was taken to ensure that both meters were reading comparable wind velocities when placed side by side during the hot wire anemometer to wind meter calibration exercise and just prior to inserting the hot wire anemometer into the horizontal flow tube. Higher air-tube to wind air velocity differentials recorded were discarded due to non-uniform wind speeds or gusts prevalent at the time these readings were taken.

Surprisingly, the measurements show that the air velocity in the air tube could be consistently increased to above the velocity of the prevailing wind when directed to the horizontal duct, demonstrating that there was no significant loss of wind energy. One readily concludes that there is no significant loss of available energy in the duct air flow when compared to the available energy in the prevailing wind. One also concludes that the combined inlet air scoop and downstream exit drag curtain system is highly effective in capturing the available wind energy in a multiple phase or multiple staged manner. The major conclusion with these bench scale tests was that, with larger inlet air scoop to flow tube inlet area ratios, significantly higher static inlet pressures could be induced against the flow tube inlet from the upstream wind flow. Thus, these larger inlet air scoop to flow tube inlet area ratios significantly increase the potential static pressure differential made available to the wind turbine assembly for power production over the normal two to three to one inlet area ratios as normally envisioned for non-building integrated wind turbine applications. With a Building Integrated Wind Power System design approach, the entire face of the building on the upstream side is thus also made available to further increase this static pressure potential to the overall wind energy power enhancer system even more by augmenting the inlet air scoop to flow tube cross sectional area ratio for any given wind turbine rotor application of choice and as best suits any particular building's local wind conditions or building design configuration. The credibility of this experimental evidence was also verified by various flow computational methods, which are known in the art.

The exit drag curtains provide concentration of the energy available from the lower or second phase of prevailing wind upstream of the air turbine assembly. They also enhance the available pressure drop across the air turbine blades. This is done by the inherent vacuum creation or drag effect of the lower prevailing wind's velocity around the exit space from the turbine. This vacuum effect can be optimized by utilization of the wind concentration effects around the exit drag curtain relative to the lower velocities present at the inside of the exit drag curtain. The ultimate design for each application will consider the specific drag curtain geometries employed in the outlet section to obtain the most optimal air entrainment mixture rates possible downstream of the exit drag curtain. For example, when more than a 180° exit drag curtain arc is used, the optimum mixture angle might easily be at a 15° straight converging included angle, or, as much as a 0 to 60° straight diverging included angle. Even a "bluff body" diverging angle of up to 180° may be considered in order to obtain the most optimal re-entrainment conditions possible. Extensive physical and math modeling may be required for
each application considered to determine the optimal re-entrainment angles for most effective remixing or re-entrainment of the two re-combining air streams back into a second phase of the
prevailing wind.

The basic principle of a preferred embodiment shown in FIGS. 1A-1B is based on the "S" type or reverse pitot tube type design concept for optimizing and maximizing the velocity head differential achieved from a given air velocity. This type of probe is especially useful at lower air or gas velocities. For example, the pressure differential from an "S" type pitot tube in an air stream will be higher than for a standard pitot tube where the low pressure tube is oriented only 90° to the air flow direction. Additionally, relatively minor defects in the downstream outlet nozzles outer surface for an "S" type pitot tube are also known to affect the final calibration factor applied to a specific "S" type probe as tested and calibrated in the laboratory.

The structural, mechanical, instrumentation and control and electrical systems that safely and reliably convert the rotational energy output of the vertical air turbine to safe, useable power are well known in the available art and are not a part of this invention.

FIGS. 6A and 6B are another embodiment of the present invention. A generator 611 at ground level is driven by a vertical shaft 614 which is powered by a radial fan 615. The radial fan 615 is driven by air from two phases of the prevailing wind in two stages: one force internal and the other force external to the air turbine assembly. The internal air injection to the wind turbine comes from the flow tube 616 which traps air from the first phase of the prevailing wind 620 in front of the entry to the inlet section and/or air scoop 613 which creates pressure in front of the flow tube 616. The external air injection to the wind turbine comes from the second phase of the prevailing wind which enters the air inlet section to the outflow chamber and air impingement section only, 620 and flows both across and through the outer periphery of the radial fan 615 blades on the downspin side, which are designed to utilize both the internal and external air flows for power production in a first and second stage of air injection flowing to the air turbine. The combined wind turbine exhaust air from the first and second phases or stages of air flow to the wind turbine, along with all of the leakage air from the associated seals, then proceeds to the exit space 618 immediately surrounding the radial fan, and re-entrains back into the prevailing wind downstream of the invention by means of the outflow chamber or chambers. Additional features include a positioning motor 619 to rotate the air scoop 613 and partial exit space drag curtain 621 which is rotated to follow the prevailing wind direction, a safety fence 612, and a brake 617 which can be used to prevent over-speeding of the radial fan. In this case, the safety fence as shown is intended to prevent people and small animals from entering the equipment. The exit space partial drag curtain and exit barrier 621 are optional features.

FIGS. 6C, 6D, and 6E show one method of how the air scoop is used in this embodiment. The view is a simplified top view and the air scoop is a fixed geometry 180 degree barrier. The air scoop 613a, 6136, and 613c is rotated as the prevailing wind 620a, 620b, and 620c increases in magnitude. In FIG. 6E the air scoop additionally blocks the air flow so that there is no wind into the flow tube and the equipment is protected in a high wind. Another air scoop method is to utilize an air scoop which is adjustable similar to the adjustable drag curtains shown in FIGS. 2G, 2H, 3C, 3E, 3F, and 3G and which are used to both concentrate and direct the flow of air both upwardly and into the flow tube and air turbine section.

Figure 7B:
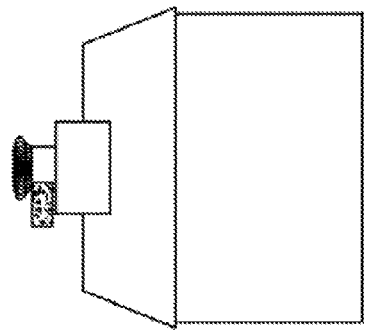
FIGS. 7A-7C show another embodiment of the present invention installed on a new or existing home or office building roof.
Figure 7C:
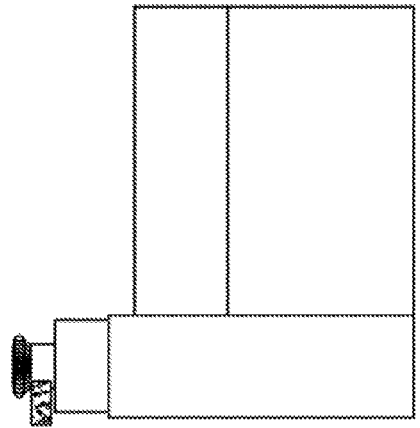
Figure 7A:
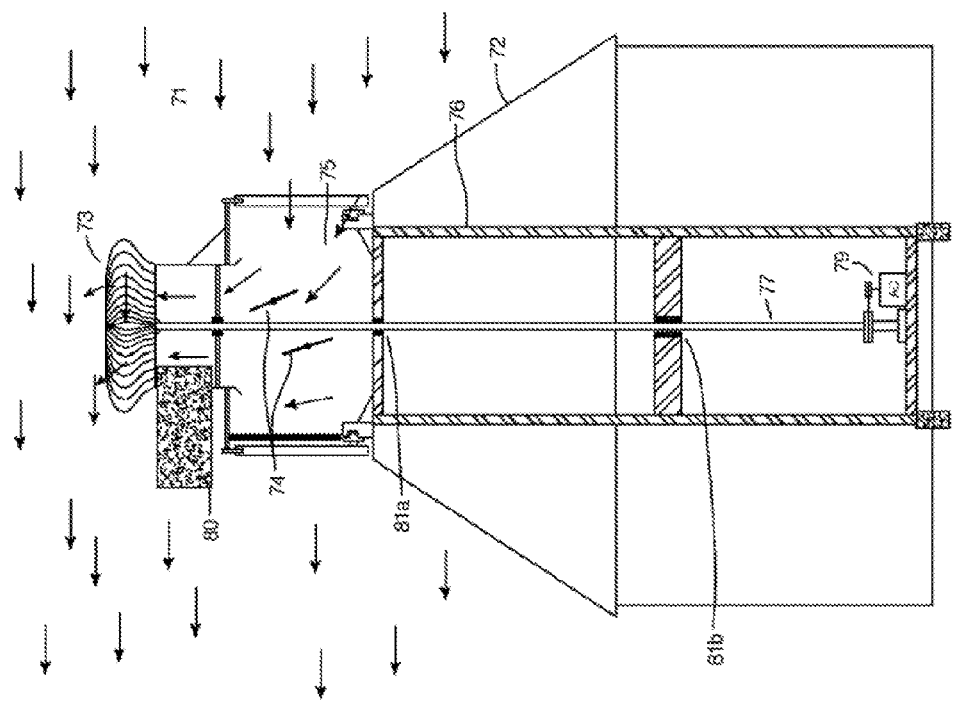
Figure 8A:
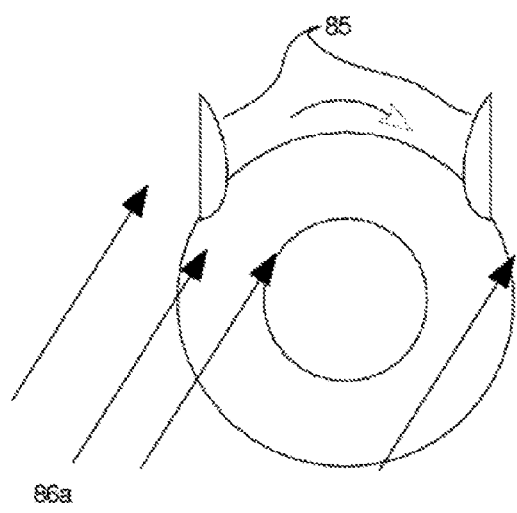
FIGS. 8A-8C show a self-correcting method of orienting the air scoop relative to the prevailing wind by use of two opposing air foils without the use of an auxiliary jogging mechanism.
Figure 8B:
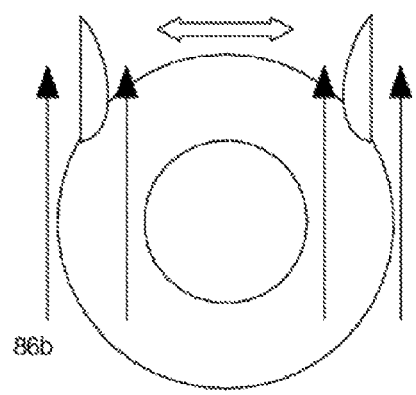
Figure 8C:
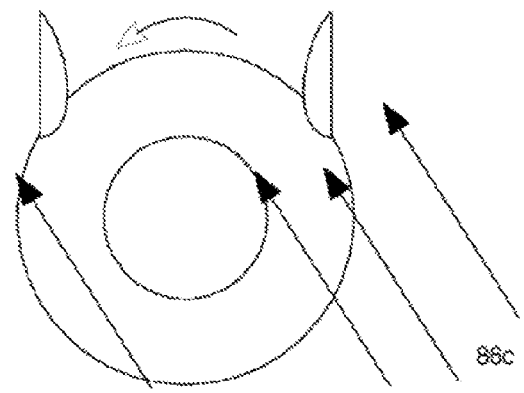

FIG. 7A is another embodiment of the present invention. A radial fan of a wind powered turbine roof vent type air turbine design 73 is installed on a new or "Green" home or office building roof 72 which receives air flow from both a first and second phase of the incoming prevailing wind 71, as discussed previously. An adjustable air scoop 75 directs air flow upwardly into the inner diameter of the air turbine blade assembly, which exhausts outwardly into the exit space immediately surrounding the air turbine. Optional adjustable turning vanes 74 inside the adjustable inlet air scoop provide for enhanced air flow efficiency. Dual stabilizing-counter air foil type wind vanes 80 rotate the adjustable air inlet scoop to keep it oriented to the wind. Only one vane can be seen in this view. An additional plan view in FIGS. 8A-8C shows more clearly the self-correcting features of this design as the wind direction changes relative to the air turbine and air scoop inlet sections, as well as depicting more accurately the actual location of the two stabilizing air foils. A steel structure 76 supports the air scoop, the air turbine, and a vertical rotating shaft 77 which transmits the rotating power downward to the electric generator 79. The vertical rotating shaft is preferably a suitably balanced tube, such as a pipe or structural tubing, and may be as much as 12" in diameter. The vertical rotating shaft optionally provides structural support of the air turbine, both radial and vertical. The air turbine may also be supported by the steel structure (not shown) by way of the rotating cage assembly. In this embodiment, the transfer of power between the air turbine and generator is done by a smaller flexible shaft by independently supporting the horizontal wind forces on the air turbine via the rotating cage assembly. The steel structure and rotating shaft are preferably embedded into the walls, floors, and ceilings of a new home or office building and are completely hidden from view. In one embodiment, the roof turbine blades are of a reverse fan type design. Where the vertical rotating shaft goes through the structural supports, suitable bearings and supports $S1_a$, $S1_b$ are utilized.

In FIG. 7A, air flow from the prevailing wind on the turbine blades provides power from two stages of air injection created from two phases of prevailing wind flow as previously discussed. The air scoop may be located either above or below the air turbine blades, depending upon the choice of the designer. The generator is installable at ground level, in a basement, on a second floor, or just below the roof line, depending upon local conditions, floor layout, and construction costs.

FIGS. 7B and 7C illustrate the installation of the roof mounted system on a new "Green" home or office building and also on an existing home or office building on a retrofit basis respectively. In the case of a retrofit, the installation most favorably would be done by an addition to the original home or office building as shown in FIG. 7C. The structural steel needed to support the wind turbine system and support the wind loads could be easily hidden from view by various combinations of added enclosures to the existing home, such as a garage, storage shed or various room additions. Also, architectural siding could be used as a more cost effective method for concealing the steel support structure, which would provide various lower cost options for a garage, porte-cochere, car port, storage rooms, battery and generator rooms, etc.

A dual stabilizing-counter air foil system as shown in FIGS. 8A, 8B, and 8C works to correct the multi-phased vertical wind turbine system orientation relative to the prevailing wind such that the inlet air scoop faces directly into the wind at all times. This is accomplished by the two opposing air foil type stabilizing fins located toward the rear of the rotatable and supporting cage structure of the wind turbine system. When the inlet air scoop is facing directly into the wind, as shown in FIG. 8B, both air foils are at minimum and opposing lifts on a horizontal or side to side basis and thus there is no correctional torque on the support cage to rotate it in either direction.

FIGS. 8A, 8B, and 8C show a self-correcting method for automatic re-orientation of the inlet air scoop to always face the prevailing wind by use of two opposing air foils. The use of two air foils 85 provides for a dual stabilizing-counter air foil system design that automatically and continuously corrects the air scoop orientation so that it faces directly into the wind at all times. This is accomplished by the positioning of the two opposing air foil type stabilizing fins towards the rear of the rotatable support cage and air scoop structure where fully exposed to the prevailing wind. When the inlet air scoop is facing directly into the wind as illustrated in FIG. 8B, both air foils are at minimum lift angles to the prevailing wind 86$b$, such that the opposing lifts are minimal. Therefore, there is no correctional torque on the support cage to rotate it in either direction.

When the wind 86$a$ shifts relative to the inlet air scoop, as shown in FIG. 8A, the lift on the left hand (when viewed from upwind) air foil type stabilizer fin increases significantly, with zero or no lift experienced by the right hand air foil type stabilizer fin. Thus, the rotatable support structure corrects by rotating clockwise until the two stabilizer fins are again balanced and the inlet air scoop is again facing directly into the wind as shown in FIG. 8B. When the wind 86$c$ shifts relative to the inlet air scoop, as shown in FIG. 8C, the lift on the right hand air foil type stabilizer fin increases significantly, with zero or no lift experienced by the left hand air foil type stabilizer fin. Thus, the rotatable support structure corrects by rotating counterclockwise until the two stabilizer fins are again balanced as shown in FIG. 8B and the inlet air scoop is again facing directly into the wind.

FIGS. 9A-9C, 10 shows an embodiment of the present invention where various types of air turbines and air blades are used in a novel method to exploit air flow in a general "S" shaped flow pattern through the power generating system equipment. A vertical configuration is shown, i.e. a vertical rotating axis for the air turbine and air blades, but a horizontal configuration could also be used. Also, passive air dampers are used to direct the air flow based on simple air pressure rather than rotate a flexible air scoop and maintain its direction into the wind. The passive air dampers are actuated by the prevailing wind, per natural air pressures, and by gravity.

Additionally, deflection dampers may be used to enhance the efficiency of air collection by rotating a surface area into the wind to provide an air scooping surface. In another embodiment, the deflection damper is used in combination with the passive air dampers. It also used as a regulating intake damper when a passive in-flow damper is not used. If a deflection damper is used with an out flow air movement, it is used to provide an enhanced air drag effect.

Figure 9A:
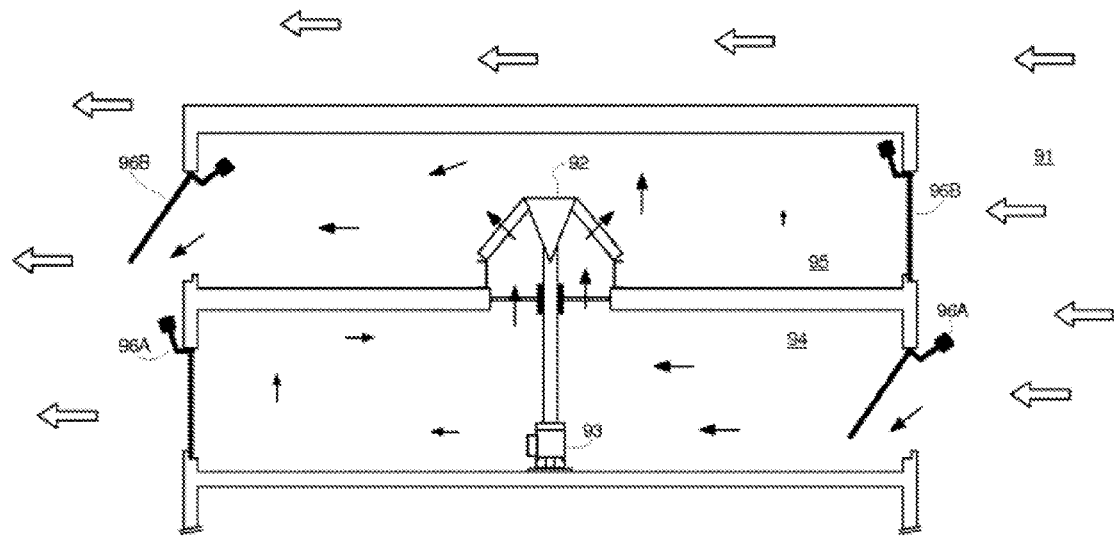
FIGS. 9A-9C, 10, and 11 are embodiments of the present invention where various types of air turbines and air blades are used to exploit air flow in a general "S" shaped flow pattern through the power generating system equipment.

In FIG. 9A, a cross-section, the prevailing wind is directed toward the power generating equipment which may be installed on a building where the prevailing wind 91 is available. Common locations are roof tops and upper stories of a building. Air flow from the prevailing wind opens an in-flow damper 96A which is counter weighted, (also referred to as barometrically balanced), and enters lower chamber 94. A generator 93 is connected to a Full, Mixed-Outflow type Air Blade design which incorporates an air foil blade design 92. The air flows through a structural divider between the lower chamber 94 and the upper chamber 95 and thereby creates power. The air then passes through the out-flowing damper 96B which is counter weighted, (also referred to as barometrically balanced). The power generating air flow then reenters the prevailing wind on the downwind (or downstream) side of the building. Power is generated by utilizing the pressure differential and air flow created by the prevailing wind impact and drag effects around the building surfaces.

Preferably, the in-flowing dampers 96A and the out-flowing dampers 96B are designed to be as passive as possible and maintenance free. Sensors are optionally used, if required, to improve performance, and dampen any unnecessary movement by gradual repositioning any active dampers. It is highly desirable that any dampers related to air flow do not cause a pressure drop for the air flow, nor that they 'slam' open and closed. To that end, shock absorbers, and common anti rapid movement devices may be employed with success. The dampers only need to create a reasonable seal when closed, so that the power generation is optimized.

The number of passive dampers that are open and closed are naturally selecting based on gravity and the prevailing wind direction around the perimeter of the lower and upper chambers. The number of dampers used for an application is selectable for each particular design, based on power requirements and capital cost.

The location of the air blades (i.e. air turbine) and their orientation are chosen based on design criterion for power and maintenance. In general, the blades must be located to efficiently utilize the pressure differential generated between the upper and lower chambers. The air blades are preferably rotating about a vertical or horizontal axis. Careful attention must be paid to ensure minimal pressure losses. The air blades may be located in the lower chamber 94, the upper chamber 95, in-between, or partially in each. It is also possible to locate the air blades externally to both chambers.

Figure 9B:
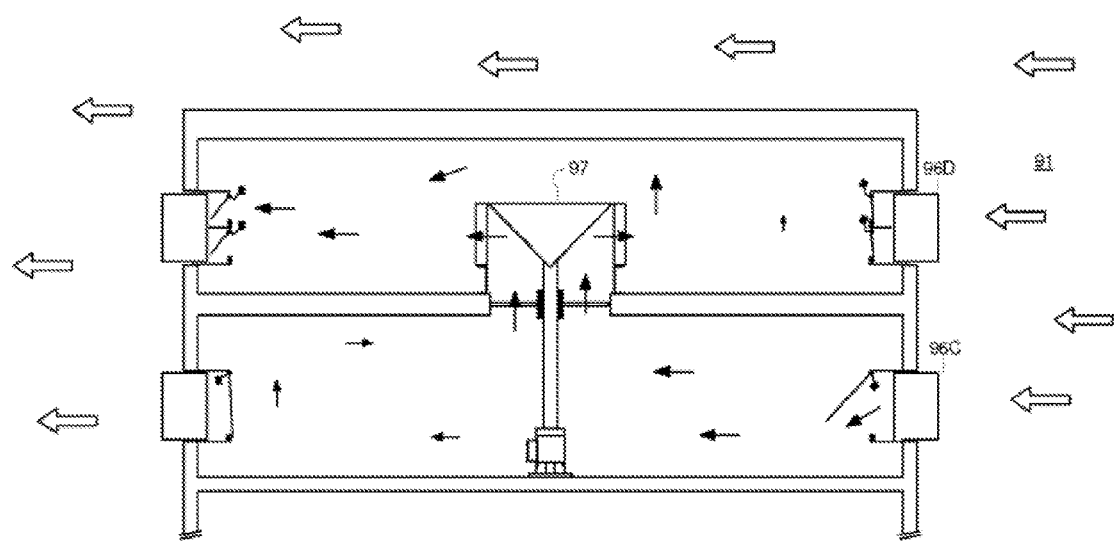

FIG. 9B is similar to FIG. 9A except a Full Radial-Outflow type Air Turbine which incorporates an Air Foil type Air Blade design 97 is used. In this case the inflow air dampers are combined with air deflecting dampers 96C, as already mentioned, and the outflow passive air dampers are combined with air deflecting dampers 96D. The figure could also be shown with only air deflecting dampers 96C and 96D and the passive air dampers omitted. In this case, a control system would be needed to provide optimum power efficiency to ensure the correct dampers are open and closed for air intake and outflow. The air deflecting dampers are useful for buildings that are oddly shaped and to ensure optimum power generation. The air deflection dampers have a significant in surface area, and are preferably designed for a particular location. It should be noted that FIG. 9B is not to scale, and the visual size of the air deflecting dampers 96C and 96D are only illustrative.

Figure 9C:
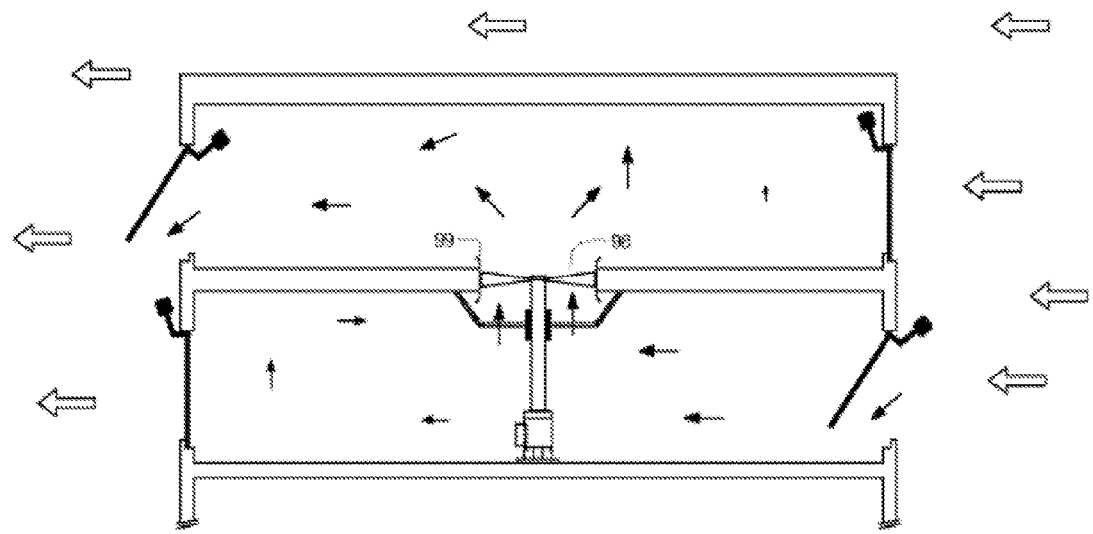

FIG. 9C is similar to FIG. 9A except a Axial Flow-Propeller type Air Turbine with Air Foil type Air Blades design 98 is used and a flow tube 99 is also shown.

Figure 10:
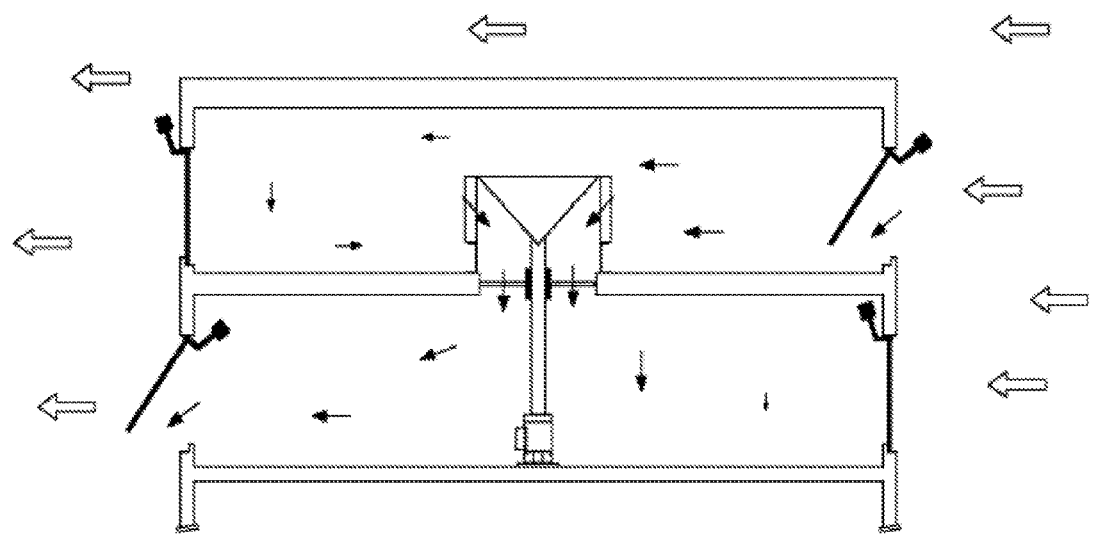

FIG. 10 is similar to FIG. 9B except the in-flow and out-flow dampers are reversed in their direction of opening so that the air flow through the system is reversed, using a Full, Radial Inflow type air turbine design with air blades that are designed for high efficiency.

Figure 11:
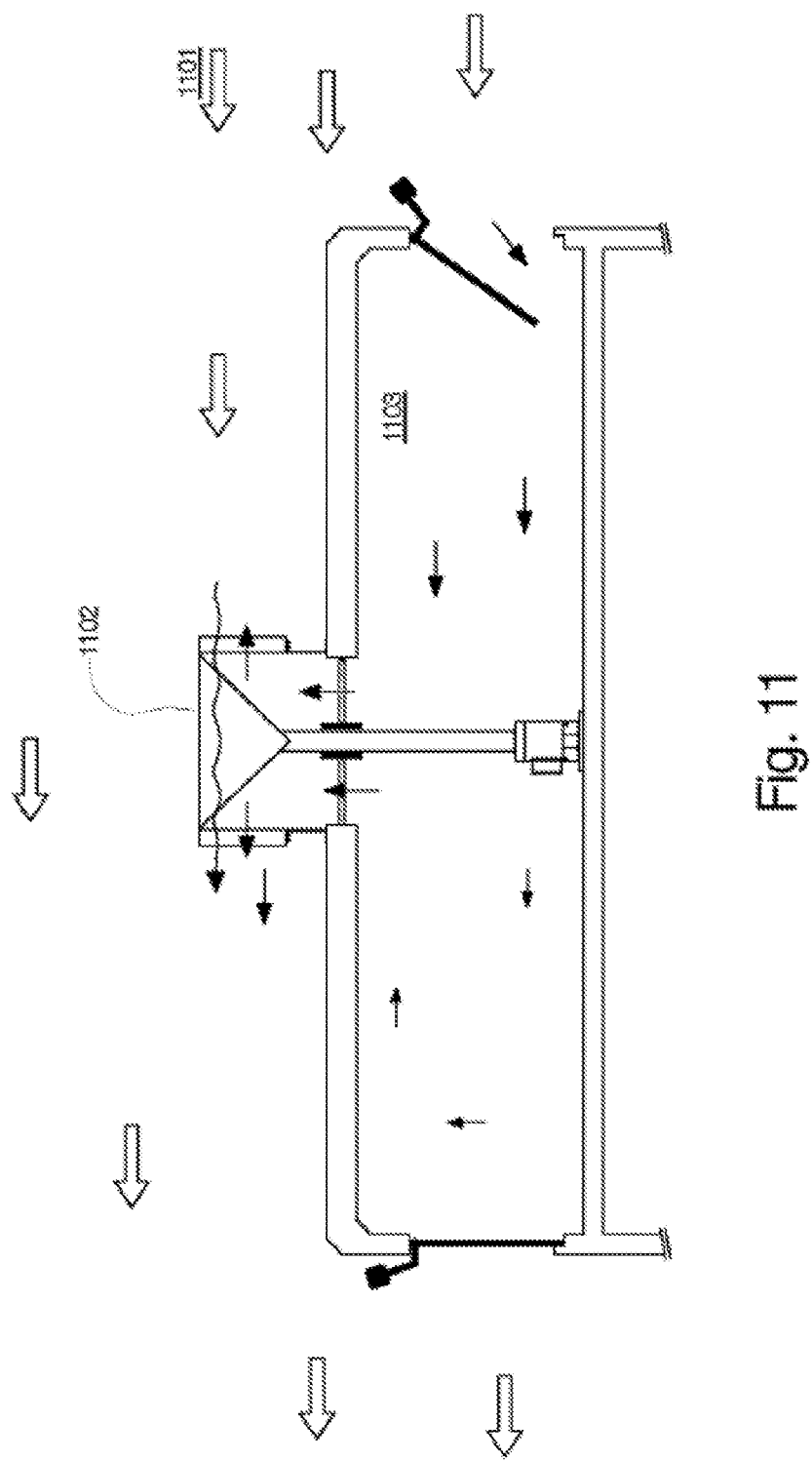

FIG. 11 is similar to FIG. 9B except that the upper chamber is removed, the lower chamber remains 1103, and the upper air blades 1102 are designed to additionally provide power by use of a second phase of the prevailing wind 1101.

Figure 12:
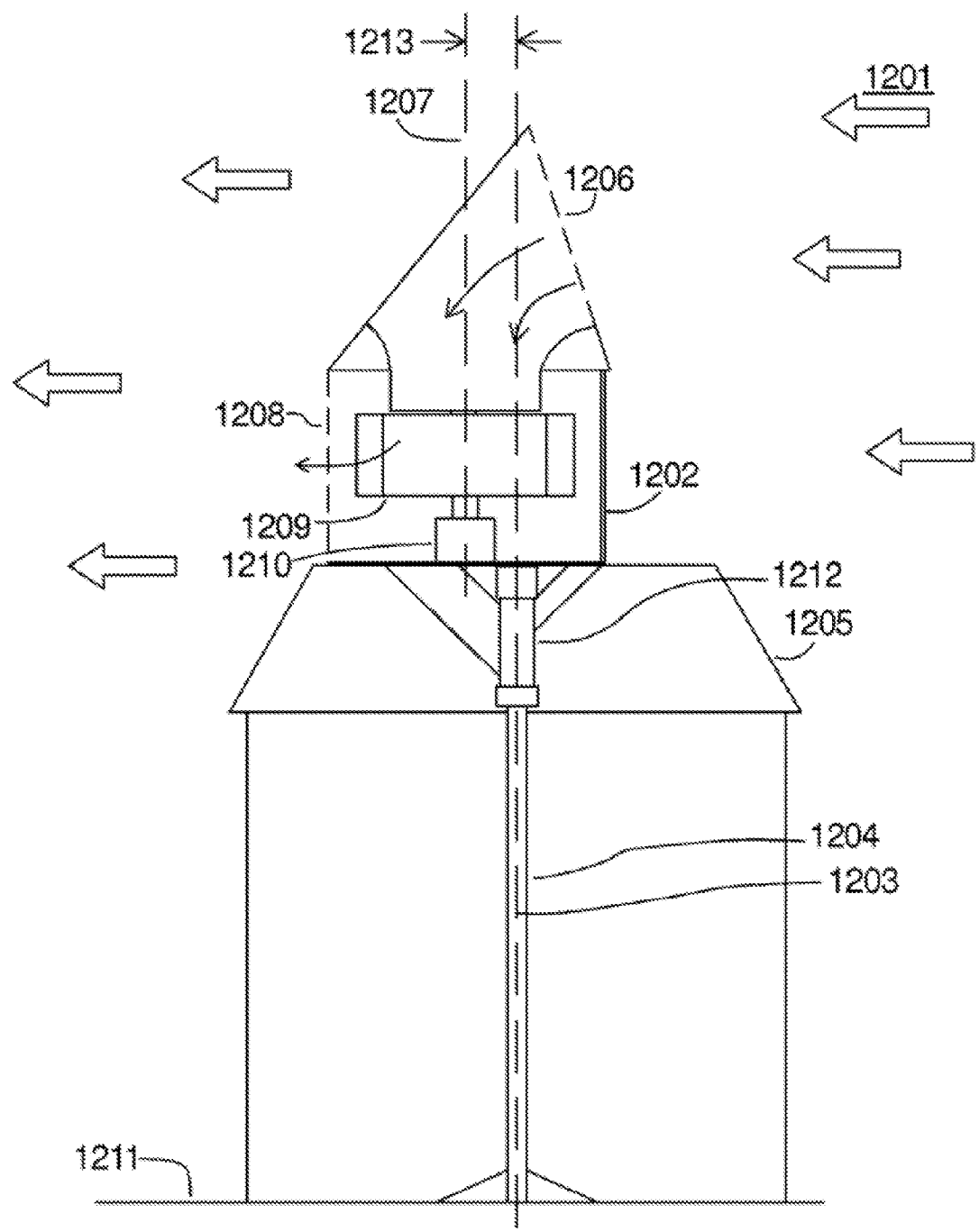
FIG. 12 shows an embodiment of the present invention of orienting the air scoop toward the prevailing wind.

FIG. 12 shows an embodiment of the present invention where the power generating equipment and assembly is mounted on top of, or near the upper rooms of a building 1205, such as a home or small office. A unique and novel method of orienting the air scoop toward the prevailing wind 1201 is shown. The air scoop 1206, air turbine 1209, and generator 1210 are all mounted in an enclosure where the air blades rotate about a separate vertical axis 1207. A separate orienting axis 1203 which runs down the center of a main support pole 1204 to the ground 1211 is used to orient the enclosure. An assembly of bearings and mounting brackets 1212 are mounted at the top of the support pole which is connected by supports to the assembly enclosure for the power generating equipment. The offset amount 1213, or distance between the two axis 1207 and 1203 then allows the prevailing wind to generate a pivoting force that rotates the assembly enclosure around the orienting axis 1203 to a position downwind of the orienting axis. Additionally, a screen or grate 1208 is used after the air blades to prevent animals or birds from entering the exit space around the air blades. A barrier 1202 is used to define the exit space and partially or completely blocks the prevailing wind from entering it.

Figure 13:
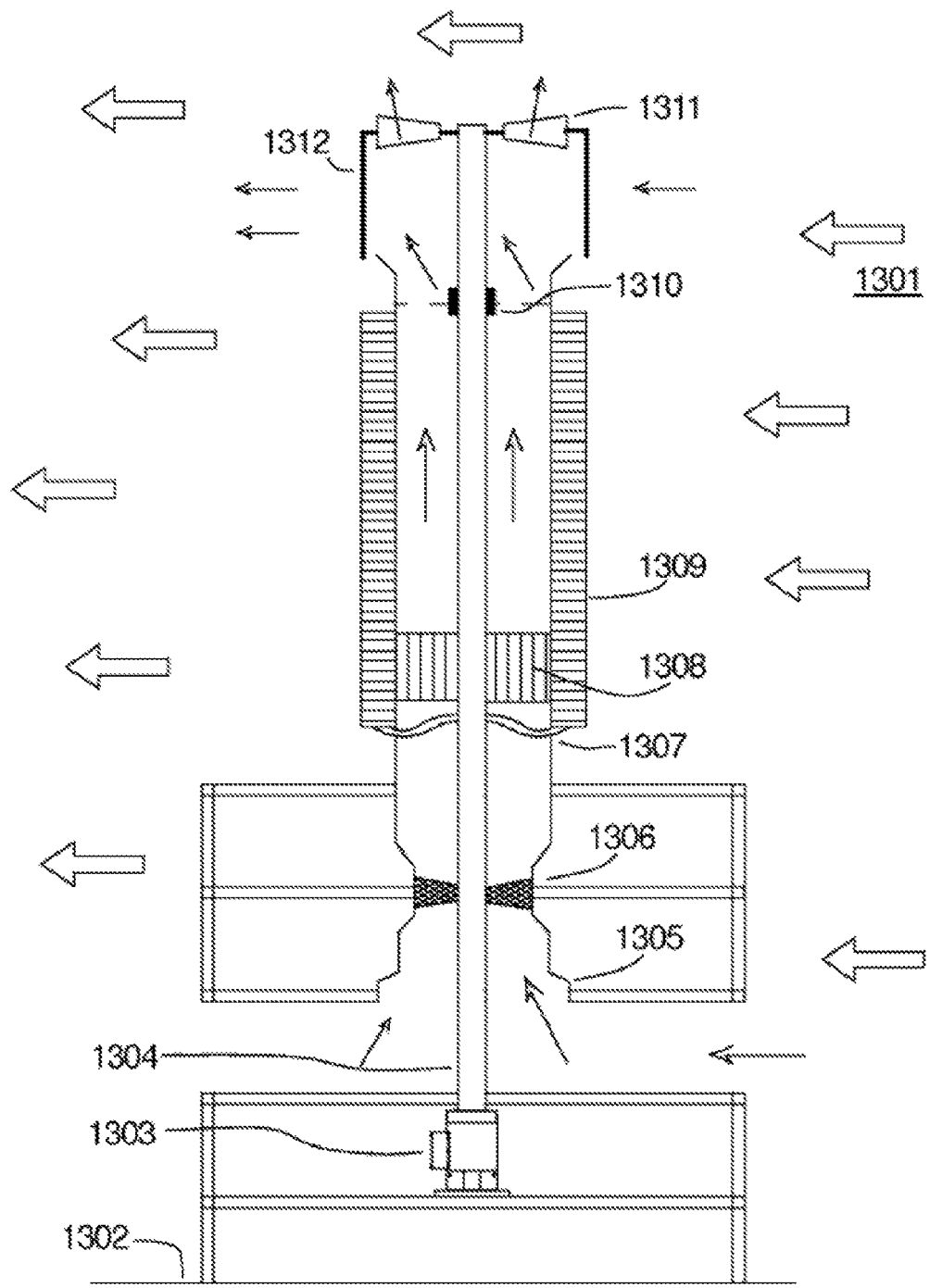
FIG. 13 is an embodiment of the present invention where the power generating equipment is staged on a roof in a split air turbine design where heating of the air flow is utilized.

FIG. 13 is another embodiment of the present invention where the flow is staged on a roof in a split air turbine (or split air blade) design. There are two air blade assemblies (or air turbines) and the air is heated in between the lower air blades and the upper air blades to provide a velocity boost. The heat provides an increased pressure differential across the entire system from the inlet to the outlet, as well as through the upper air blades or air turbine assembly. The heat is preferably solar, but may additionally be from other sources that include fossil fuels, preferably clean burning fossil fuels. In this embodiment, the prevailing wind 1301 impinges on the power generation assembly which is mounted on a roof top 1302, or near the upper portion of a building where there is available prevailing wind air flow. The electrical generator 1303 is driven by a main power shaft 1304 which runs upwardly through the split air blade (or air turbine) design. A flow tube 1305 directs air from the prevailing wind through the lower air blades 1306 and then upwardly through a heat exchanger 1308 which is fed by a heated fluid from solar panels 1309 and lower piping. An initial heating surface 1307 in the flow tube is shown. Alternatively, the exterior of the vertical air flow between the split air blade design could be insulated and the heat exchanger between the split air blades could be heated by another source, such as fossil fuel or waste building heat. The air flow is then directed upwardly toward the upper air blades 1311, and then outwardly into the prevailing wind. An upper support 1310 is provided for the main power shaft to steady it. The support is designed to allow free air flow.

The waste building heat could come from sources such as heating and air conditioning, hot water heating, kitchens and laundries, existing blowers/exhausts/air movers, other building heat sources, available steam being vented, etc.

In this embodiment, the additional pressure differential created by the chimney effect drives the air flow, but the externally heated air flow which enters the top chamber 1312 is optionally used to create an induced draft.

In another embodiment, the heat put into the vertical moving air comes from secondary air sources within the building that have heat in them and the secondary air is directly injected into the vertical moving air. Thus, the heat in the vertical moving air is indirect (heat exchanger) or direct (injected).

As used herein, an inflow chamber is defined as a chamber wherein the prevailing wind enters and subsequently passes through a flow tube, and into air blades. In some embodiments air deflectors and/or a flow tube may further direct the air or wind into the air blades.

As used herein, an outflow chamber is defined as a chamber where air from the flow tube exits the wind power enhancer system. The outflow chamber may comprise air out-flow dampers are configured to only let air out of the chamber and thereby prevent air flow from the prevailing wind from entering. In another embodiment, an outflow chamber is configured as an impingement chamber, whereby air blades extend at least partially into the outflow chamber and air from the prevailing wind enters and impacts the air blades. An outflow chamber may be any suitable structure and may be a fixed structure, as defined herein, and may be configured to rotate either automatically or passively as a function of the prevailing wind direction, or through any other suitable control, including manually.

As used herein, an impingement chamber is defined as a type of outflow chamber wherein the prevailing wind enters and subsequently impacts the air blades. In some embodiments air deflectors may be configured as wind concentrators in the impingement chamber to further direct the air or wind into the air blades. Air from the prevailing wind may enter a portion of the impingement chamber and air may exit or outflow from the impingement chamber.

As used herein, a wind energy power enhancer system, utilizes either a single phase or multi-phased wind power generating system, as described herein, that may be configured in any suitable orientation and comprise a single inflow chamber, an optional outflow chamber or a dual inflow or dual outflow chamber.

As used herein, a dual wind energy power enhancer system utilizes either a single phase or multi-phased wind power generating system, as described herein, and is configured with either a dual inflow chamber or a dual outflow chamber.

As used herein, the term single phase wind power generating system, is a power generating system as described herein that utilizes a single phase of wind or air flow to power the turbine, and may be of either a single or dual air flow inlet or outlet; and is used to distinguish it from multi-phased wind flow that utilizes both a first and second phase of wind flow.

As used herein, the term multi-phased, used to describe the wind power generating system, means that a combination of air flow is used to power the turbine, including air flow from an inflow chamber and a second phase air flow that further powers the air blades. In one embodiment the second phase air flow directly impinges on the air blades that may be extending at least partial from the air inflow chamber. In another embodiment air deflectors are configured to cause the second phase air flow to create low pressure, or vacuum over the flow tube. In addition, air flow to the turbine may be directed, deflected or concentrated by air deflectors.

As used herein, fixed structure is defined as an enclosed volume configured for the in-flow or out-flow of air and includes, but is not limited to an outflow chamber, an impingement chamber and an inflow chamber. A fixed structure may be configured to rotate either automatically or passively as a function of the prevailing wind direction, or through any other suitable control, including manually. A fixed structure may comprise any suitable type of structural material that defines the enclosed volume and may comprise fence material, or fencing configured over openings to the fixed structure. Air deflectors may be configured inside of a fixed structure and may be configured to extend outside of the enclosed volume of the fixed structure.

As used herein, air deflector is defined as any element that deflects, directs or concentrates the prevailing wind, second phase air flow, or simply air flow, and includes but is not limited to, drag curtains, exit barriers, scoops, sails, deflectors, wind concentrators, vortex inducers and the like, and may be rigid, or flexible, passive or controlled, fixed or configured to move, such as by rotating as a function of the prevailing wind. An air deflector may direct the air flow into or away from the enhanced multi-phased wind power generating system, and/or may concentrate the air flow to enhance power generation. For example, an air deflector may be hinged and pivot as a function of the wind direction in a passive manner. In another embodiment, an air deflector may be flexible, such as a sail or air scoop that may open or close as a function of the prevailing wind. In an alternative embodiment, an air deflector may comprise a rigid metal surface, such as a sheet of metal that may be curved or straight. In yet another embodiment, an air deflector may be fixed and may not move or rotate. In still another embodiment, an air deflector, or a plurality of air deflectors, may rotate or move automatically as a function of the prevailing wind. Air deflectors may also be positioned or configured manually. Sensors may be used to determine the prevailing wind direction and a control system may be configured to rotate air deflectors in an effort to optimize the amount of wind captured and used by the enhanced multi-phase wind power generating system.

As used herein, fence material or fencing is defined as any type of fencing or netting that may be used to allow prevailing wind to pass and provide some protection from objects passing there through. In one embodiment, the fence material has openings with a maximum dimension across the opening of no more than 0.25 inches. The maximum size of the openings in the fence may be any suitable size however, including but not limited to, no more than about 0.25 inches, no more than about 0.5 inches, no more than about 0.75 inches, no more than 1.0 inches, or any range between and including the listed dimensions. The fence material may be a metal grate or a bird screen or any other suitable material. The fence material may be rigid or flexible.

As used herein, flow tube is defined as an airflow pathway from the inflow chamber to the turbine and may consist of an opening in the separating panel or may comprise a partial enclosure, such as a cylinder, that directs, deflects or concentrates air flow from the inflow chamber to the turbine. A flow tube may extend into or out of the inflow chamber or may be an integral flow tube, wherein the inflow chamber acts as a flow tube.

A turbine, as described herein (540), may be any suitable type, and in one embodiment the turbine is a propeller or axial flow type 539 that may be configured at least partially within the flow tube, or a radial inflow 540A or radial outflow 540B type. The turbine may comprise outward or backwardly curved air vanes or blades and may be configured for direct radial or mixed axial/radial type air flow or be a mixed turbine 540C. In yet another embodiment, the turbine is a dual inlet radial outflow turbine 540D, having two separate inlets for inflow of air. A second phase of air flow may or may not be utilized in the outlet air flow or impingement chamber to implement either single or multi-phased wind flow operation. In yet another embodiment, two single inlet, radial outflow turbines are used with a single inlet chamber located between them. Again, a second phase of wind or air flow may or may not be utilized.

The air blades, as described herein, may be any suitable type and in one embodiment the air blades are one of a group comprising a: centrifugal fan, helical design, reverse flow fan design, radial fan, propeller, axial flow, cross flow, radial-inflow, radial outflow or mixed axial-radial flow, a combination type such as a combination of reaction, impulse and air foil type air blade design or a combination of backwardly-curved and air foil type blades.

Second phase air flow, as defined herein, is air flow that creates additional power but does not flow through the inflow chamber, such as air flow from the prevailing wind that impinges on the air blades directly, or air flow from the prevailing wind that is directed to create a vacuum over the flow tube, thereby creating additional power.

Figure 14A:
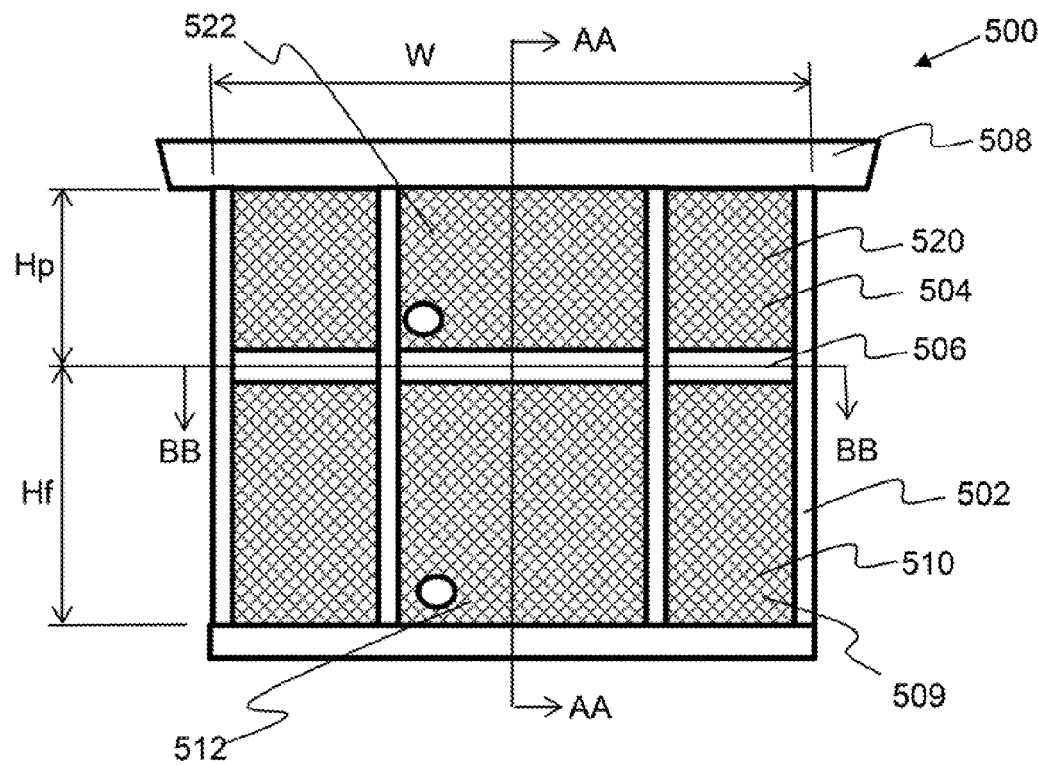
FIG. 14A is a side view of an embodiment of the present invention where the enhanced multi-phased power generating system comprises an inflow chamber and an impingement chamber.

As depicted in FIG. 14A, the enhanced multi-phase wind power generating system 500 comprises two chambers, an inflow chamber 510, and an impingent chamber 520. The impingement chamber is connected with or attached to the inflow chamber, and a separation panel 506 divides the two chambers. The configuration of the enhanced multi-phase wind power generating system is vertical, as depicted, wherein the axis of the turbine is vertical. A flow tube, not shown in FIG. 14A, is configured through the separation panel and between the two chambers. The chambers are comprised of a fixed structure 502 and a fence material 504 that covers the openings 509 to the chambers. Openings include the spaces between the fixed structure supports. The fence material may completely surround a chamber, or may cover an opening to a chamber that is exposed to the outdoors. To meet some building regulations the enhanced multi-phase wind power generating system may be completely enclosed wherein there is not a large opening from a chamber to the outdoors, thereby preventing animals from getting into the enhanced multi-phase wind power generating system. In some cases, a chamber may have openings that are in communication with an interior space, such as an attic or some other space. The enhanced multi-phase wind power generating system comprises a roof 508 positioned over the impingement chamber, as shown in FIG. 14A. Furthermore, as shown in FIG. 14A, both chambers comprise an access door, 512, 522 whereby the chambers may be easily accessed for service and/or repair, for example.

Figure 32:
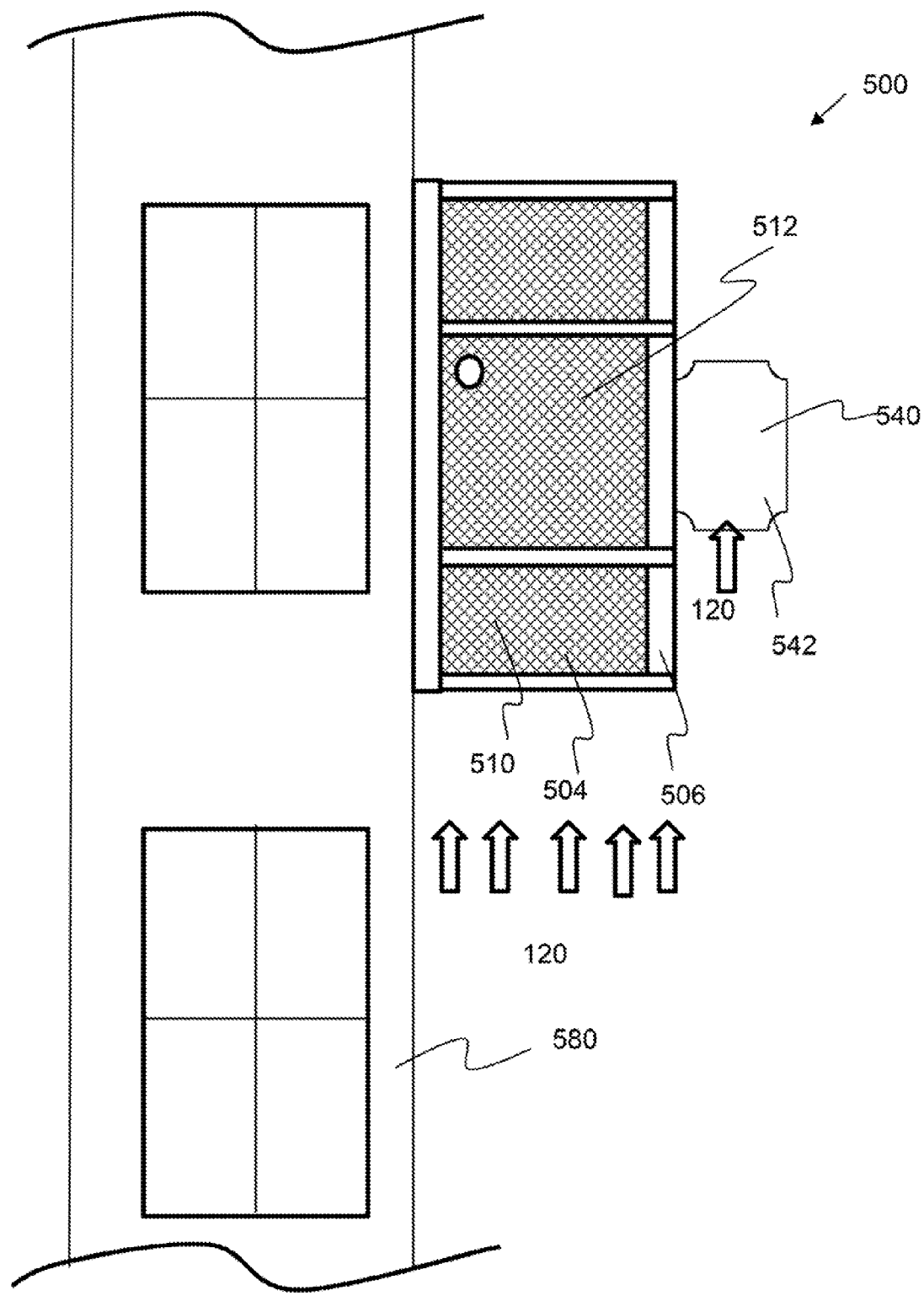
FIG. 32 is a side view of an enhanced multi-phased wind power generating system configured horizontally on the side of a building.

As depicted in FIG. 14A, the inflow chamber 510 is configured below the impingement chamber 520. However, any suitable configuration may be used. For example, the impingement chamber may be configured below the inflow chamber. In addition, the enhanced multi-phase wind power generating system may be configured in any suitable orientation, such as vertically, as shown in many figures herein, horizontally, or any other orientation. In one embodiment, the enhanced multi-phase wind power generating system may be mounted on the side of a building, such as a high rise building, where even vertically directed high wind air speeds are common, as shown in FIG. 32.

Figure 14B:
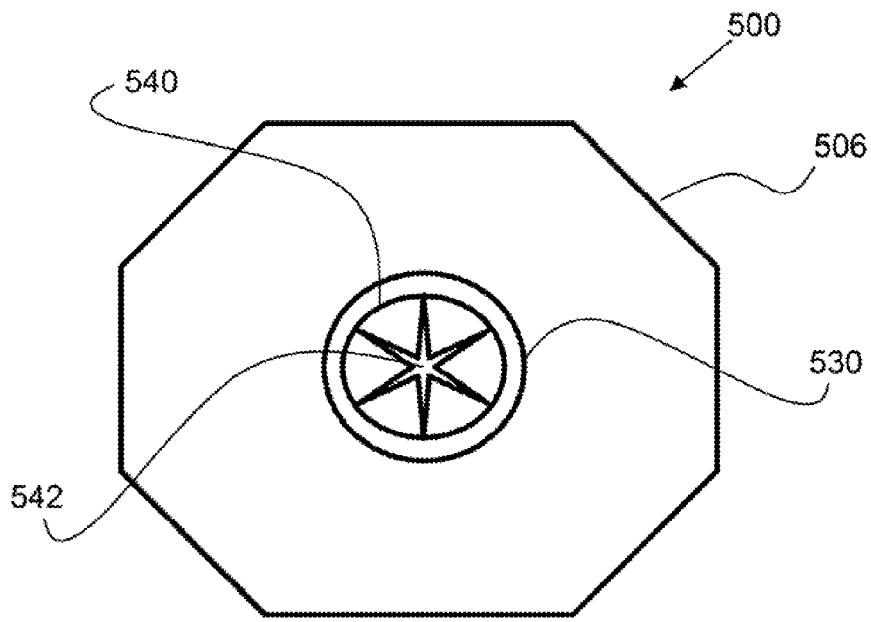
FIG. 14B is a top down view of the enhanced multi-phased wind power generating system shown in FIG. 14A.

The enhanced multi-phased wind power generating system and/or the chambers may have any suitable shape including square, rectangular, circular, or have one or more curved surfaces, or be a polygon, such as an octagon shown in FIG. 14B. In addition, an inflow chamber may have a different shape and/or size than the impingement chamber. In one embodiment, the inflow chamber is an octagon shape and the impingement chamber is circular and smaller in width or diameter than the inflow chamber. The height of the chambers may be any suitable dimension and the inflow chamber may have a larger height than the impingement chamber and vice versa. The height of the inflow chamber $H_f$ and impingement chamber $H_p$ may be any suitable value including, but not limited to, greater than about 2 ft, greater than about 4 ft, greater than about 6 ft, greater than about 8 ft, greater than about 10 ft, greater than about 15 ft, greater than about 20 ft, and any range between and including any of the listed heights. The width of the enhanced multi-phased wind power generating system W, which may be defined as the largest dimension across the inflow or impingement chamber, may be any suitable dimension including, but not limited to, greater than about 2 ft, greater than about 4 ft, greater than about 6 ft, greater than about 8 ft, greater than about 10 ft, greater than about 15 ft, greater than about 20 ft, and any range between and including any of the listed widths.

Figure 15:
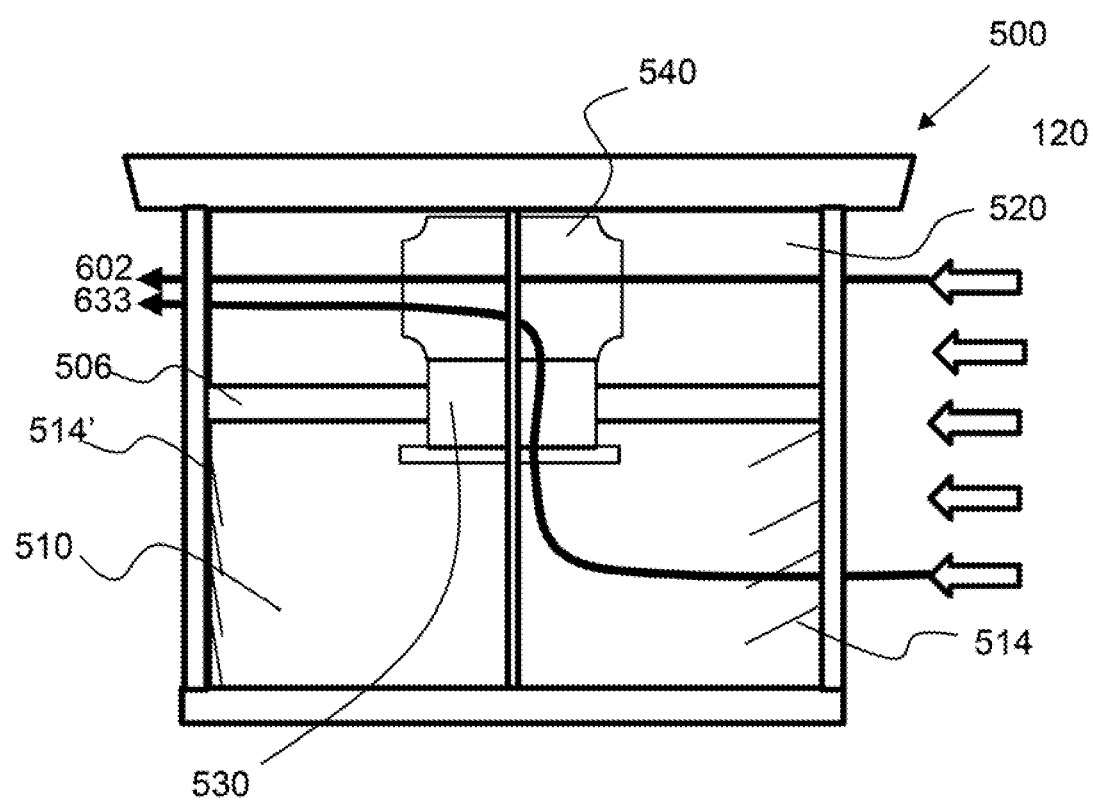
FIG. 15 is a cross-sectional side view of the enhanced multi-phased wind power generating system shown in FIG. 14A.

Depicted in FIG. 14B is a cross-sectional view taken along line BB of FIG. 14A that depicts the separation panel 506 with a flow tube 530 therein. A turbine 540 and air blades 542 are depicted as configured over the flow tube 530, as shown in FIG. 15. The turbine in FIG. 14A, FIGS. 14B and 15 is a radial outflow type air turbine, however an axial flow type turbine may be employed having at least a portion of the air blades exposed in the impingement chamber 520. The impingement chamber 520 may employ several methods for obtaining the second, phase of wind or air flow which is an integral part of its design. These methods may consist of use of combined partial air curtains and open spaces, wind concentrators, deflectors or air scoops or drag curtains to accomplish the multi-phased effect within or surrounding the basic impingement chamber itself.

Depicted in FIG. 15 is a cross-sectional view taken along line AA of FIG. 14A that depicts one method in which the multi-phased wind injection technology may be employed. This cross-section shows the flow direction of the prevailing wind 120 and the air flow path 633 through the enhanced multi-phased wind power generating system 500. The prevailing wind 120 enters the inflow chamber 510 through a plurality of passive air in-flow dampers 514, and then passes through the flow tube 530, through the radial out flow turbine 540B and out of the impingement chamber 520, making an S shape shown by solid air flow line 633. The passive air inflow dampers 514 open with the prevailing wind, and close to prevent the exit of the air from the inflow chamber, as shown by the closed passive air in-flow dampers 14'. This causes a pressure increase in the inflow chamber and forces the air flow through the flow tube and through the turbine. The passive air inflow dampers may be any suitable material such as, but not limited to, plastic sheet or film, metal sheet, a fabric, and may be rigid or flexible. In one embodiment, the passive air inflow dampers of the inflow chamber are plastic sheets that are configured on the inside of the fixed structure, or on the inside of fencing material. A plurality of passive air inflow dampers may be configured in any suitable manner. In a preferred embodiment, a plurality of passive air inflow dampers 514' are configured out of lightweight flexible material to overlap and provide an effective seal against the fence material, and effectively prevent air flow from exiting the inflow chamber directly back to the atmosphere, as shown in FIG. 15. The prevailing wind 120 also enters the impingement chamber and impinges on the air blades as it passes through the impingement chamber, an example of second phase air flow 602.

Figure 16A:
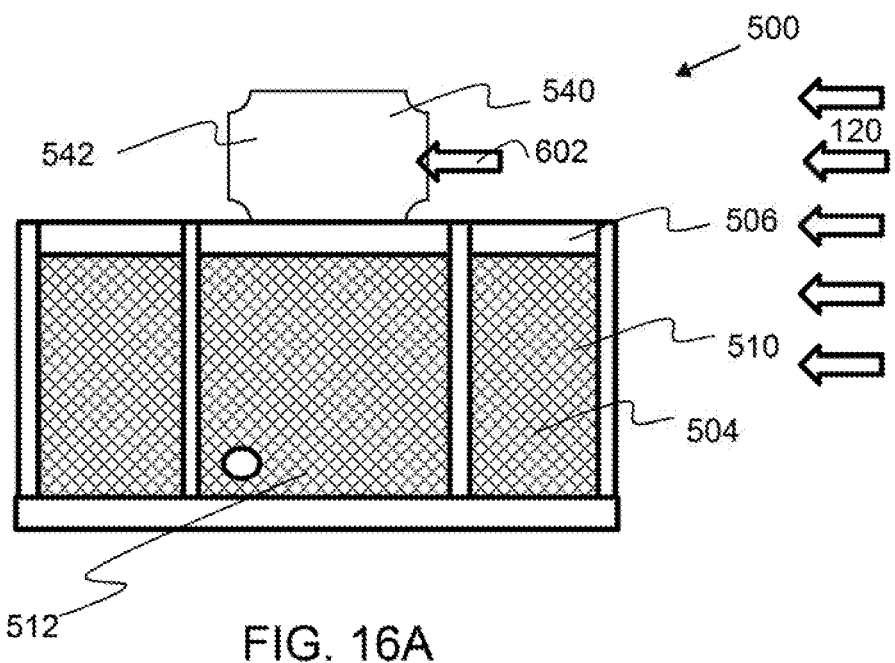
FIG. 16A is a side view of an enhanced multi-phased wind power generating system having an inflow chamber and a turbine extending therefrom.
Figure 16B:
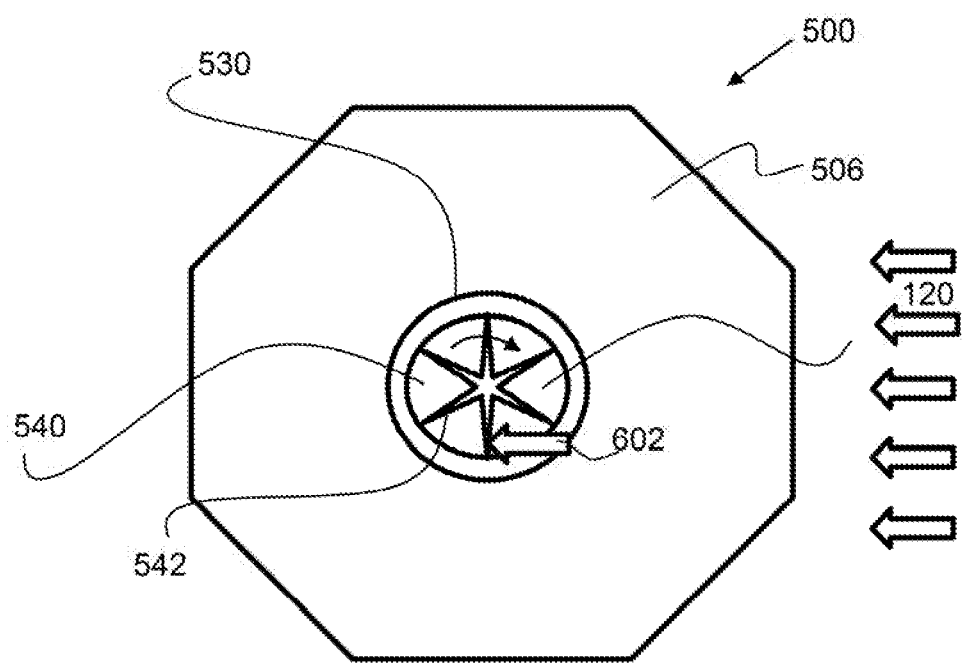
FIG. 16B is a top down view of the enhanced multi-phased wind power generating system shown in FIG. 16A.

As depicted in FIG. 16A, the enhanced multi-phased wind power generating system 500 is comprised of an air inflow chamber 510, but does not comprise an impingement chamber. The second phase air flow 602, from the prevailing wind 120 impinges directly on the air blades 542. A top down view of the enhanced multi-phase wind power generating system shown in FIG. 16A is depicted in FIG. 16B.

Figure 17:
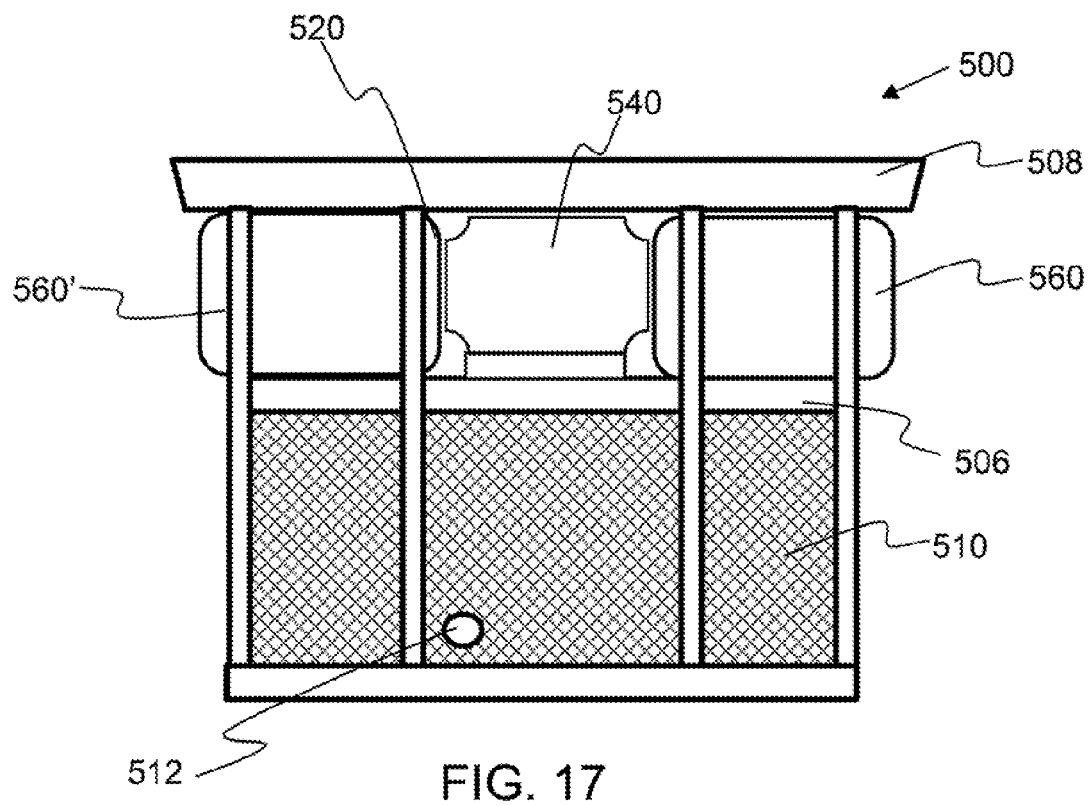
FIG. 17 is a side view of an enhanced multi-phased wind power generating system having a plurality of air deflectors.

As depicted in FIG. 17, the enhanced multi-phased wind power generating system comprises an inflow chamber 510, and an impingement chamber 520. The inflow chamber has fence material 504, whereas the impingement chamber does not. A plurality of air deflectors 560 are depicted being configured around the turbine 540B and partially within the impingement chamber 520. Any number of air deflectors may be configured around the turbine 540B, and, depending on the prevailing wind direction, some of the air deflectors may concentrate the wind and some may deflect the wind. As described herein, an air deflector may be any element that deflects the prevailing wind and includes, but is not limited to, drag curtains, exit barriers, scoops, sails, and the like. An air deflector may direct the prevailing wind into or away from the enhanced multi-phased wind power generating system, and may concentrate the wind to enhance power generation. An air deflector may be within a chamber or may be configured on the outside of a chamber or on the exterior of the fixed structure. In addition, an air deflector may extend from within a chamber as shown in FIG. 17.

Figure 18:
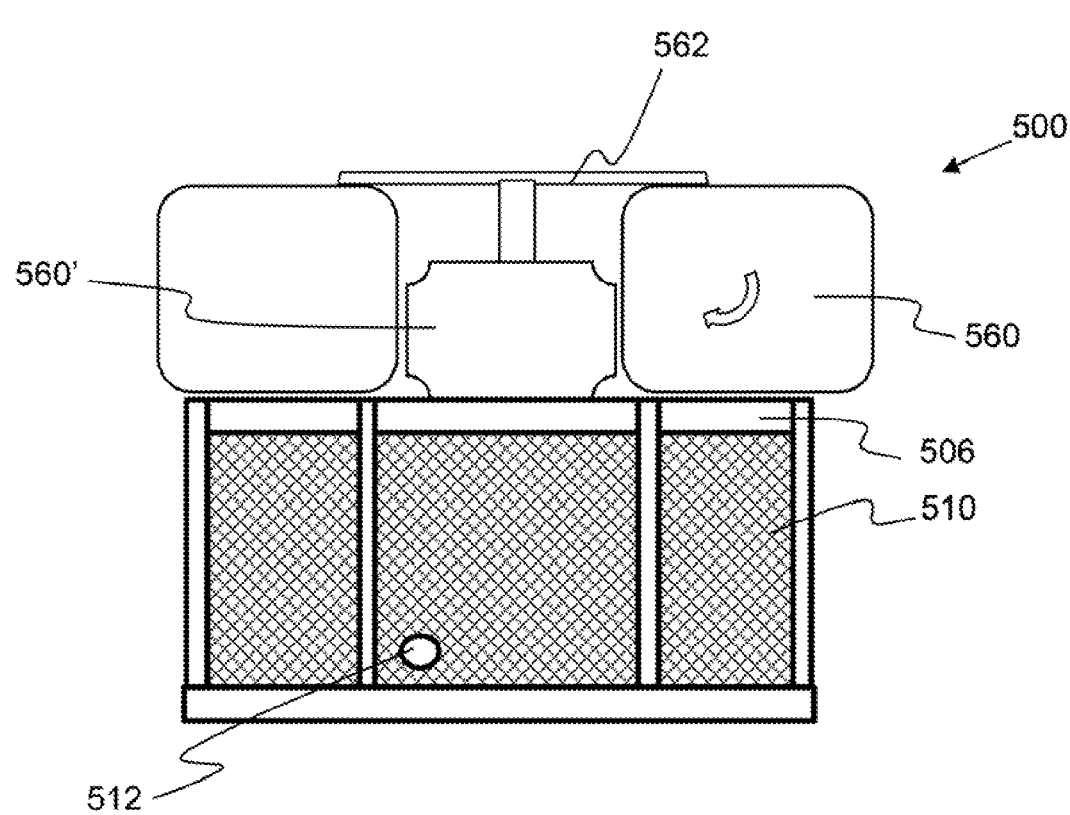
FIG. 18 is a side view of an enhanced multi-phased wind power generating system having a plurality of air deflectors attached and configured to move as a function of the prevailing wind direction.

As depicted in FIG. 18, a plurality of air deflectors are attached by an attachment feature 562, and are configured to move as a function of the prevailing wind direction. The air deflectors may be configured to move as a function of the prevailing wind direction to enhance or optimize the power generated by the enhanced multi-phased wind power generating system.

Figure 19:
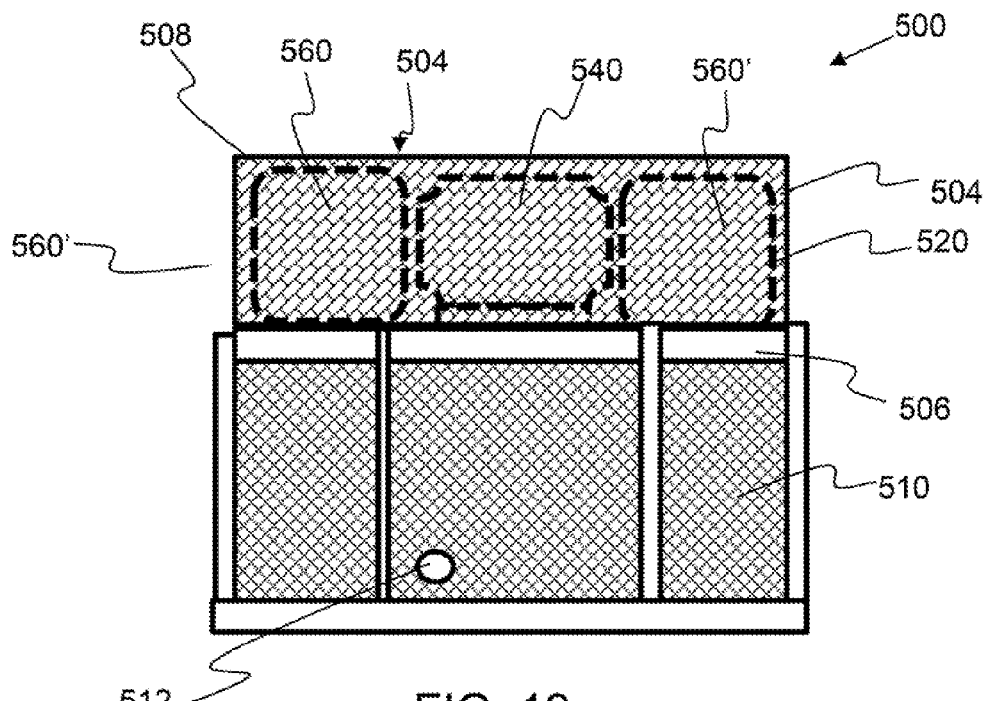
FIG. 19 is a side view of an enhanced multi-phased wind power generating system having a plurality of air deflectors configured within the impingement chamber and a fence material covering an impingement chamber.

FIG. 19 shows a side view of an enhanced multi-phased wind power generating system 500 having a plurality of air deflectors 560, 560 configured within the impingement chamber 520 and a fence 504 material covering an impingement chamber. The fence material may cover at least a portion of the sides and top of the impingement chamber, thereby providing for low resistance to flow coming from the inflow chamber. The impingement chamber 520 shown in FIG. 19 has a roof comprised of open space covered with fence material.

Figure 20:
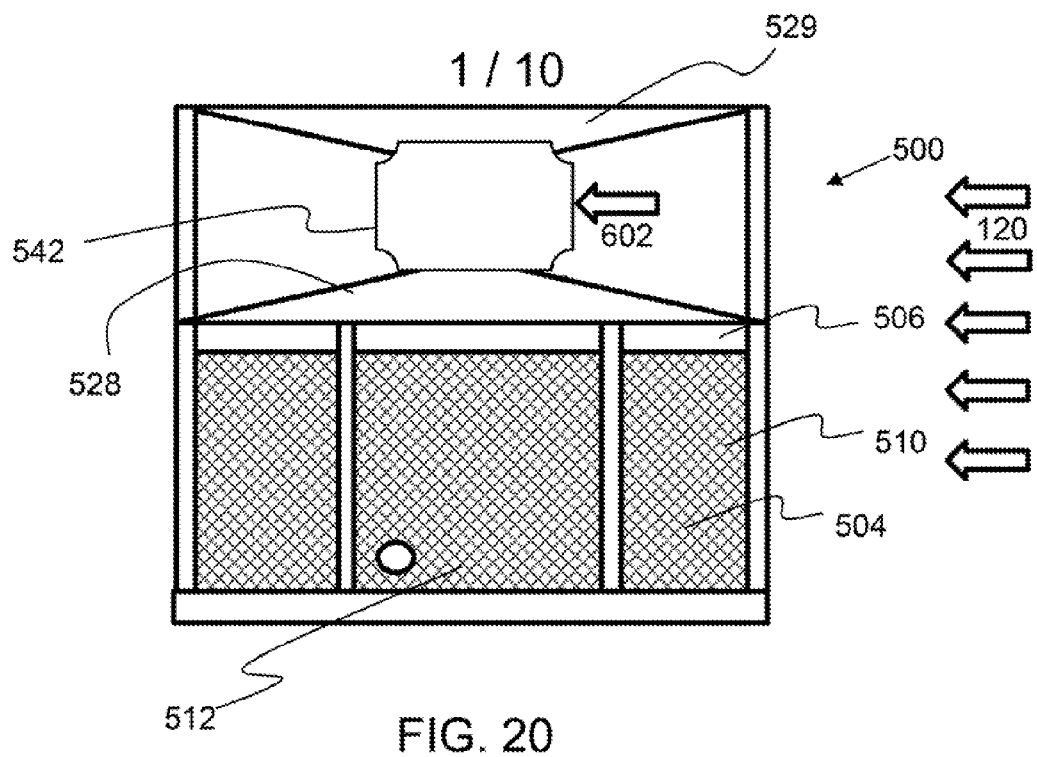
FIG. 20 is a side view of an enhanced multi-phased wind power generating system having an angled surface that extends to the turbine creating a venturi.

FIG. 20 shows a side view of an enhanced multi-phased wind power generating system having an angled surface that extends to the turbine creating a venturi effect. The angle of the surfaces may be any suitable angle and the surfaces may be straight or curved. In a preferred embodiment, the surfaces are at an angle of no more than 15 degrees, or 30 degrees included when there is a top flow concentrating surface 529 and bottom concentrating surface 528. The venturi effect may increase the flow velocity of the second phase air flow 602 and thereby create more power.

Figure 21:
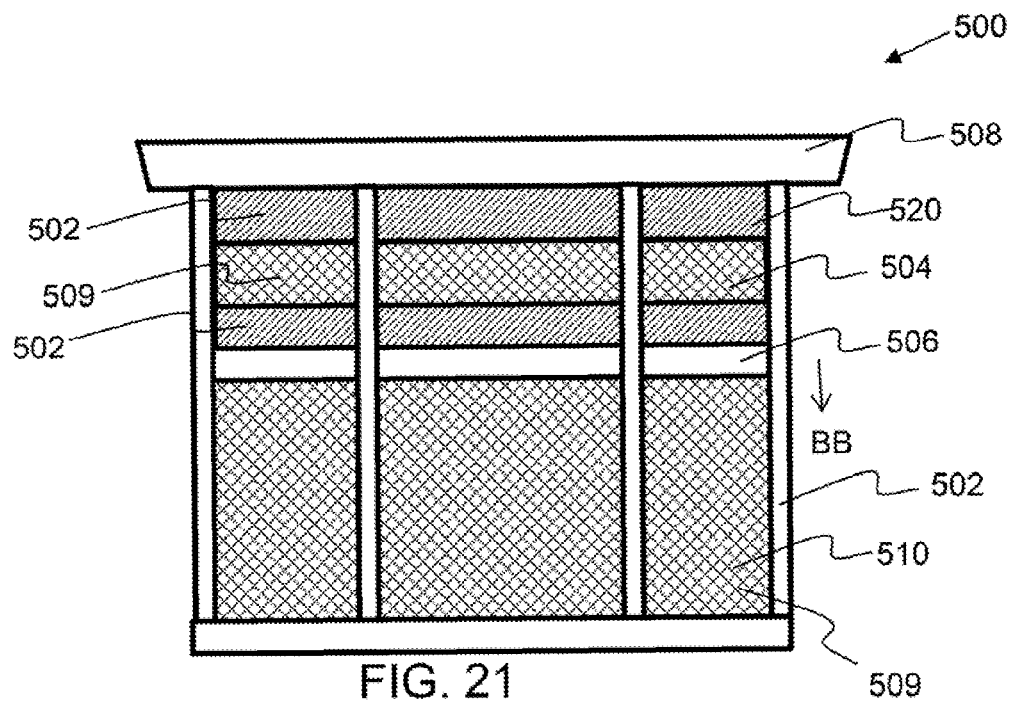
FIG. 21 is a side view of an enhanced multi-phased wind power generating system having an impingement chamber with a fixed structure closing off a portion of the open area, and fence material covering all openings around the impingement chamber.

FIG. 21 shows a side view of an enhanced multi-phased wind power generating system having an impingement chamber 520 with a fixed structure 502 closing off a portion of the open area 509, and fence material 504 covering all the openings around the impingement chamber. A slotted opening in the impingement chamber may provide for less turbulence and better control of the second phase air flow through the chamber.

Figure 22:
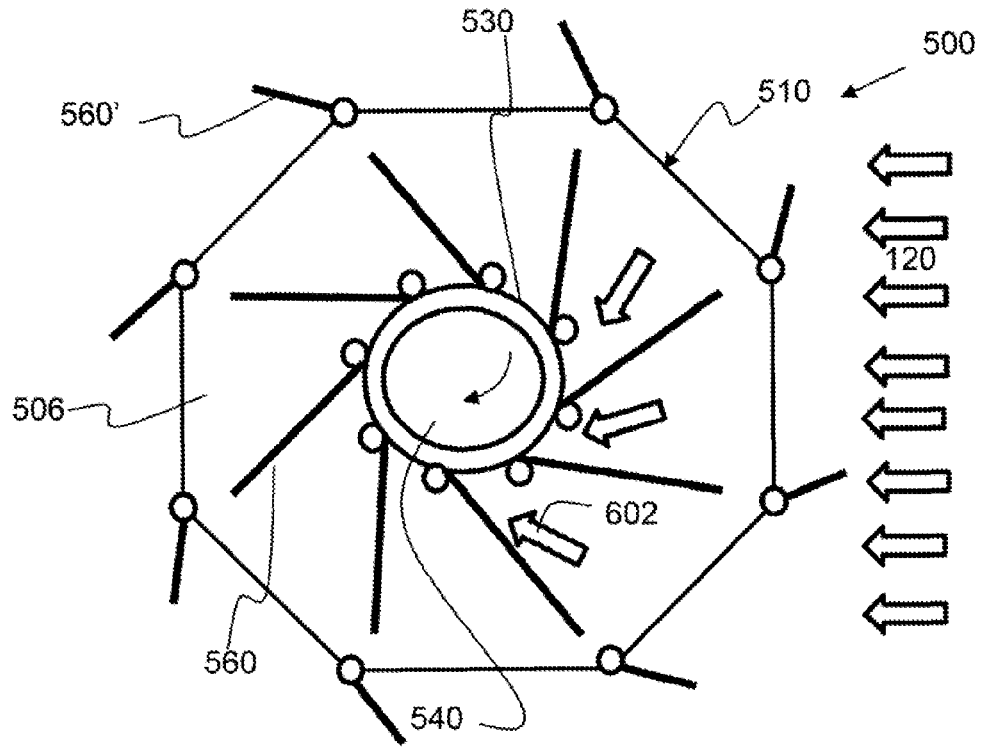
FIG. 22 is a top down view of an enhanced multi-phased wind power generating system having a plurality of air deflectors extending from the turbine, and a plurality of air defectors extending from the chamber.

FIG. 22 shows a top down view of an enhanced multi-phased wind power generating system having a plurality of air deflectors 560 extending from the turbine, and a plurality of air defectors 560' extending from the chamber. Any number of air deflectors may be configured within, on or attached to and extending from a chamber or they may be configured in any number of ways around the turbine.

Figure 23:
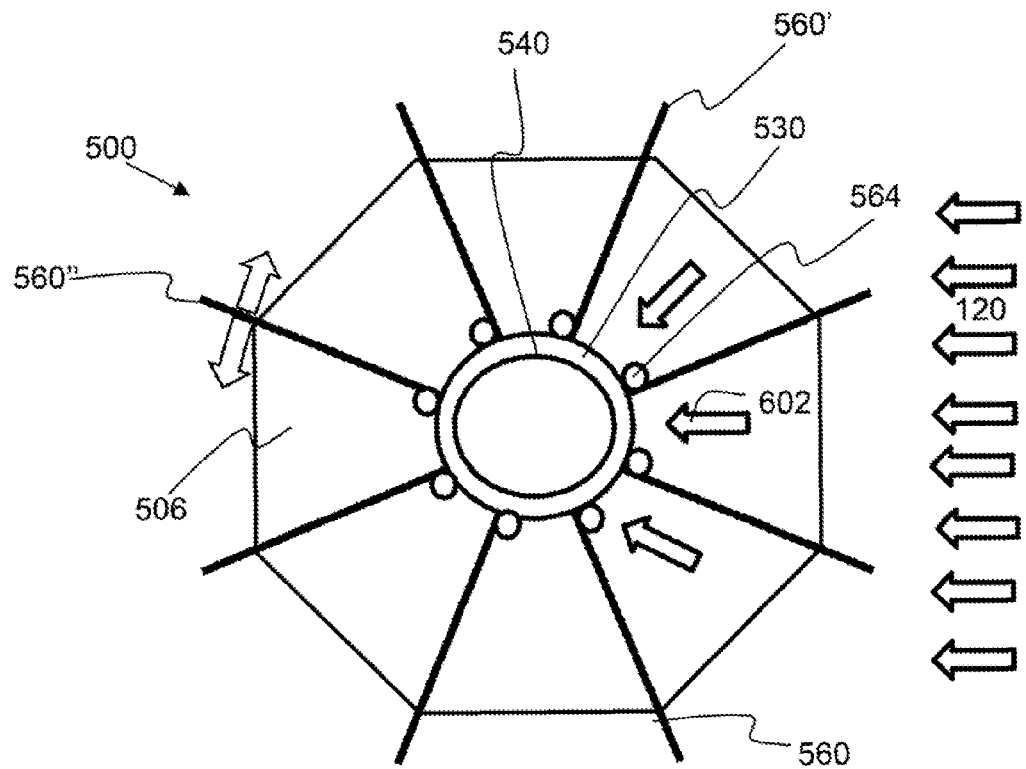
FIG. 23 is a top down view of an enhanced multi-phased wind power generating system having a plurality of air deflectors configured around the turbine.
Figure 24:
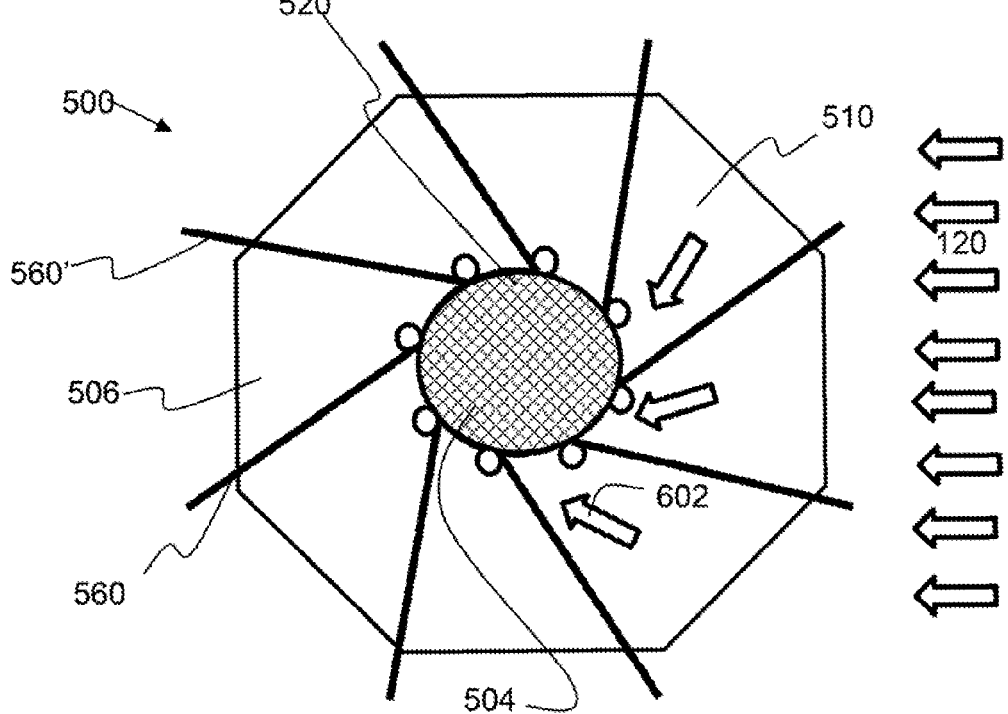
FIG. 24 is a top down view of an enhanced multi-phased wind power generating system having a plurality of air deflectors configured around the turbine.

FIG. 23 shows a top down view of an enhanced multi-phased wind power generating system having a plurality of air deflectors 560 extending radially out from the turbine 540B. The prevailing wind between air deflectors 560 and 560' is deflected into the air turbine to become second phase air flow 602. A pivot point 564 provides for movement or rotation of the air deflectors as depicted by the arrows on air deflector 560". As shown in FIG. 24, the air deflectors 560 have been rotated to enhance the flow of second phase air through the turbine. In addition, a small impingement chamber 520 is depicted covering the turbine that extends out of the inflow chamber. The impingement chamber shown in FIG. 24 consists of fencing material configured around the turbine. The air deflectors shown in FIG. 23 and FIG. 24, both extend beyond the inflow chamber.

Figure 25:
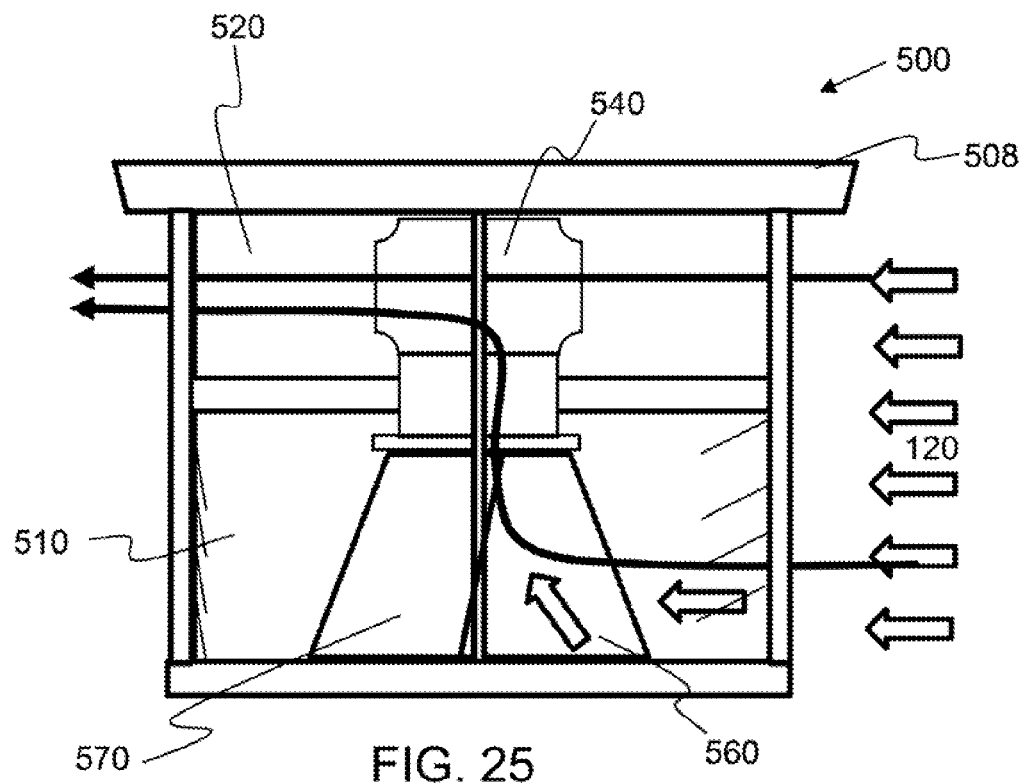
FIG. 25 is a cross-sectional side view of an enhanced multi-phased wind power generating system having an air scoop configured inside of the inflow chamber.

As depicted in FIG. 25, an air scoop 570 type air deflector 560 is configured within the inflow chamber 510. The prevailing wind 120 enters the inflow chamber 510 and is concentrated by the air scoop 570. The air passes through the flow tube and through the turbine before exiting out of the impingement chamber 520. An air scoop with an inflow chamber may be configured to move or rotate with the air flow into the inflow chamber. Passive outflow air dampers 526 are shown being opened by the air flow out of the impingement chamber. An impingement chamber may comprise any number of passive outflow dampers, and these dampers may be configured to pivot away from the chamber, thereby allowing air flow to freely exit the impingement chamber.

Figure 26:
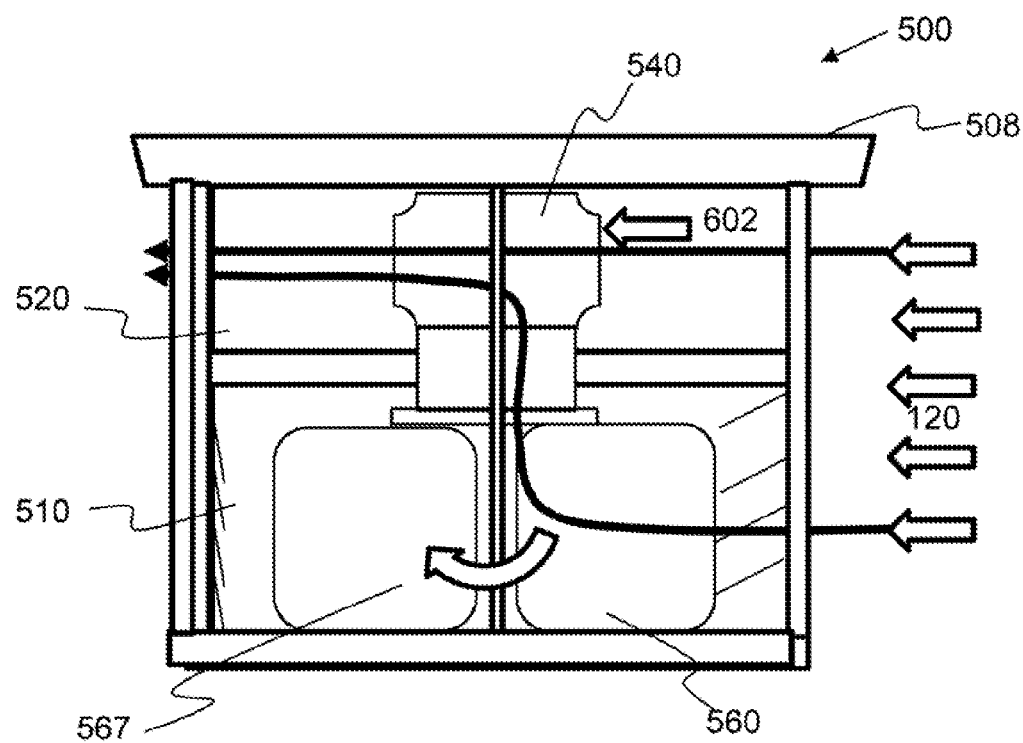
FIG. 26 is a cross-sectional side view of an enhanced multi-phased wind power generating system having a plurality of air deflectors attached and configured to move as a function of the prevailing wind direction.

As depicted in FIG. 26, a plurality of air deflectors 560, 560' are configured within the inflow chamber 510. The air deflectors depicted are attached and are configured to rotate to enhance air flow through the flow tube.

Figure 27A:
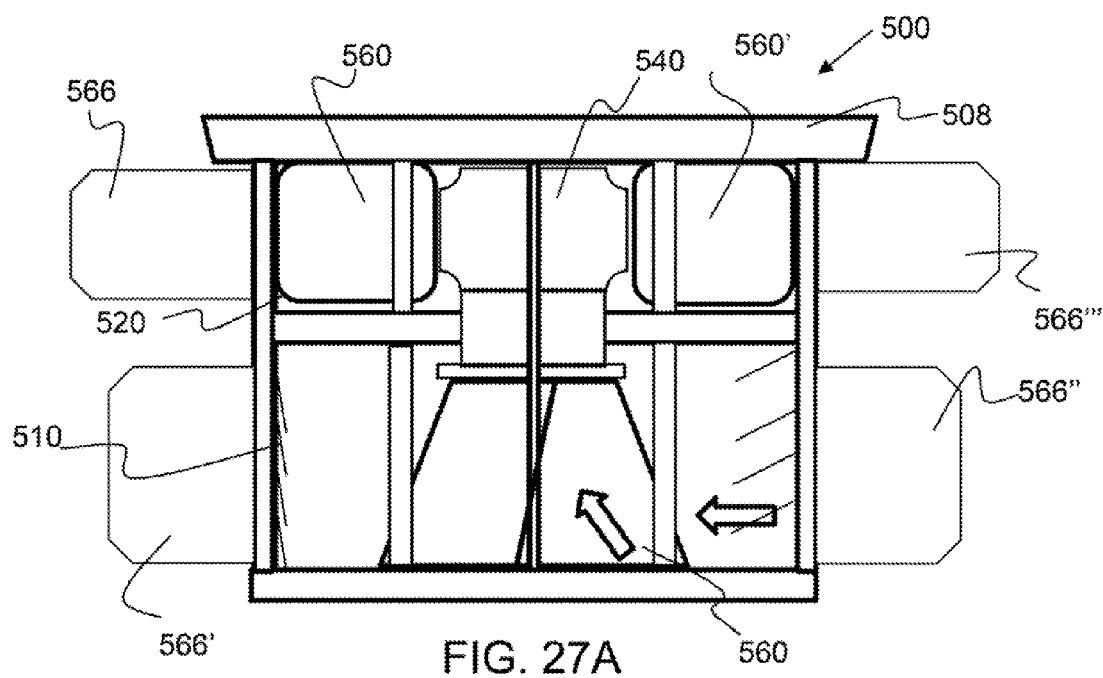
FIG. 27A is cross-sectional side view of an enhanced multi-phased wind power generating system having an air scoop configured inside of the inflow chamber and a plurality of air deflectors configured on the exterior of the chambers. Flexible air curtains or sheets are also shown.
Figure 27B:
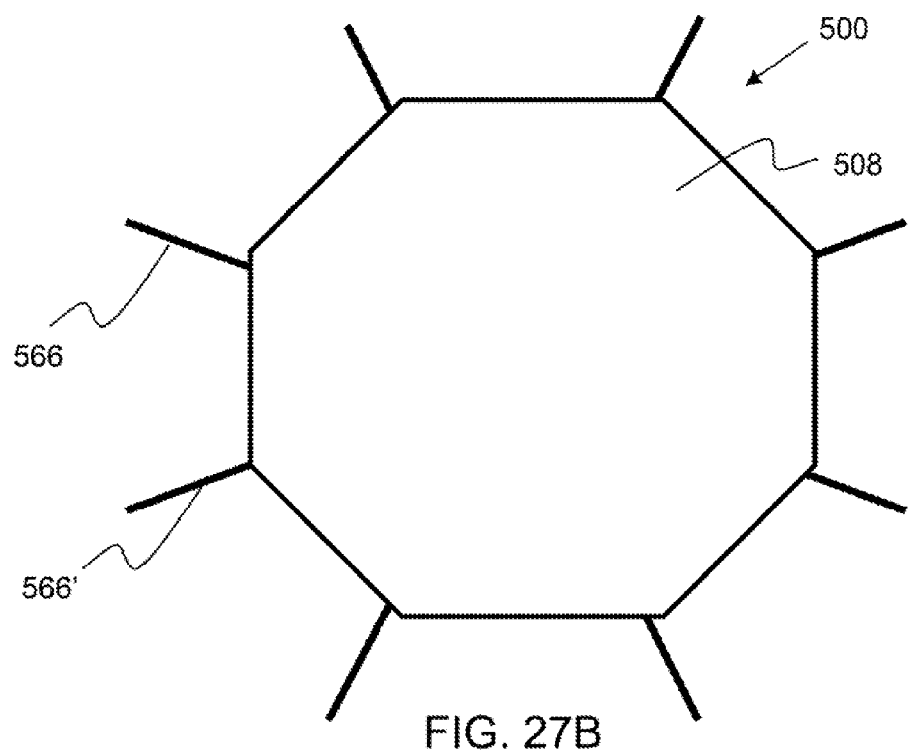
FIG. 27B is a top down view of the enhanced multi-phased wind power generating system shown in FIG. 27A.

As depicted in FIG. 27A, a plurality of air deflectors 560-560', are configured on the inside of the impingement chamber, and a plurality of external inflow air deflectors 566-566''' are configured outside of the inflow chamber and impingement chamber. Any number of air deflectors may be configured within a chamber, or outside of the chamber or fixed structure. As depicted in FIG. 27A, different types of air deflectors may be configured within or around the inflow chamber and the impingement chamber. FIG. 27B is a top down view of the enhanced multi-phased wind power generating system shown in FIG. 27A.

Figure 28:
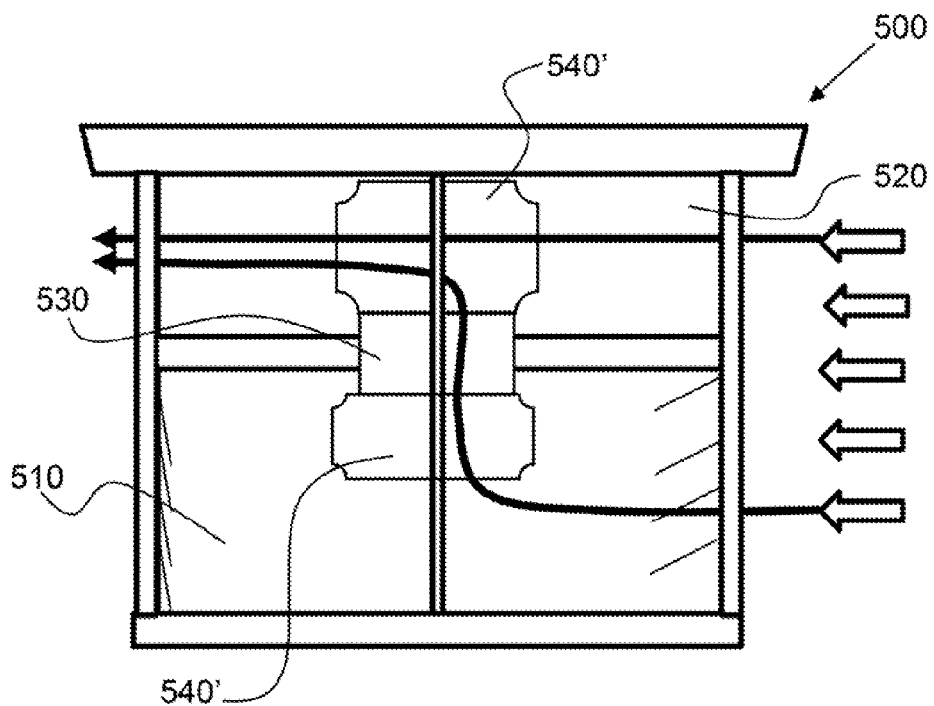
FIG. 28 is cross-sectional side view of an enhanced multi-phased wind power generating system having two turbines configured around a common axis.
Figure 29:
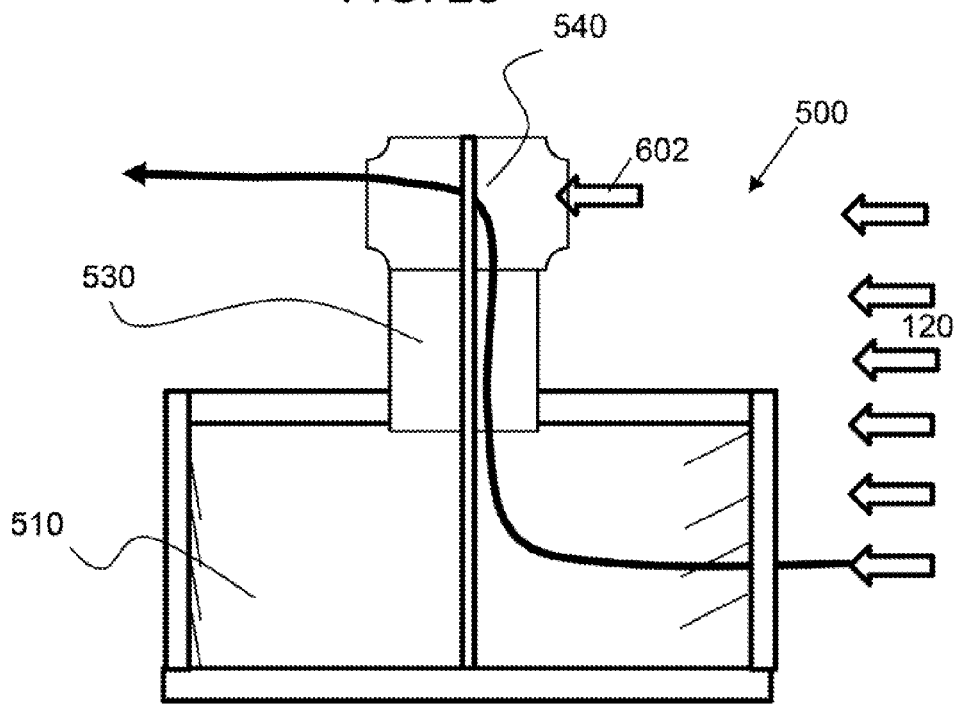
FIG. 29 is a cross-sectional side view of an enhanced multi-phased wind power generating system having a flow tube extending from the inflow chamber.

FIG. 28 depicts an enhanced multi-phased wind power generating system having two turbines configured about the same axis. One turbine 540A is configured in the inflow chamber in a radial in flow application and the other radial out flow turbine 540B is configured in the impingement chamber. The turbine may be configured in any suitable location. In one embodiment, the turbine is configured completely outside of the inflow chamber and connected with a flow tube as shown in FIG. 29. The flow tube may extend from the inflow chamber any suitable amount. In some cases, it may be advantageous to extend the flow tube such that a turbine connected at the extended end may be exposed to more wind flow. In another embodiment, the turbine 540 is configured within the flow tube and partially extends from the inflow chamber 510 as shown in FIG. 30.

Figure 30:
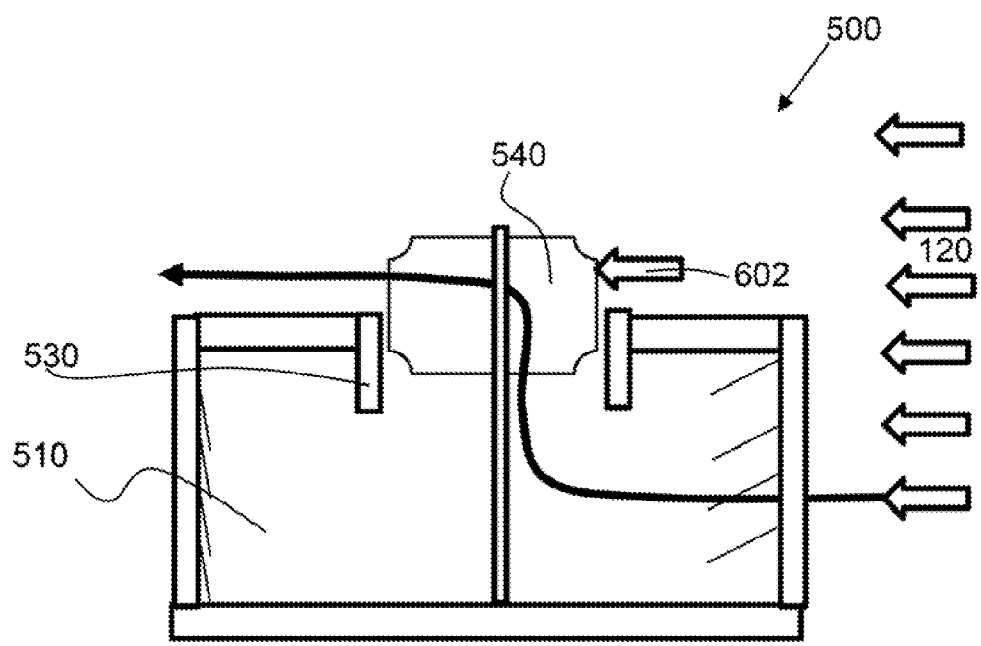
FIG. 30 is a cross-sectional side view of an enhanced multi-phased wind power generating system having a turbine configured within a flow tube and partially extending into the prevailing wind.

FIG. 30 shows a cross-sectional side view of an enhanced multi-phased wind power generating system 500 having a turbine 540 of combined axial-radial outflow design configured within a flow tube with the radial flow portion of the turbine partially extending from the inflow chamber and into the prevailing wind 120 where second phase air flow 602 may directly impinge on the air blades.

Figure 31:
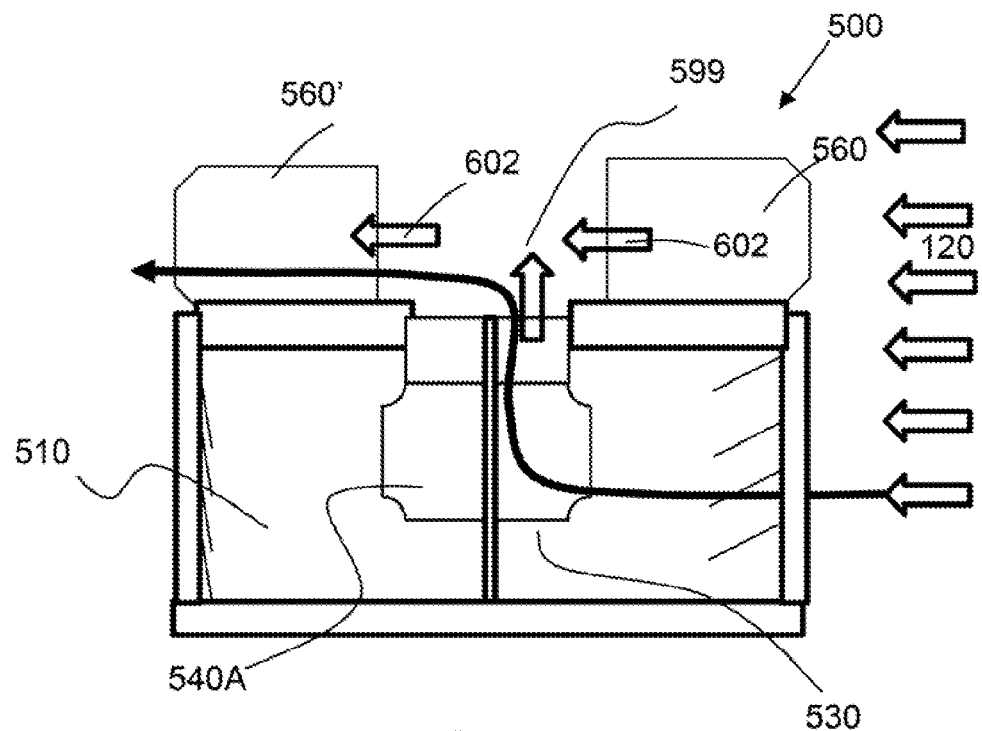
FIG. 31 is a cross-sectional side view of an enhanced multi-phased wind power generating system having a turbine configured within the inflow chamber and a configuration of air deflectors to create a low pressure over the flow tube.

FIG. 31 shows a cross-sectional side view of an enhanced multi-phased wind power generating system 500 having a radial inflow type turbine 540A configured within the inflow chamber and a configuration of air deflectors 560 to create a low pressure 599 over the flow tube. Any number of configurations of air deflectors may be used to create low pressure or vacuum over the flow tube. A vortex type air flow is one example. The vortex phase of the wind creates a low pressure or vacuum 599 which causes the turbine to spin faster and creates more power thereby creating a multi-phased wind power generation system. As shown in FIG. 31, a first phase of wind flow through the turbine and the flow tube, and a vortex phase creates a low pressure over the flow tube to enhance flow and power.

As depicted in FIG. 32, an enhanced multi-phased wind power generating system 500 is mounted or attached to the side of a building 580 in a horizontal configuration. The axis of the turbine is in a horizontal configuration. Mounting the enhanced multi-phased wind power generating system on the side of a building and especially significantly elevated from ground level, may provide for higher and more consistent wind flow for generating power. In many cities, there is a strong and often sustained upward wind flow along the face of buildings. This wind flow could be harnessed by the enhanced multi-phased wind power generating system described herein to generate power.

Figure 33:
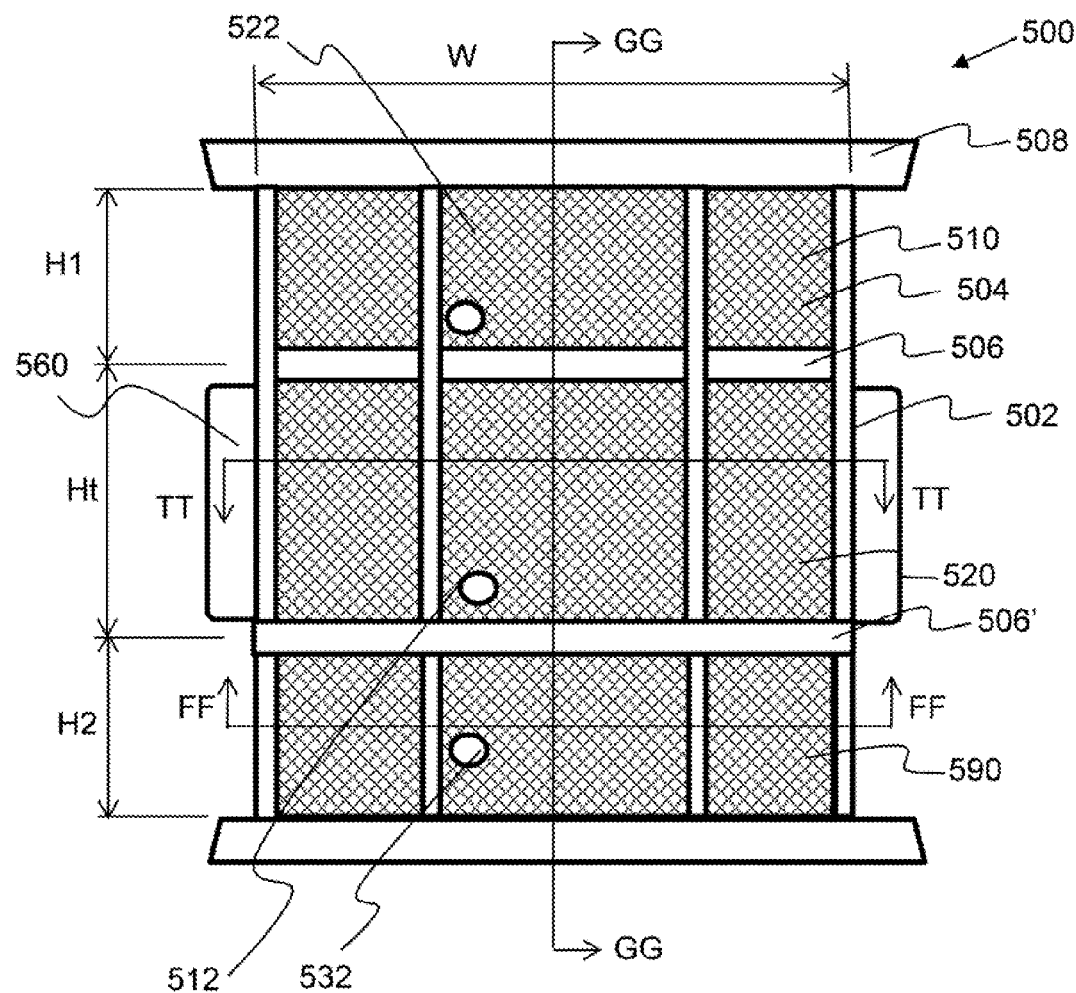
FIG. 33 is a side view of an exemplary dual wind energy power enhancer system comprising two inflow chambers and a single impingement type air outflow chamber for multi-phased air flow.
Figure 34:
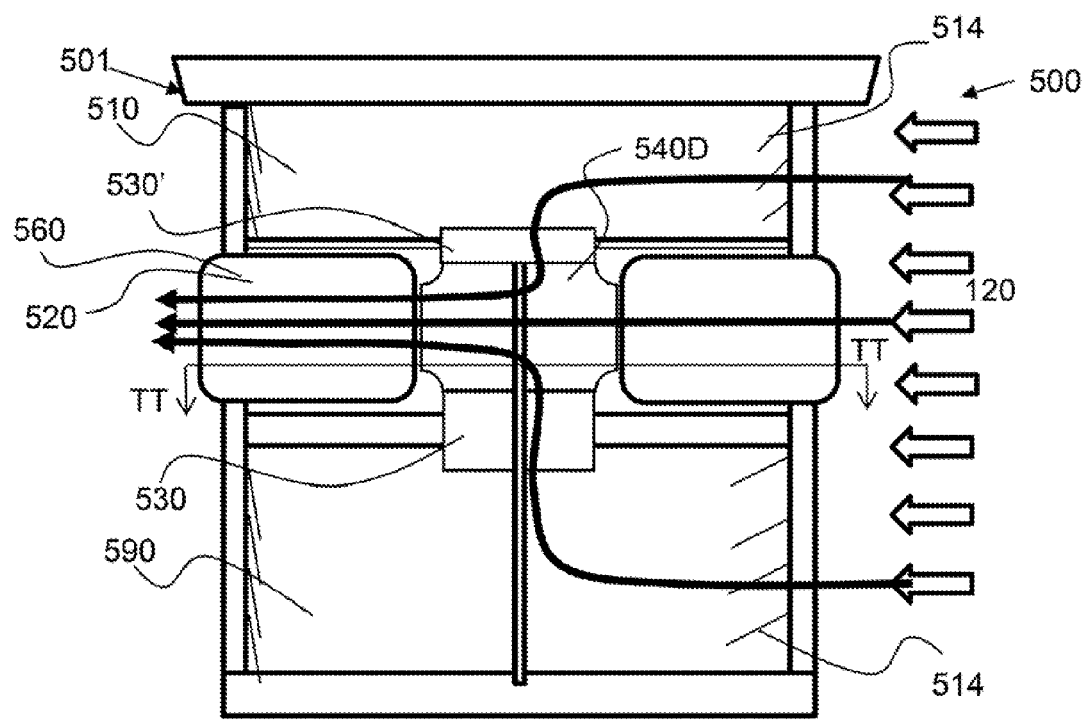
FIG. 34 is a side cross-sectional view of an exemplary dual wind energy power enhancer system comprising two inflow chambers and a single impingement chamber for multi-phased air flow.

In another embodiment, as shown in FIGS. 33-38, the enhanced multi-phased wind power generating system is a dual inlet type dual enhanced multi-phased wind power generating system. In a dual inlet air multi-phased wind power generating system, air from a plurality of inflow chambers is directed into the turbine 540. As shown in FIG. 33, a first inflow chamber 510 is configured above the impingement chamber 520 and a second inflow chamber 590 is configured below the impingement chamber. Airflow from both inflow chambers 510, 590 is directed into the air turbine 540, as shown in FIG. 34. Air flow from a plurality of directions increases the total flow of air into the turbine, thereby increasing the power output. The impingement chamber 520 further increases power by allowing second phase air flow to impact on the turbine directly. The size and inlet area of an inflow or inflow chambers and the impingement chamber may be selected to optimize the overall efficiency and power output of the multi-phased wind power generating system described herein. For example, in one embodiment, an inflow chamber may be configured to have an air inflow area that is much greater than the impingement chamber air inflow area. Air inflow area is the area through which air may enter an inflow chamber, and may be the product of the height and perimeter of an inflow chamber. Impingement inflow area is the area through which air may enter an impingement chamber and may be the product of the height and perimeter of an impingement chamber. For example, as shown in FIG. 33, the height of inflow chambers H1 and H2, and the height of the inflow chamber lit, may be selected to provide an air inflow area that is much greater than the impingement chamber inflow area. Any suitable ratio of air inflow area to impingement inflow area may be selected including from about 99:1 to about 1:99, and may be about 50:1, 25:1, 10:1 and more preferably for most applications, no more than about 5:1, no more than about 3:1, no more than about 2:1, no more than about 1:1, no more than about 0.5:1 and any range between and including the ratios listed. The air turbine may be designed according to the air inflow ratio selected, and factors including the typical wind flow speed and consistency may be factored into the design criteria.

In one embodiment, a dual inlet air multi-phased wind power generating system comprises two air inflow chambers, whereby each air inflow chamber directs flow into the turbine. An exemplary turbine for use in a dual inlet air multi-phased wind power generating system is a dual inlet radial outflow turbine 540D, as shown in FIG. 34-38. In this embodiment, the turbine may be configured in an impingement chamber whereby flow from the prevailing wind directly impinges on the turbine, and whereby air exits from the dual inlet air multi-phased wind power generating system. Additionally, in this embodiment, any suitable configuration and combination of air scoops, air deflectors, air curtains and vortex inducers may be used to direct air flow into turbine 540D as a first phase of wind injection. In one embodiment, at least some of the inflow chamber inlet air flow may be re-directed into the an impingement chamber, thereby increasing the second phase wind that impinges directly onto the air turbine.

FIG. 33 is a side view of an exemplary enhanced multi-phased wind power generating system 500 configured as a dual inlet enhanced multi-phased wind power generating system 500 comprising three chambers: a first inflow chamber 510, a second inflow chamber 590 and an impingement chamber 520.

The two air inflow chambers 510, 590 may be configured on opposing sides of an air impingement chamber 520 as shown in FIG. 33. The dual inlet enhanced multi-phased wind power generating system 500 may be configured in any suitable orientation, such as vertical, as shown in FIG. 33, or horizontal for example. In addition, as shown in FIG. 33, each chamber may be configured with protective fence material 504 and access doors 512, 522, and 532.

Figure 38:
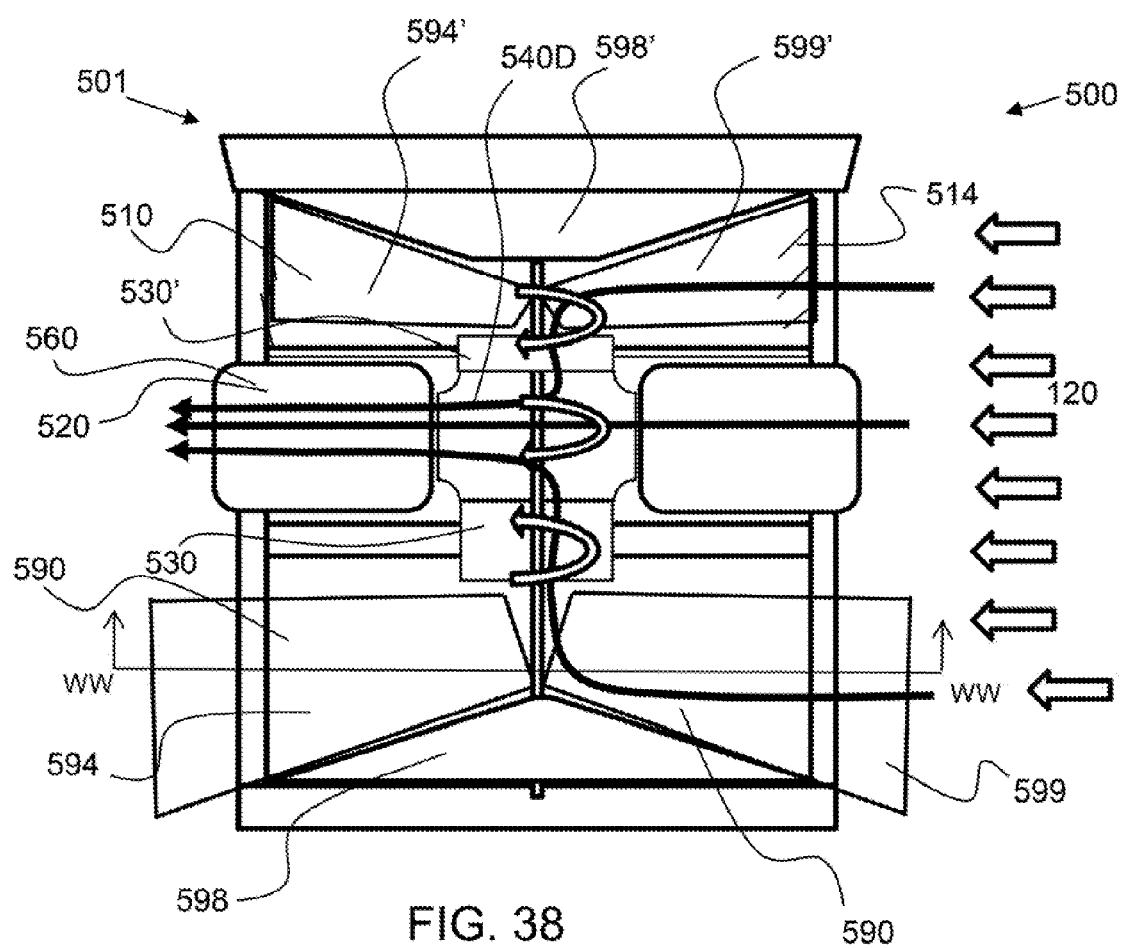
FIG. 38 is a side cross-sectional view of an exemplary dual wind energy power enhancer system comprising two inflow chambers each having a positive pressure vortex flow inducer and a single impingement type air outflow chamber for multi-phased air flow.

FIG. 34 is a side cross-sectional view of an exemplary dual inlet air multi-phased wind power generating system 500 taken along line GG in FIG. 33. As depicted by the bold lines and arrows, the prevailing wind 120 is directed from both air inflow chambers 510, 590 into the turbine 540D. The turbine 540D shown in FIG. 34 is a dual inlet radial outflow turbine, having two separate inlets for inflow of air to the turbine. In one embodiment, a dual inlet radial outflow turbine has two inlets configured for receiving inflow air from two separate inflow chambers, as shown in FIG. 38. In addition, the center air impingement chamber comprises air deflectors 560 that direct and concentrate the prevailing wind into the turbine. Any combination of air inflow dampers, air curtains, air deflectors, exit barrier, air scoops and the like may be used in any of the chambers. For example, the first air inflow chamber may comprise a rotating air scoop and the second air inflow chamber and the air impingement chamber may comprise air deflectors. As shown in FIG. 34, the first and second inflow chambers comprise air inflow damper 514.

Figure 35:
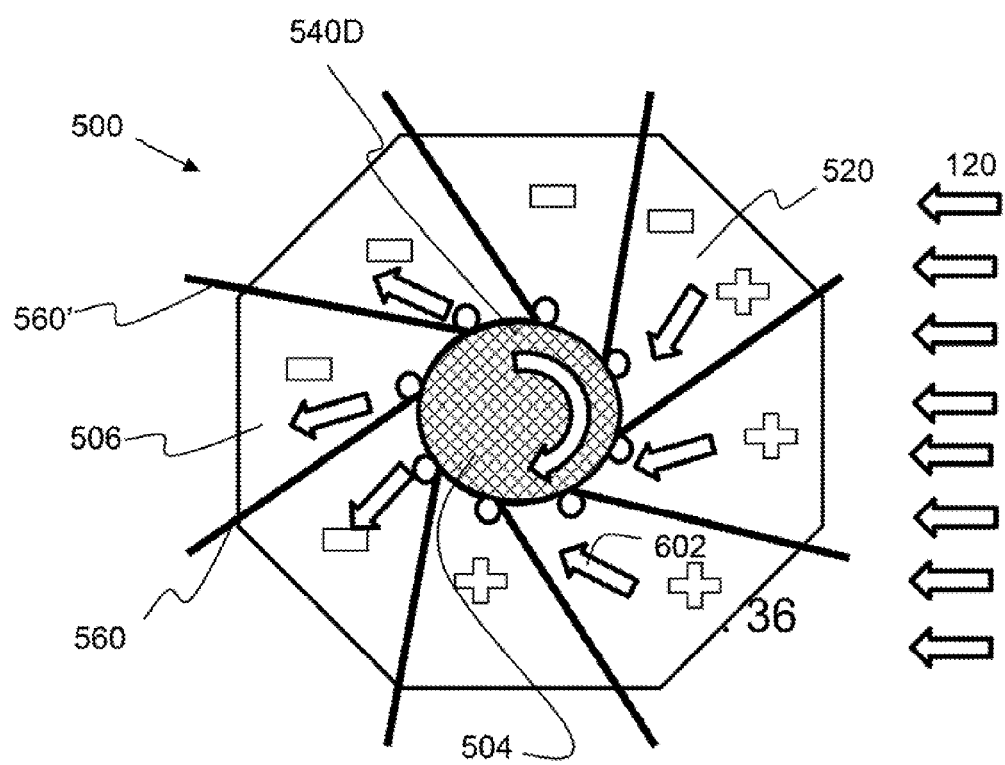
FIG. 35 is a top down cross-sectional view of an exemplary dual wind energy power enhancer system. Flexible inlet air curtains or sheets are also shown.

FIG. 35 is a top down cross-sectional view of an exemplary dual inlet air multi-phased wind power generating system 500 taken along line TT as shown in FIG. 34. Air deflectors 560 extend from the dual inlet radial outflow turbine 540D to the outside of the fixed structure. The air deflectors concentrate and direct the prevailing wind 120 into the turbine 540D, as indicated by the positive and negative symbols depicted within the impingement chamber 520. Within an impingement chamber there is an impingement portion and an outflow portion. The impingement portion is the area where the inflow air is directed to directly impinge on the air blades, as depicted by the inward facing arrows in FIG. 35, and may include upwards of 270° of rotation about the turbine. The outflow portion is the area where air is flowing out of the impingement chamber as indicated by the outward facing arrows in FIG. 35. Air deflectors may be within the impingement chamber, outside the impingement chamber, or both within the impingement chamber and outside the impingement chamber.

The multi-phased wind power generating system may comprise a vortex inducer to enhance the air flow through the turbine, thereby generating more power. In one embodiment, a positive flow vortex inducer may be configured to introduce vortex flow into the turbine. A positive flow vortex inducer directs air flow having a complimentary rotation into the turbine Any suitable configuration may be used as a positive flow vortex inducer, and a vortex inducer may be used with any of the enhanced multi-phased wind power generating systems described herein including a dual inlet enhanced multi-phased wind power generating system. A positive flow vortex inducer may also be configured with an axial flow type air turbine having a propeller type air turbine with air foil type air blades for example. In another embodiment, a negative flow vortex inducer is configured over and/or around a turbine exhaust and further induces or accelerates flow through the turbine; by means of increasing the pressure differential created across the overall wind turbine assembly by way of the increased air flows and velocities through the fixed air blades. In one embodiment, a negative flow vortex inducer reduces pressure at the turbine exhaust, thereby increasing the air flow rate through the turbine. Any suitable configuration may be used as a vortex inducer, and a vortex inducer may be used with any suitable enhanced multi-phased wind power generating systems described herein including an axial flow type air turbine. A negative flow vortex inducer creates a vortex phase of air flow, that combined with a first phase of air flow provide a multi-phased wind power generating system.

Figure 36:
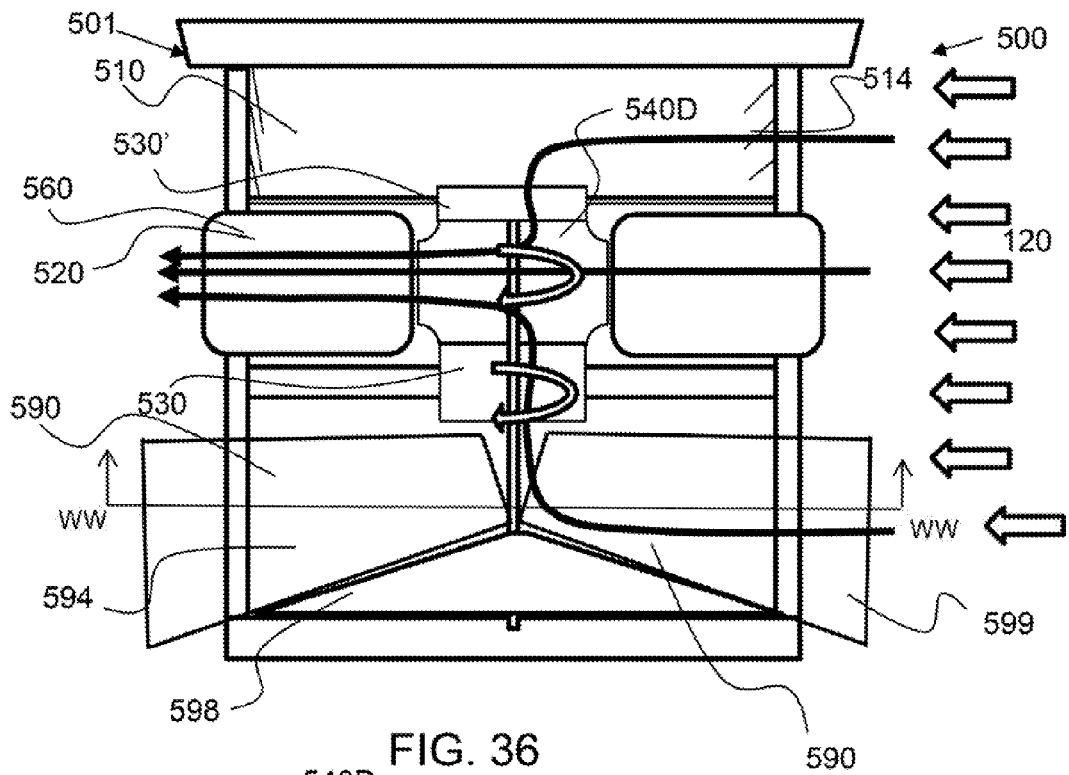
FIG. 36 is a side cross-sectional view of an exemplary dual wind energy power enhancer system comprising a vortex inducer.
Figure 37:
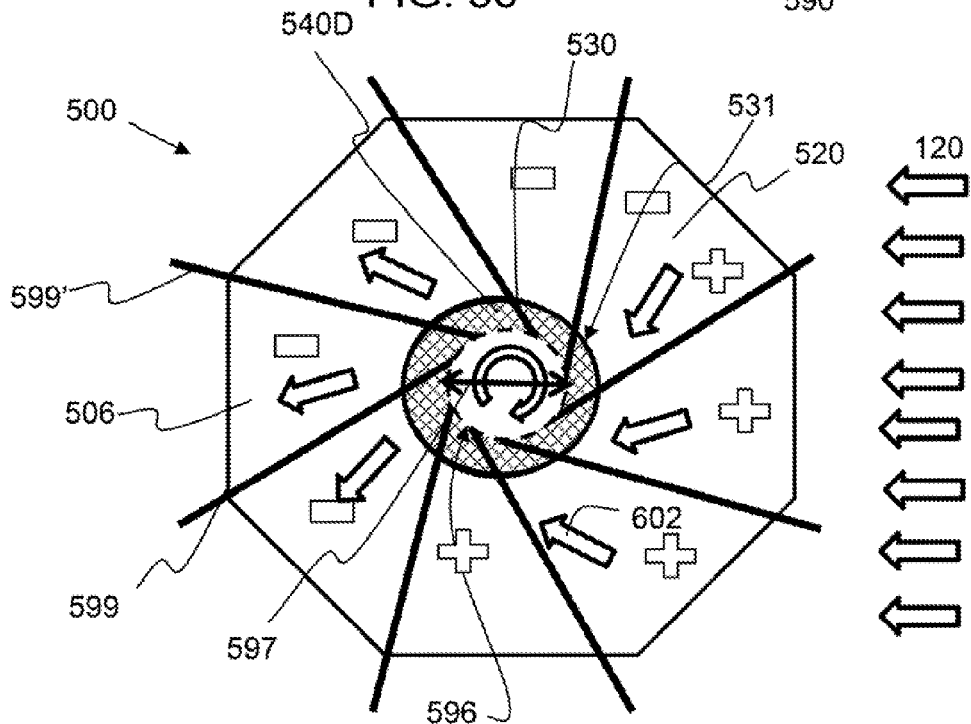
FIG. 37 is a top down cross-sectional view of a vortex positive pressure inducer of an exemplary dual wind energy power enhancer system.

FIG. 36 is a side cross-sectional view of an exemplary dual inlet air multi-phased wind power generating system 500 and FIG. 37 is a cross-sectional view of FIG. 36 taken along line WW. As shown in FIG. 36, the first inflow chamber 510 comprises air inflow dampers 514. The second inflow chamber 590 comprises a positive flow vortex inducer 594 having air deflectors configured to both concentrate and direct the air flow into a vortex, or rotational flow directed into the flow tube 530, and subsequently through the dual inlet radial outflow turbine 540D. The vortex deflectors 599 of the positive flow vortex inducer 594 are configured with a reducing height from the outside of the chamber to the inner edge where they terminate proximate the flow tube 530. The inner edge of the vortex deflectors 599 extend inside the outer diameter of the flow tube 531 as shown in FIG. 37. Put another way, the tangent tip circle 596, or the circle outlined by the inner edge of the vortex deflectors 599, having a tangent tip diameter 597 is smaller in diameter than the flow tube diameter 531. This configuration of vortex deflectors creates a positive pressure and thus a positive flow with increased rotational flow into the flow tube, or a positive flow vortex. A vortex deflector 599 is a specifically designed type of air deflector 560, having a reducing air contact surface, or height as shown in FIG. 36, from the outer edge to the inner edge as described. Also shown in FIG. 36 is a vortex baffle 598, or conical shaped feature that reduces the volume of an air inflow chamber 590. A reduction in the volume of an inflow chamber from the outside perimeter to the center further concentrates flow and enhances the creation of a positive pressure vortex flow into a turbine or flow tube.

FIG. 38 is a side cross-sectional view of an exemplary dual inlet air multi-phased wind power generating system 500 having two positive flow vortex inducer 594, 594'. The two positive flow vortex inducers are both configured to direct and concentrate flow in a complementary manner into the dual inlet radial outflow turbine 540D. The half circle arrows shown in FIG. 38 along the center axis of the enclosure represent the rotation of the air in each chamber. The vortex deflectors 599' in the first air inflow chamber 510 do not extend outside of the enclosure, whereas the vortex deflectors 599 in the second inflow chamber 590 extend outside of the enclosure.

Figure 39:
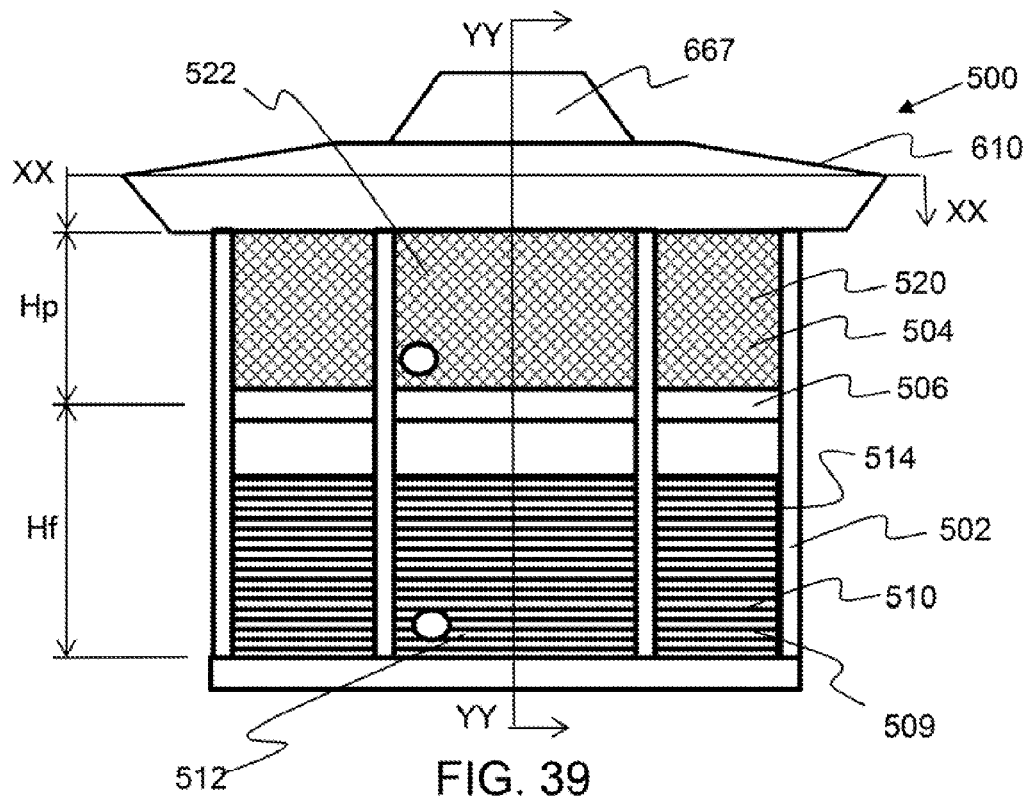
FIG. 39 is a side view of an exemplary combination vortex induced wind energy power enhancer wind power generating system.

FIG. 39 is a side view of an exemplary multi-phased wind power generating system 500 having a negative flow vortex inducer 610 configured to reduce pressure over the outlet portion of the flow tube 530, thereby enhancing the flow through the flow tube and axial flow turbine 539. Passive in-flow dampers 514 are configured on the inflow chamber 510, and fencing 504 is configured around the impingement chamber 520.

Figure 40:
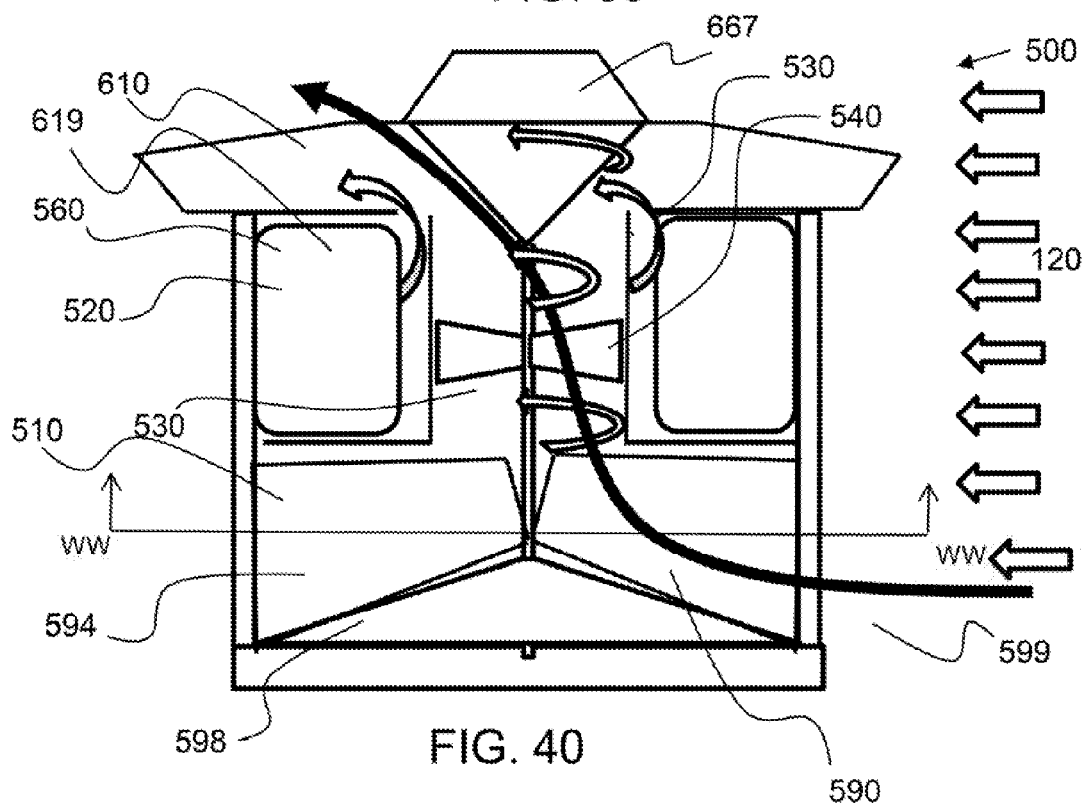
FIG. 40 is a side cross-sectional view of an exemplary combined vortex induced wind power generating system. This view shows both a positive pressure flow inducer in the inlet chamber, and a negative pressure flow inducer section to form a negative pressure flow inducer function in the outlet chamber.

FIG. 40 is a cross-sectional view of the exemplary multi-phased wind power generating system 500 along line YY of FIG. 39. The first inflow chamber 510 comprises a positive flow vortex inducer 594. The negative flow vortex inducer 610 comprises a plurality of negative flow vortex deflectors 619, that are configured to direct a strong vortex type air flow from the prevailing wind around the outer diameter of the flow tube 530 and towards the discharge end of the flow tube. The deflectors, as well as the flow tube may be shaped to further enhance, direct and sustain vortex flow. The vortex deflectors 619 may be specially shaped to assist the strong vortex induced flow outflow and create a more optimum directional and increased negative pressure air flow over the turbine and the exhaust of the flow tube at the flow tube outlet where the air flow is re-entrained, as indicated by the bold line having an arrow. Also shown in FIGS. 39 and 40 is a vortex stabilizer 667 or bobbin shaped object positioned over the flow tube exhaust that stabilizes or helps maintain the flow rotation from the flow tube exhaust and negative flow vortex inducer. The vortex stabilizer 667 may also improve re-entrainment of air flow.

Figure 41:
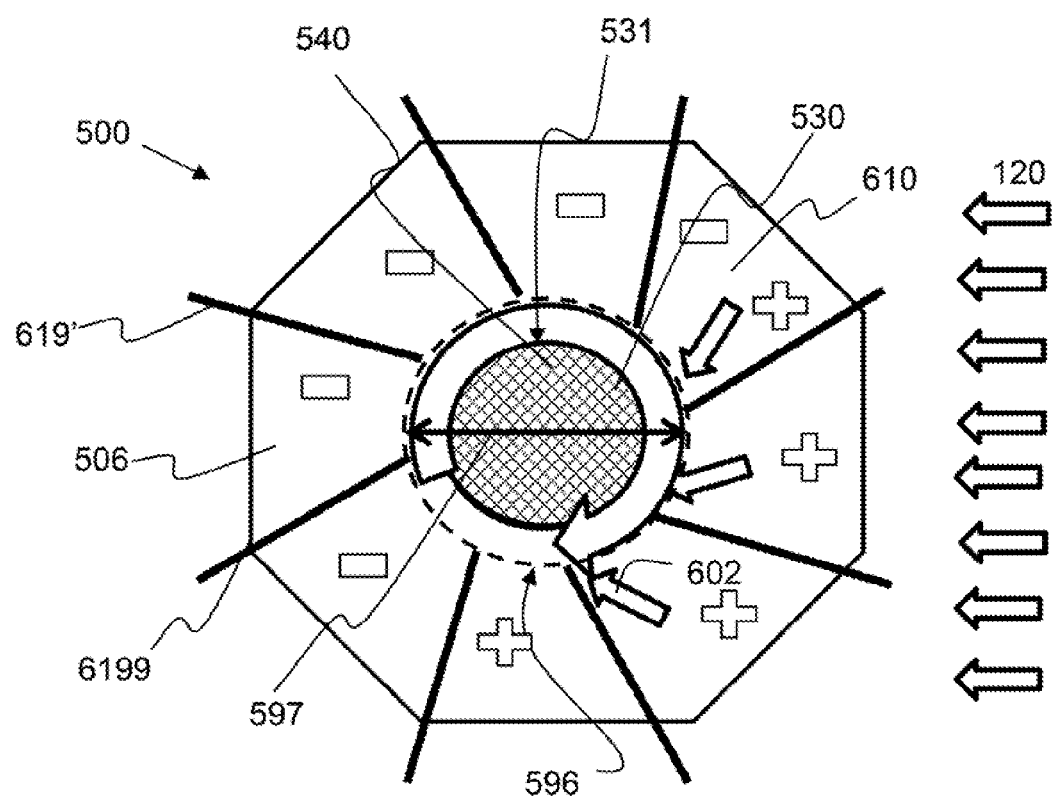
FIG. 41 is a top down cross-sectional view of a vortex induced multi-phased wind power generating system.

FIG. 41 is a cross-sectional view of the negative flow vortex inducer 610 portion of the multi-phased wind power generating system 500 shown in FIG. 39, taken along line XX. The negative flow vortex deflectors 619 are configured to extend to the tangent tip circle 596, that is larger in diameter, than the flow tube 530 outer diameter 531. This configuration creates a vortex flow that draws air out the flow tube and re-entrains it back into the surrounding area and downstream prevailing wind.

Figure 42:
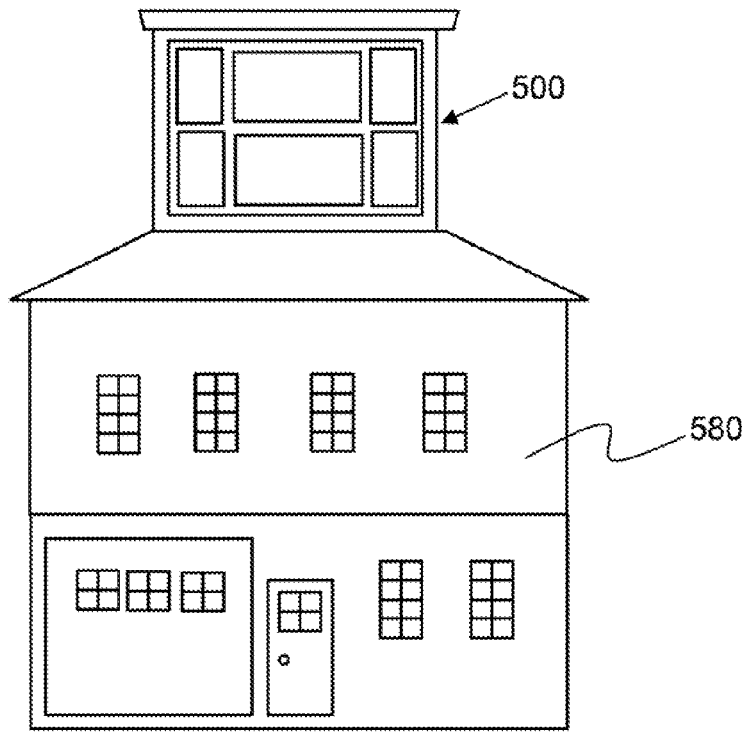
FIG. 42 is a front view of an exemplary wind energy power enhancer system configured on top of a building.
Figure 43:
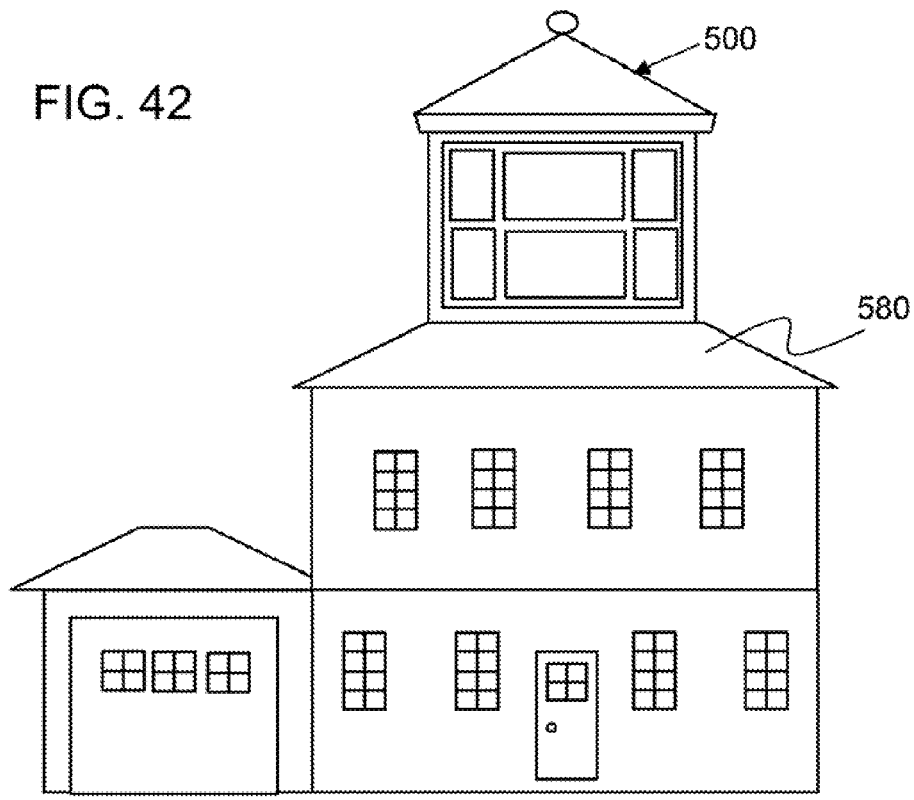
FIG. 43 is a front view of an exemplary multi-phased wind power generating system configured on top of a building.
Figure 44:
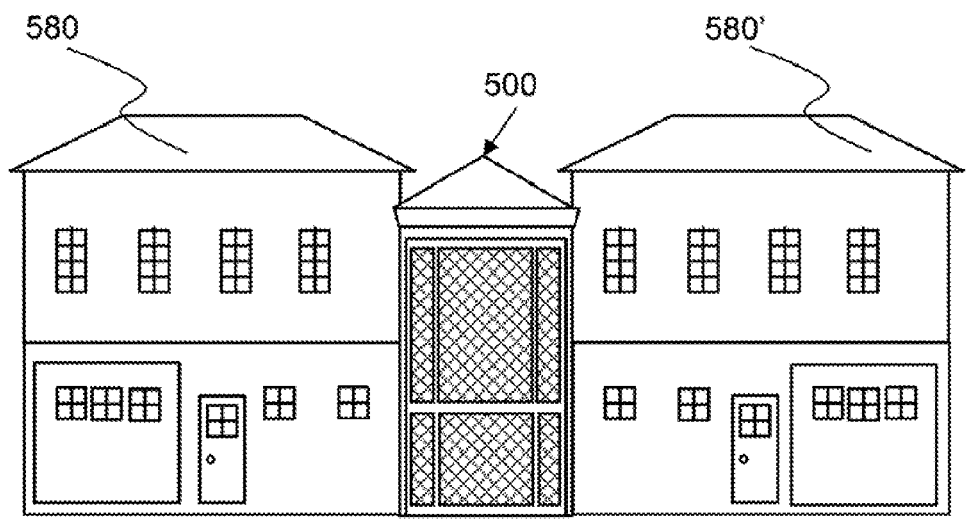
FIG. 44 is a front view of an exemplary multi-phased wind power generating system configured between two buildings.
Figure 45:
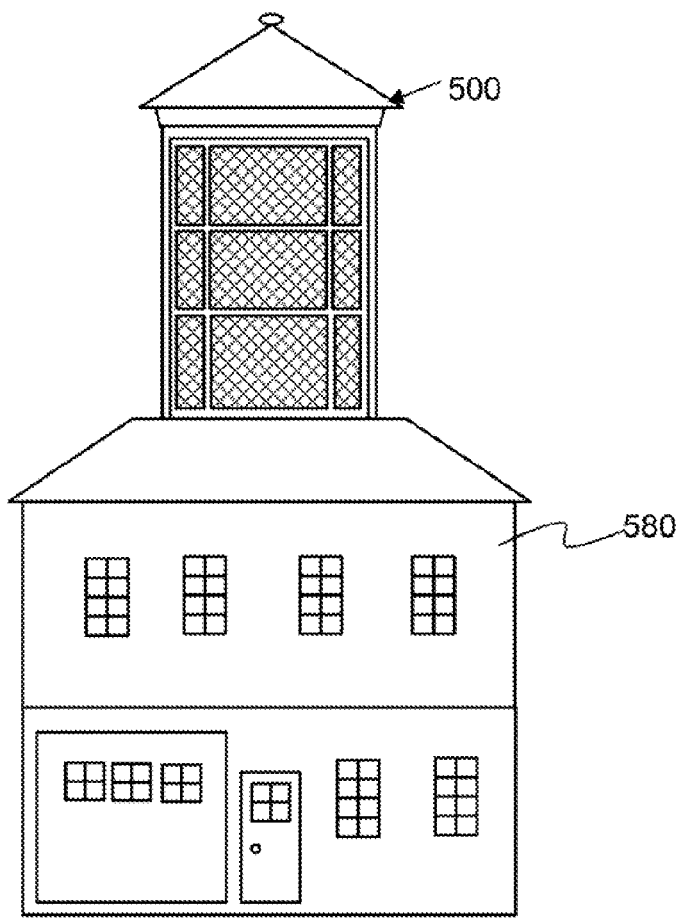
FIG. 45 is a front view of an exemplary dual wind energy power enhancer system configured on top of a building.
Figure 46:
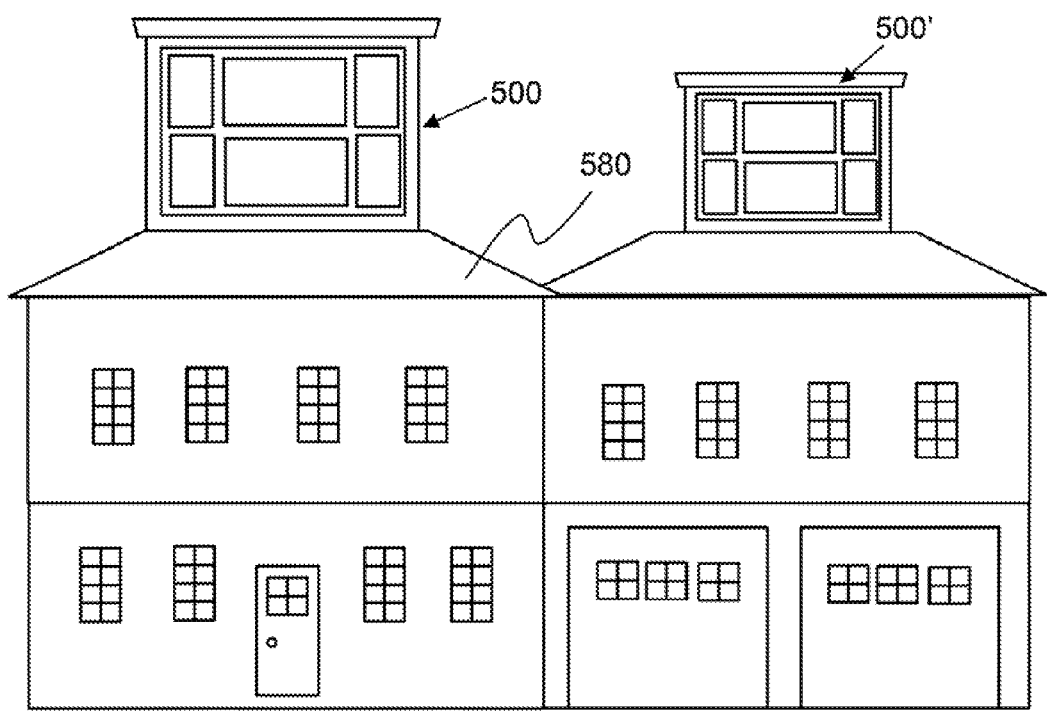
FIG. 46 is a front view of two exemplary wind energy power enhancer system wind power generating systems configured on top of a building.

The wind energy power enhancer system, described herein is a versatile and easily implemented system in both rural and residential areas as well as near or at the tops of office buildings in downtown or outlying business centers. As shown in FIG. 42-46 a multi-phased wind power generating system may be aesthetically configured on or near the top, next to, or between buildings. As shown in FIGS. 42, 43, 45 and 46, a multi-phased wind power generating system 500 is configured on top of a building 580. As shown in FIG. 44, the multi-phased wind power generating system 500 is configured between two buildings 580, 580'. The buildings shown in FIG. 44 are townhomes, but could be any type of building including office or government building, barns, corn or grain silos and the like. A multi-phased wind power generating system may be well suited for placement between two office buildings at a high elevation. FIG. 42 shows an enhanced multi-phased wind power generating system 500 configured on top of a town home. FIG. 43 shows a multi-phased wind power generating system 500 configured on top of a single family home. FIG. 45 shows a dual enhanced multi-phased wind power generating system 500 configured on top of a single family home. FIG. 46 shows two multi-phased wind power generating systems 500, 500' configured on top of a single family home. Any number and configuration of wind power generating systems may be configured on, within, partially within or attached to one or more buildings. The multi-phased wind power generating system may also be configured on top of barns, corn and grain silos and other rural type structures where electrical power may not be as readily accessible and where tall structures are not inhibited by codes and regulations. The multi-phased wind power generating system may also be easily implemented on homes and other dwellings where codes and regulations must be met for any new structure added to the dwelling. In an exemplary embodiment, the multi-phased wind power generating system is a fixed structure that can be made to meet all codes and regulations, specifically enclosure regulations. The fixed structure may be configured to rotate or may be adjustable.

Figure 47:
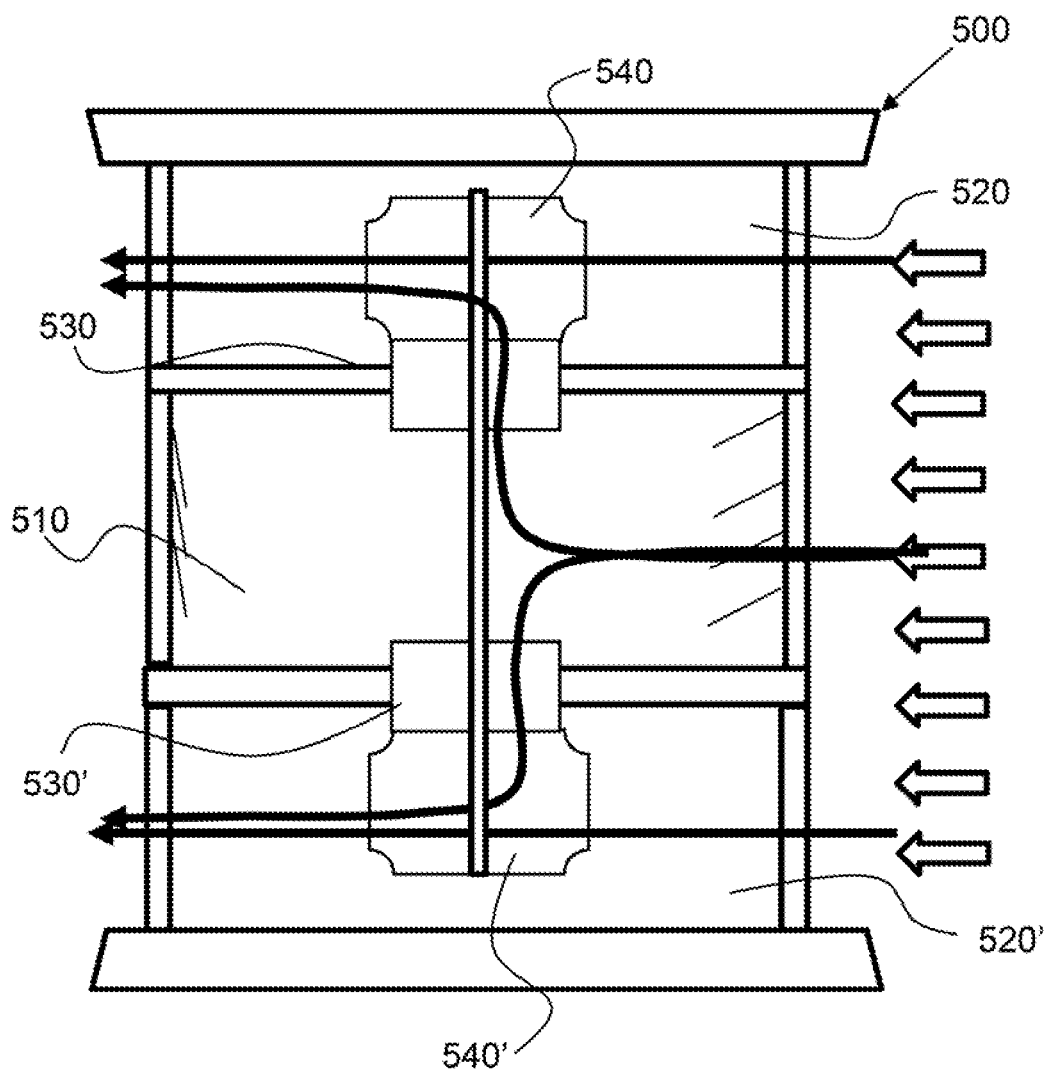
FIG. 47 is a side view of an exemplary dual outflow type dual wind energy power enhancer system comprising a single inflow chamber located between two air impingement type radial air outflow wind turbines and outflow chambers.

FIG. 47 shows a dual outflow type 600 enhanced multi-phased wind power generating system 500 comprising dual or two turbines 540, 540' located within two separate impingement chambers 520, 520'. The turbines shown in FIG. 47 are dual outflow type wind turbines, however any suitable type and combination of turbines can be used in a dual outflow type enhanced multi-phased wind power generating system. As shown in FIG. 47, a single inlet chamber 510 is and located vertically between two impingement chambers, each having a turbine configured therein. In an exemplary embodiment, a radial outflow type wind turbine is configured in one or both of the impingement chambers. The two wind turbine rotor assemblies are shown connected in FIG. 47, however each turbine may have a separate axis and may or may not be connected mechanically and/or electrically for the production of useful multi-phased wind power. In an exemplary embodiment, the two impingement chambers of the dual outflow type multi-phased wind power generating system are configured on opposing sides of an inlet chamber, as shown in FIG. 47 where a first impingement chamber 520 is configured above the inflow chamber 510 and a second impingement chamber 520' is configured below the inflow chamber. The impingement chambers of a dual outflow type multi-phased wind power generating system may also be configured horizontally on opposing sides of an inflow chamber. In addition, any suitable type of air deflector, or combination of air deflectors, as described herein, may be configured in, on and/or around a dual outflow type multi-phased wind power generating system including, but not limited to, drag curtains, exit barriers, scoops, sails, deflectors, vortex inducers and the like. In one embodiment, a deflector is configured in the inflow chamber to direct approximately an equal amount of inflow air into the two impingement chambers. In certain cases, the impingement chamber or air outflow chambers may only serve as an air outflow chamber and be only designed to provide single phase air flow to the wind turbine or turbines.

FIGS. 48 to 78 show various embodiments of a building integrated wind power generating system as may best be applied to various types, sizes and shapes of buildings as described herein. A building, as used herein, is defined as a large structure such as an apartment or office building having two or more floors. A building may be a sky-scrapper and have at least 20 floors. A small building may be two to six floors high, and a large building may be greater than six floors. In an exemplary embodiment, a building integrated wind power system is configured proximal to the top of a building, because the wind may be relatively unimpeded and stronger at higher elevations. A building integrated wind power system may be comprised of an opening or openings to an inflow chamber or chambers, flow tubes or conduits, which are near the top of the building. In another exemplary embodiment, a wind power generating turbine is configured above the top of a building and receives a first phase of wind or first stage of airflow from a flow tube that extends from within the building and a second phase of wind or second stage of airflow directly from the prevailing or channeled wind.

Figure 48:
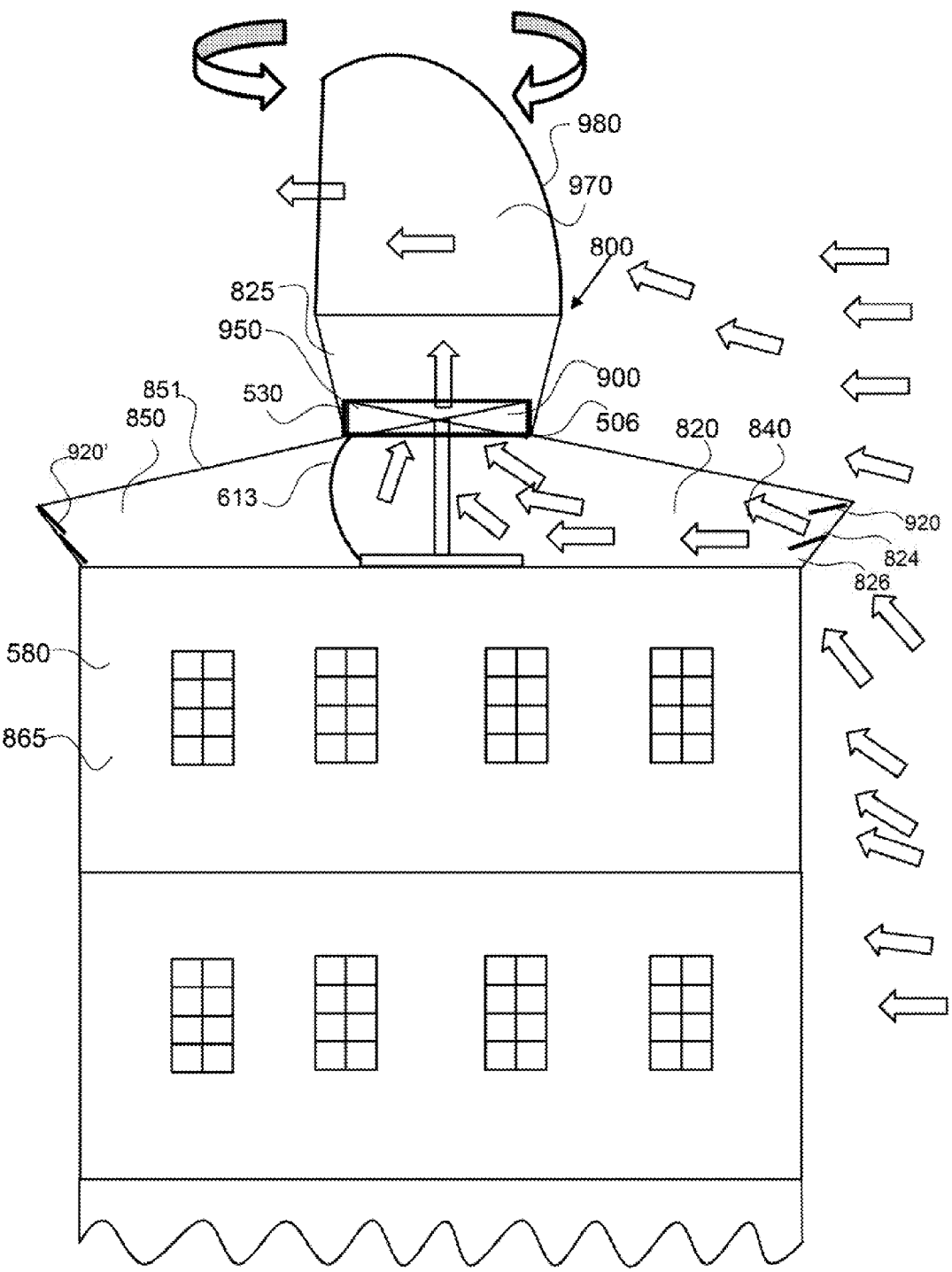
FIG. 48 is a side view of an exemplary building integrated wind power system having a building integrated inflow chamber in the roof structure of the building and an outlet airflow drag curtain type outlet chamber extended above the roof.

As shown in FIG. 48, an exemplary building integrated wind power system 800 has a building integrated inflow chamber 820 in the roof structure 850 of the building 580 and an exterior type drag curtain 970 in the form of a low velocity outlet airflow chamber containing a reversed air scoop assembly, which is pointed away from the approaching or prevailing wind flow stream, so as to aspirate the exhaust air discharging with a local vacuum effect from the wind turbine. The exemplary building integrated wind power system 800 is comprised of a propeller 950 to produce power through the power generating device 900 or turbine. A flow tube 530 is configured around the propeller and may be a ring that extends around the propeller blades. The separation panel 506 may comprise the roof top 851, as it separates the first phase airflow within the inflow chamber from the prevailing wind. The outflow chamber 825 is configured downstream of the propeller 950 and extends up from the roof into the prevailing wind. The passive dampers 920 or flexible curtains allow air to enter into the roof structure inflow chamber 840, but close to prevent the air from escaping under more gusty wind conditions on either the upstream or sides, or on the downstream side of the building with respect to the prevailing wind. Thus, higher capacity factors may be possible. An actively or passively actuated inlet air scoop structure 613 directs airflow from the inflow chamber into the propeller as a first phase airflow. This exemplary building integrated wind power system may be omnidirectional, whereby airflow is received through openings 826 that are configured around the perimeter for the building 580. The propeller 950 is concealed, wherein it is configured within an enclosure.

Figure 49:
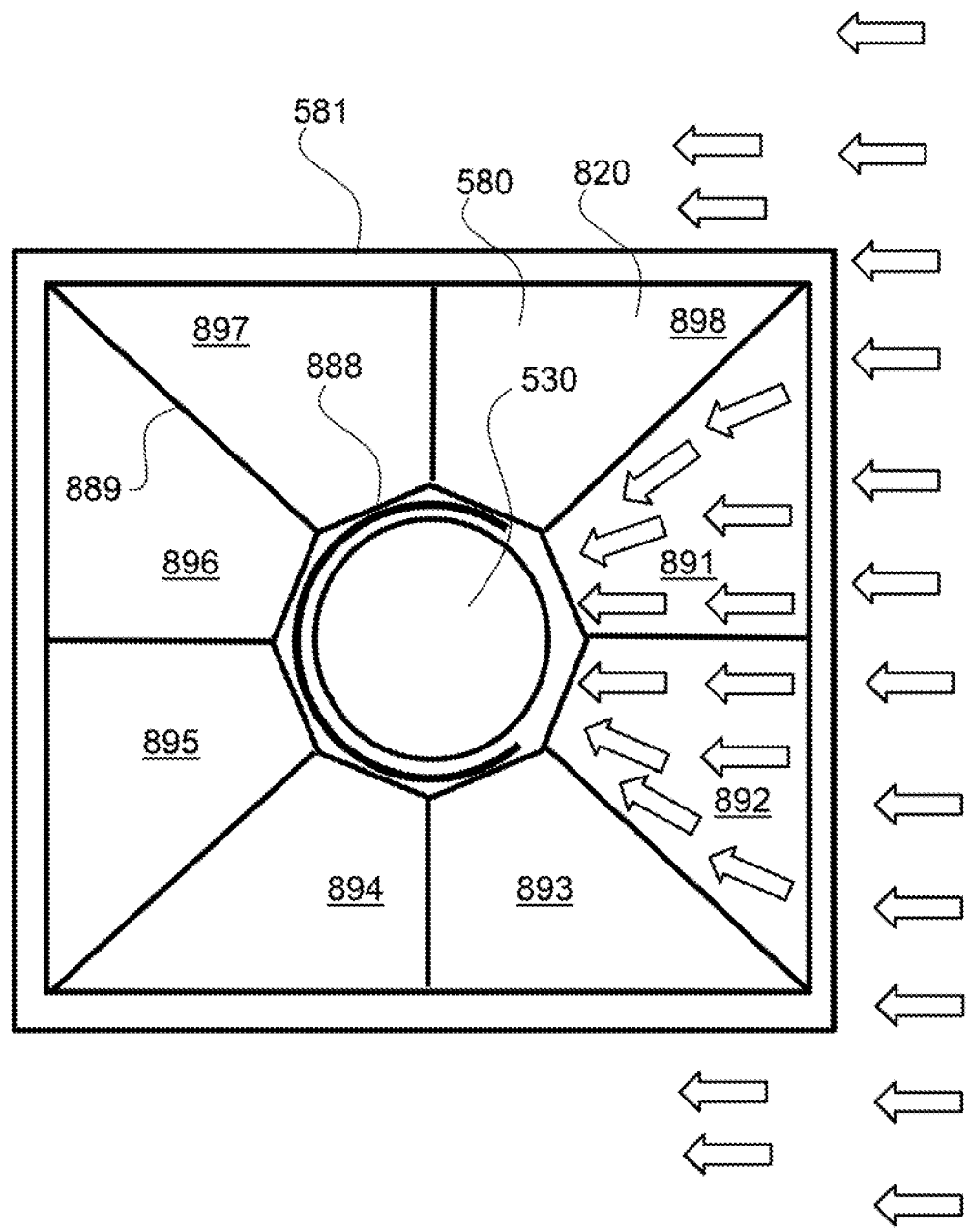
FIG. 49 is a cross-sectional view of an inflow chamber having static inflow deflectors within the air inflow chamber to both direct, compress and concentrate the wind/air flow into the flow tube and wind turbine rotor assembly while releasing the wind's air flow back into the downstream prevailing wind at the lowest possible velocity so as to maximize power production from the wind turbine rotor assembly.

As shown in FIG. 49, a plurality of sector deflectors separate the building integrated inflow chamber 820 into inlet airflow concentrating sectors or compartments that extend from the flow tube 530 to the exterior 581 of the building 580 where there are openings to receive an airflow. A dynamic adjustable and rotatable deflector 888 is configured to rotate about the inflow chamber to direct airflow from the sectors having the highest inflow pressure into the inflow chamber. Sectors 891 and 892 have the highest inflow air pressure as the prevailing wind is impacting the building on the cast or right hand side of the building. The dynamic deflector 888 is effectively blocking off sectors 893-898. This inflow chamber extends across a single level of the building and is configured to receive airflow from the prevailing wind omnidirectionally, or from around the entire perimeter of the building. This embodiment may be configured in any suitable inflow chamber, such as a roof structure inflow chamber or an inflow chamber between floors of the building where, for example, significant vertical access corridors or shafts through the floor for elevators or other utilities is not a concern. Where these types of building features are a concern, the configuration shown in FIG. 56 may be required. The inflow chamber 820 shown in FIG. 49 would receive airflow from around the perimeter of the building and therefore create an omnidirectional building integrated wind power system.

Figure 50:
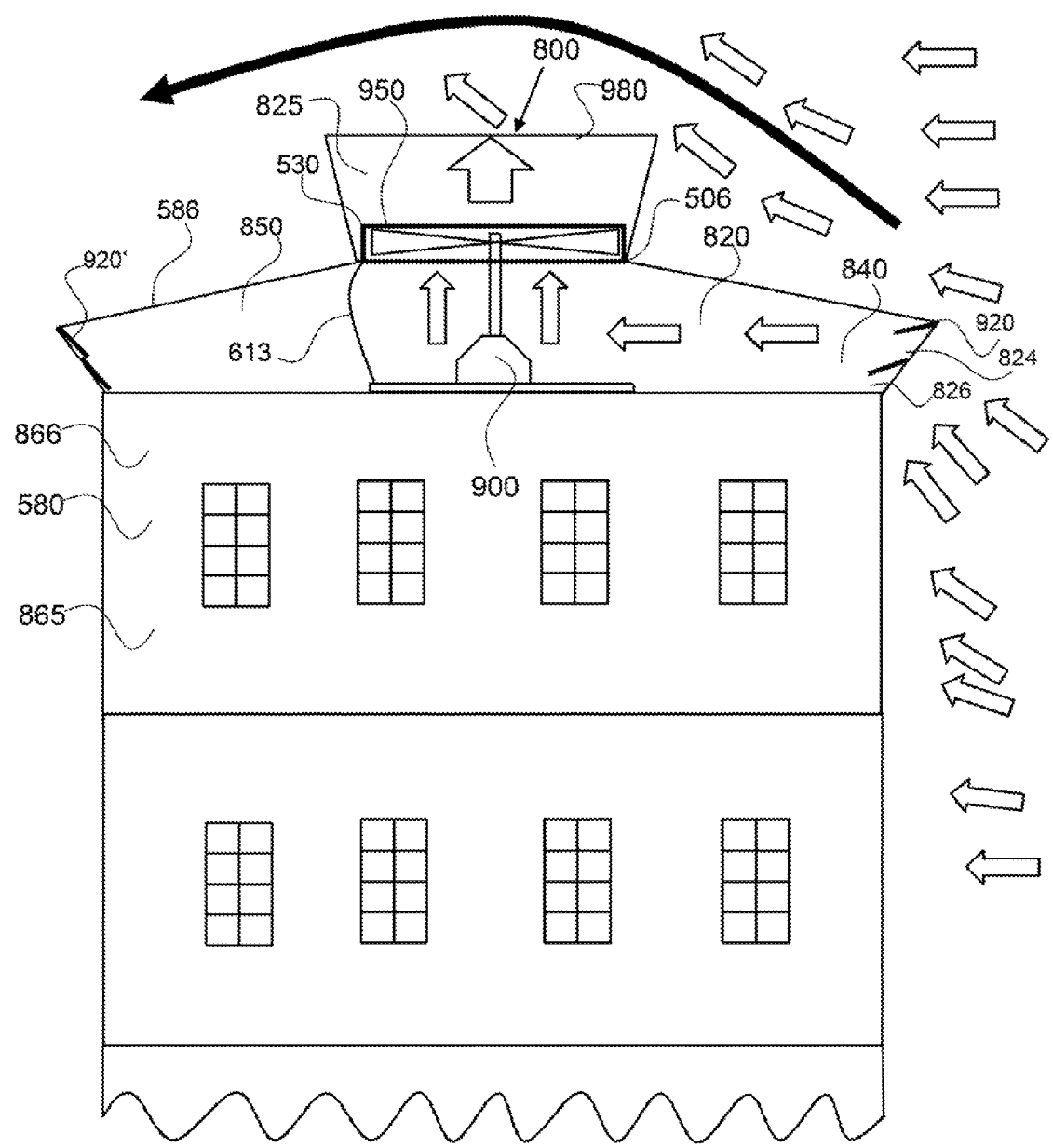
FIG. 50 is a side view of an exemplary building integrated wind energy power enhancer system having a building integrated inflow chamber in the roof structure of the building and a propeller.

As shown in FIG. 50, an exemplary building integrated wind power system 800 has a building integrated inflow chamber 820 in the roof structure 850 of the building 580. The building integrated inflow chamber, or roof structure inflow chamber 840, has a plurality of openings 826 around the perimeter of the building to allow air from the prevailing, or approaching wind, to enter into the inflow chamber omnidirectionally. The roof structure inflow chamber 840 is configured just below the roof 586 of the building and in most cases above the uppermost floor 866 of the building. A roof structure in some cases is comprised of room or equipment enclosures, such as for service equipment for the building, as well as vertical elevator and utility shafts and the like. The roof structure inflow chamber 840 comprises an enlarged air capture section 824, or inlet section, that may extend up and outward from a top of the building to enable a greater amount of the prevailing wind to enter into the inflow chamber. A plurality of passive dampers 920, such as flexible curtains or sheets, are configured to allow air to enter into the roof structure inflow chamber, but to close automatically by a combination of gravity and pressure differential to prevent air from escaping in any direction from the inflow section with the exception of the outlet flow tube and integrated wind turbine assembly, as shown by the closed passive dampers 920 on the downstream side of the building. The pressure within the roof structure inflow chamber is thus maintained at a higher pressure, in part due to the closing of dampers or flexible curtains whenever and wherever the internal pressure is higher than the exterior pressure. A power generating device 950, such as a turbine, is configured to produce power from the airflow flowing through the roof structure inflow chamber 840. This airflow is configured to spin a propeller 950 to create power. A specially designed actively or passively actuated inlet air scoop structure 613 is configured within the inflow chamber to rotate and adjust its collection area to most effectively direct airflow into and through the power generating device or propeller, as a first phase airflow. An expansion cone is mounted on the discharge side of the propeller to increase the total pressure differential across the propeller and thus increase its power production. The building integrated wind power system 800 shown in FIG. 50 may be a retrofit to an existing building and may utilize a single or multi-phased wind flow with an open or closed discharge or outlet chamber enclosure. A single or multi-staged radial air flow wind turbine may be configured in place of the propeller. The propeller 950 is concealed, wherein it is configured within an enclosure.

Figure 51:
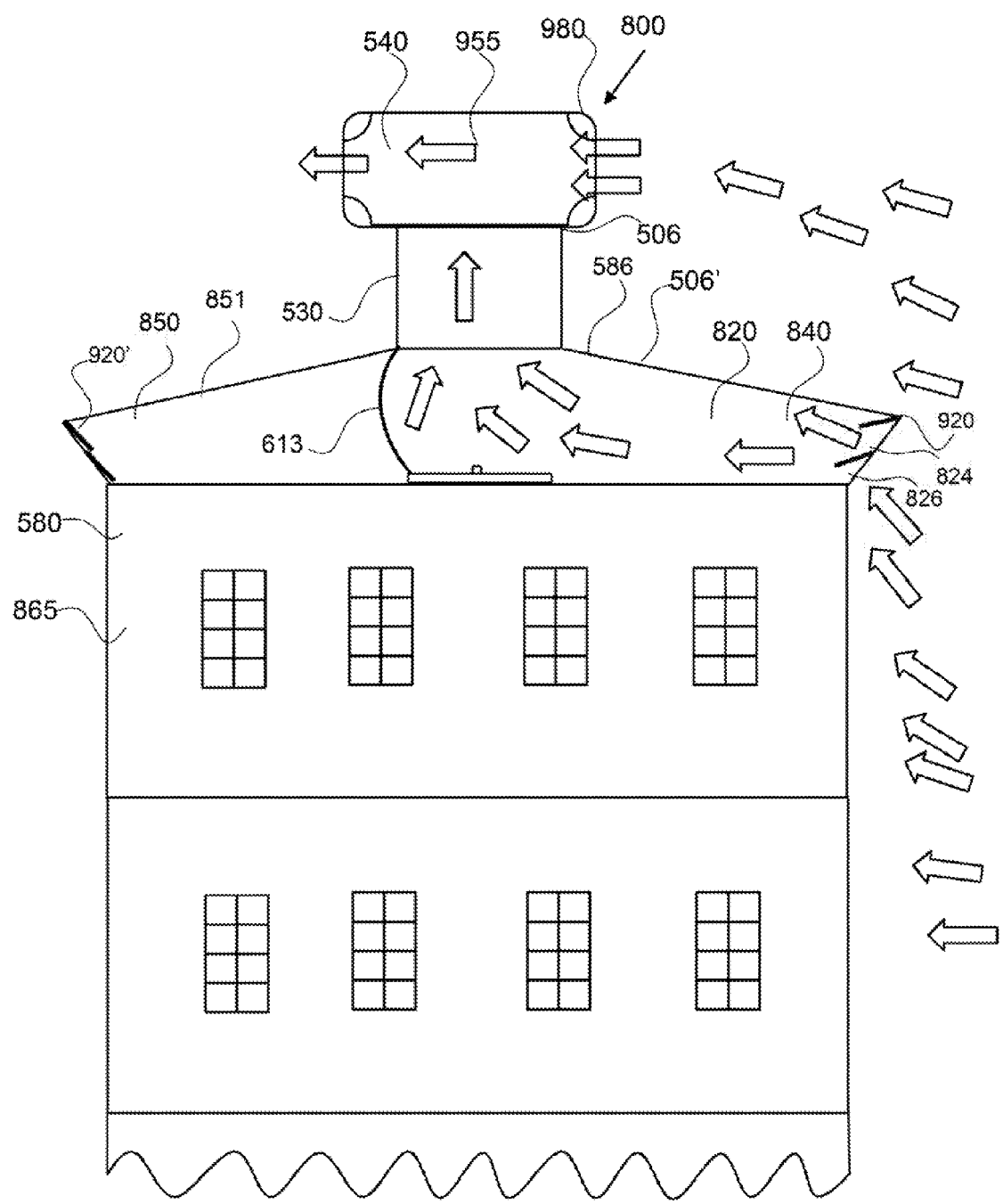
FIG. 51 is a side view of an exemplary building integrated wind power system having a building integrated inflow chamber in the roof structure of the building and a multi-phase open discharge radial outflow wind power generating turbine configured above the roof structure.

As shown in FIG. 51, an exemplary building integrated wind power system 800 has a building integrated inflow chamber 820 in the roof structure 850 of the building 580 and a wind power generating turbine 540 configured above the roof structure where it receives airflow from the prevailing wind. A wind power generating turbine 540 may be extended up from the top of the building 580 or rooftop 586 a suitable distance to receive airflow from the second phase prevailing wind as required as a combination of the first phase of wind flow drawn off below the roof structure, by the roof slope itself, and by the building overall geometry. The flow tube 530 extends from the roof structure inflow chamber to deliver the first phase air flow to the wind power generating turbine 540. A separation panel 506 is configured to separate the first phase airflow within the inflow chamber and the flow tube from the prevailing wind and is a portion of the turbine inlet. The rooftop 851 is also considered a separation panel 506' as it separates the first phase airflow within the inflow chamber from the prevailing wind and second phase airflow and the flow tube extends through the roof top. A screen or other enclosure 980 may be configured around the wind power generating turbine 540. This exemplary building integrated wind power system 800 utilizes first and second phase wind or first and second stage air flow to produce power. This arrangement may provide an improved capacity factor with higher overall power production under more gusty wind conditions. The wind power generating turbine 540 is concealed, wherein it is configured within an enclosure 980.

Figure 52:
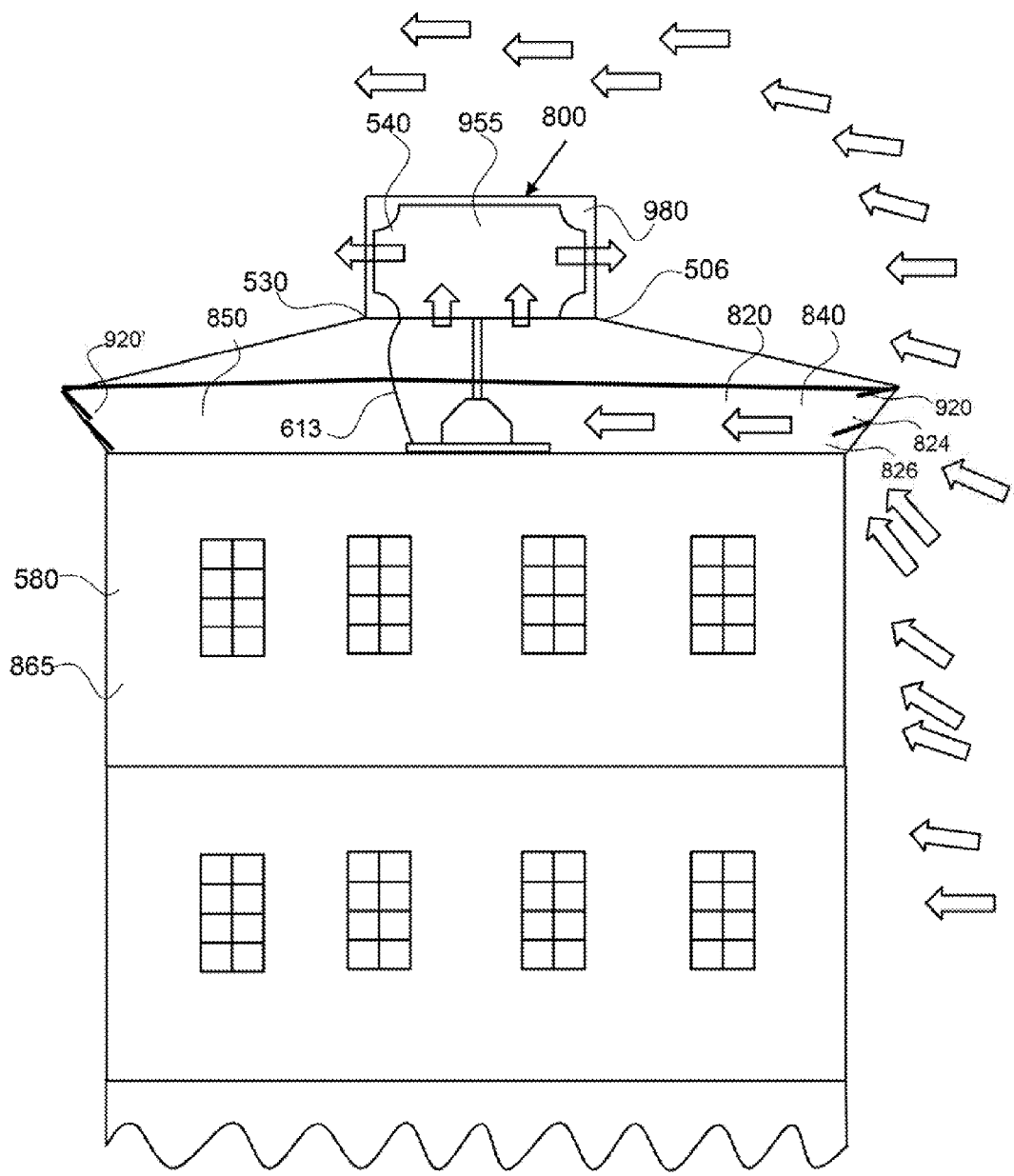
FIG. 52 is a side view of an exemplary building integrated wind power system having a building integrated inflow chamber in the roof structure of the building and a single phase enclosure with screens and deflectors around a wind power generating turbine.

As shown in FIG. 52, an exemplary building integrated wind power system 800 has a building integrated inflow chamber 820 in the roof structure 850 of the building 580 and a wind power generating turbine 540 configured above the roof structure. The rooftop is the separation panel 506 and the flow tube 530 is the inlet to the turbine 540 in this embodiment. The wind power generating turbine may or may not be contained in an enclosure 980 with screens and deflectors to increase the effectiveness of the second phase wind impacting the turbine. Again, under certain wind conditions, a second phase of airflow from the wind may impact the turbine directly. The higher the turbine is offset from the top of the roof structure, the more second phase wind it may receive for additional power production. The slope of the roof and architecture of the building, as well as the percentage of first phase wind flow drawn off and utilized from below, may also affect the amount of second phase wind received by the turbine.

Figure 53:
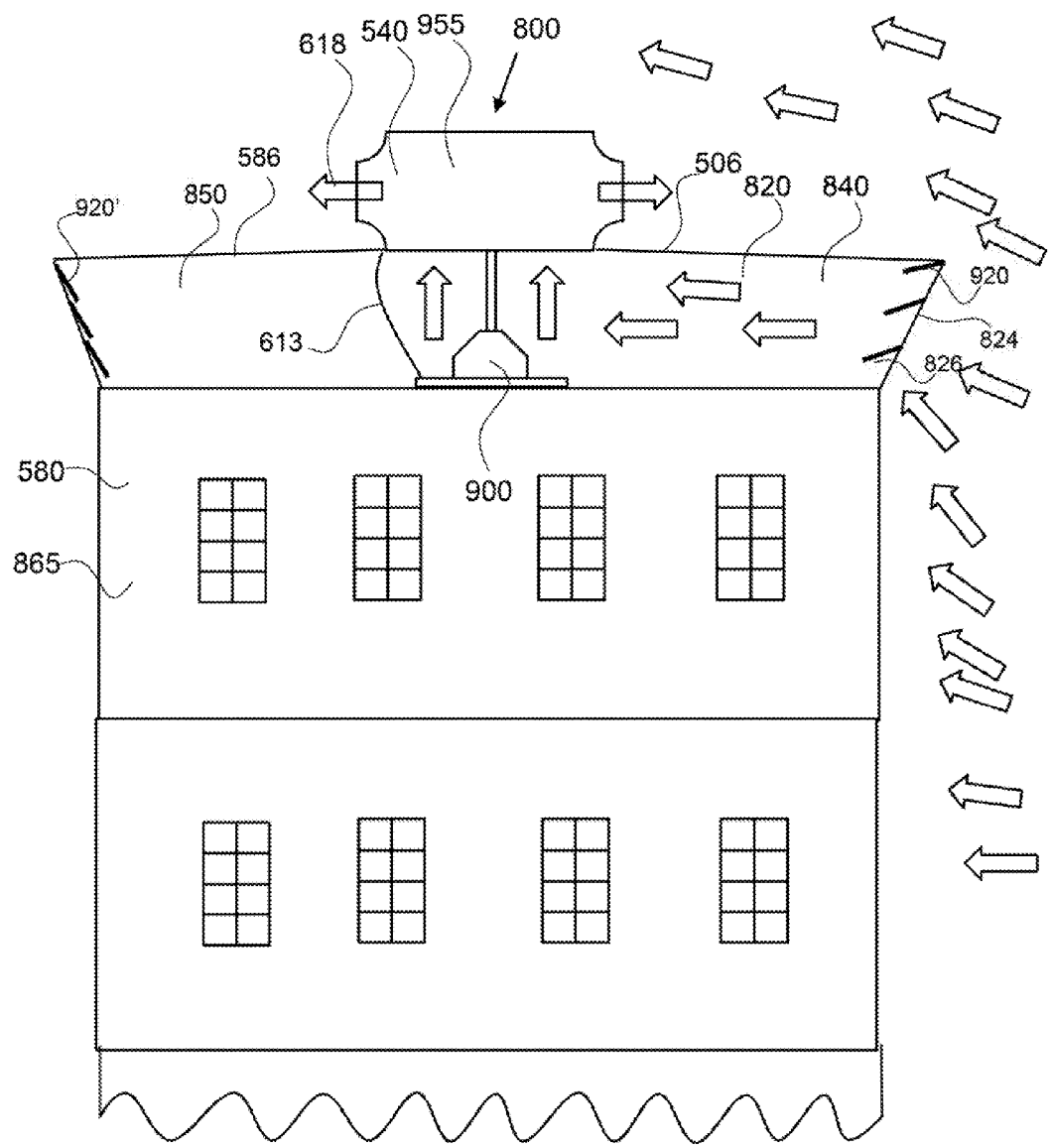
FIG. 53 is a side view of an exemplary building integrated wind power system having a building integrated inflow chamber in the roof structure of the building and an open discharge single phase wind flow radial outflow turbine.

As shown in FIG. 53, an exemplary building integrated wind power system 800 has a building integrated inflow chamber 820 in the roof structure 850 of the building 580 and a wind power generating turbine 540 configured above the roof structure. In this embodiment, the radial outflow turbine 955 may or may not be configured within an enclosure 980, which may include a screen or fencing material. The wind power generating turbine is configured to receive a first phase of airflow from the inflow chamber and a second phase of airflow directly from the prevailing wind in this embodiment. The roof top 586 acts as a separation panel to separate the first phase air flow from the second phase airflow to the turbine. Under certain atmospheric conditions, a second phase airflow may impact the air blades of the turbine directly. However, in this embodiment the shallow slope of the top of the roof may prevent most of the prevailing wind from impacting the turbine 955. The outer edges of the roof may deflect most of the prevailing wind and therefore the exemplary building integrated wind power system 800 may operate as a single phase system, generating power only from airflow passing through the roof structure inflow chamber 840. The turbine may therefore act as a single phase radial outflow turbine and may have an open discharge or enclosed discharge. The wind power generating turbine is concealed, wherein it is configured on the roof of the building and is a reverse flow fan type turbine.

Figure 54:
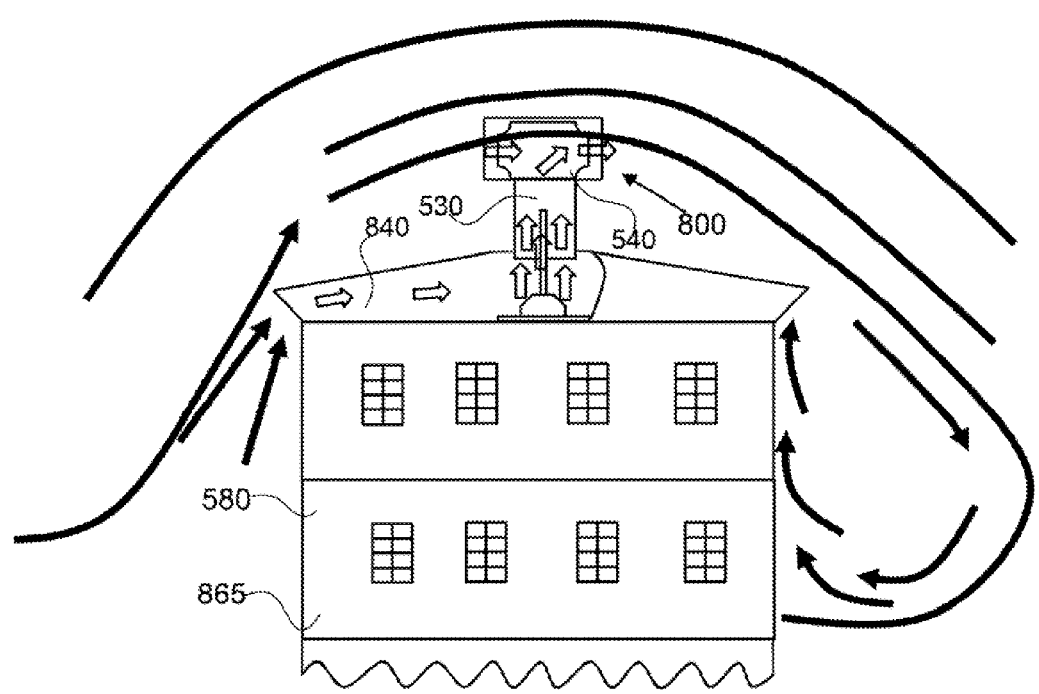
FIG. 54 is a view of an exemplary building integrated wind power system having a building integrated inflow chamber in the roof structure of the building and a wind power generating turbine equipped with a multi-phase air outflow chamber including enclosure with screens and deflectors around the wind power generating turbine configured above the roof structure and in the prevailing wind.

As shown in FIG. 54, an exemplary building integrated wind power system 800 has a turbine 540 extended up from the roof and into the uncontrolled and up-surging wind flow created by the building's shape relative to the approaching prevailing wind as indicated by the bold arrows. The exemplary building integrated wind power system 800 also has a roof structure inflow chamber 840 that receives first phase airflow from prevailing wind and directs this airflow to the turbine through a flow tube 530. The wind power generating turbine is concealed, wherein it is configured within an enclosure.

Figure 55:
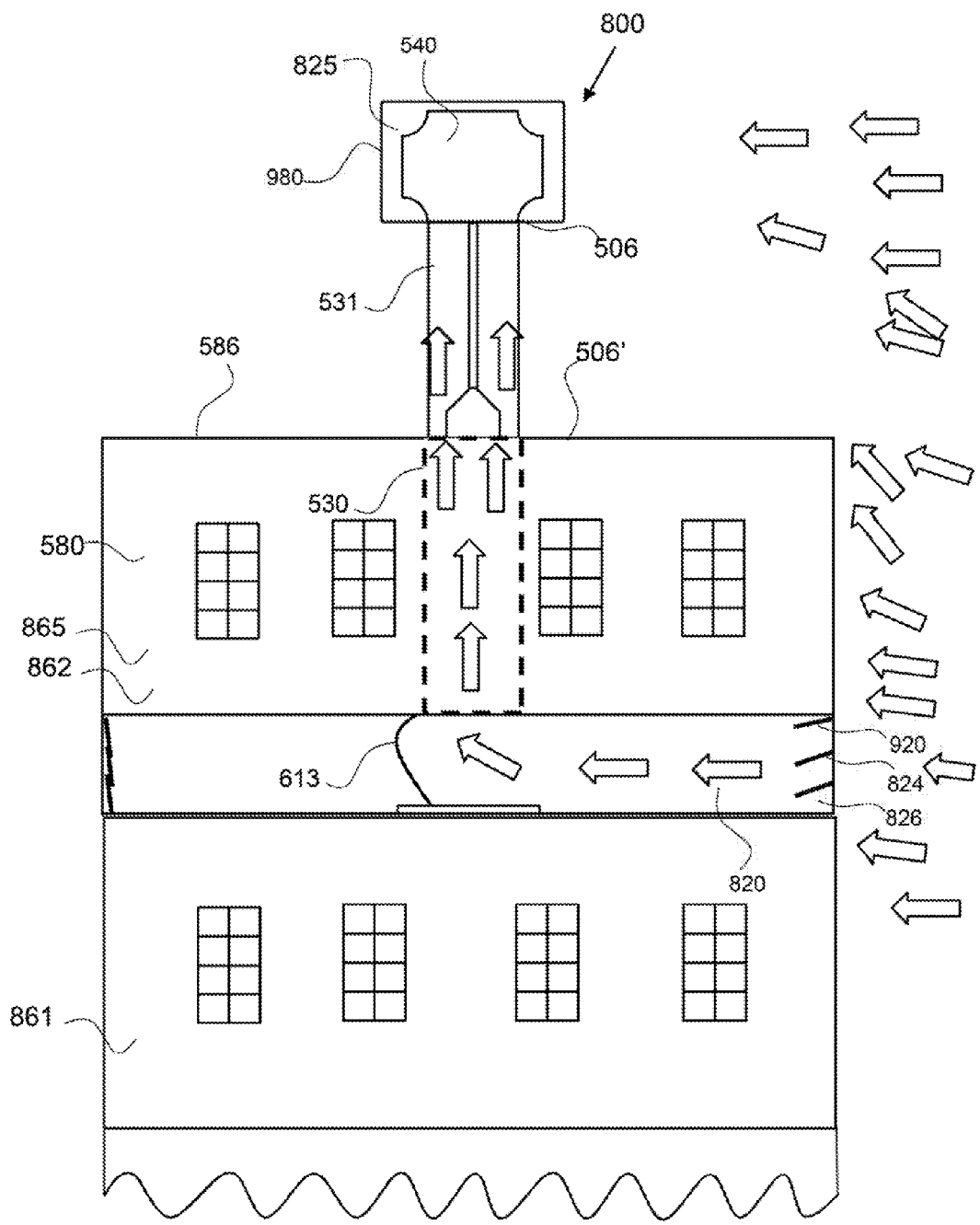
FIG. 55 is a side view of an exemplary building integrated wind power system having a building integrated inflow chamber between a first and second floor of the building and a wind power generating turbine configured above the roof structure that utilizes flexible inlet air curtains, or sheets, to prevent back flow of wind and air flow under highly variable and lower pressure gusty wind conditions of operation.

As shown in FIG. 55, an exemplary building integrated wind power system 800 has a building integrated and compartmentalized inflow chamber 820 (see FIG. 56) between a first floor 861 and second floor 862 of the building 580 and a wind power generating turbine 540 configured above the roof structure. The airflow from one or more of the building integrated and compartmentalized inflow chambers combine and flow into the wind power generating turbine to create power. The wind power generating turbine is configured to receive a second phase air flow from the prevailing wind in this embodiment. A flow tube extension 531 protrudes from top of the building or top of the roof 586 up to the turbine 540 and is coupled with the flow tube 530 that extends up through the building 580. An air scoop 612 directs airflow from the inflow chamber compartments into the flow tube 530. It is understood that the system shown in FIG. 55 may be modified to incorporate the adjustable and rotatable air scoop 613 and/or the passive air dampers, flexible air curtains or sheets. The wind power generating turbine is concealed, wherein it is configured within an enclosure. As used herein a first floor may be any floor of the building and a second floor may be any offset from the first floor. For example, a first floor may be the eight floor from the ground and the second floor as used herein may be the ninth floor, the eleventh floor, the fifth floor and the like. An inflow chamber may extend across a floor or in a space between a first and second floor, such as in the space above the first floor and below a second floor. An inflow chamber may extend vertically through multiple floors. A floor is consider a level that extends substantially horizontally within a building that people occupy and/or reside but does not include crawl spaces, however an inflow chamber between a first and second floor may be configured in a crawl space or duct area between the first and second floors.

Figure 56:
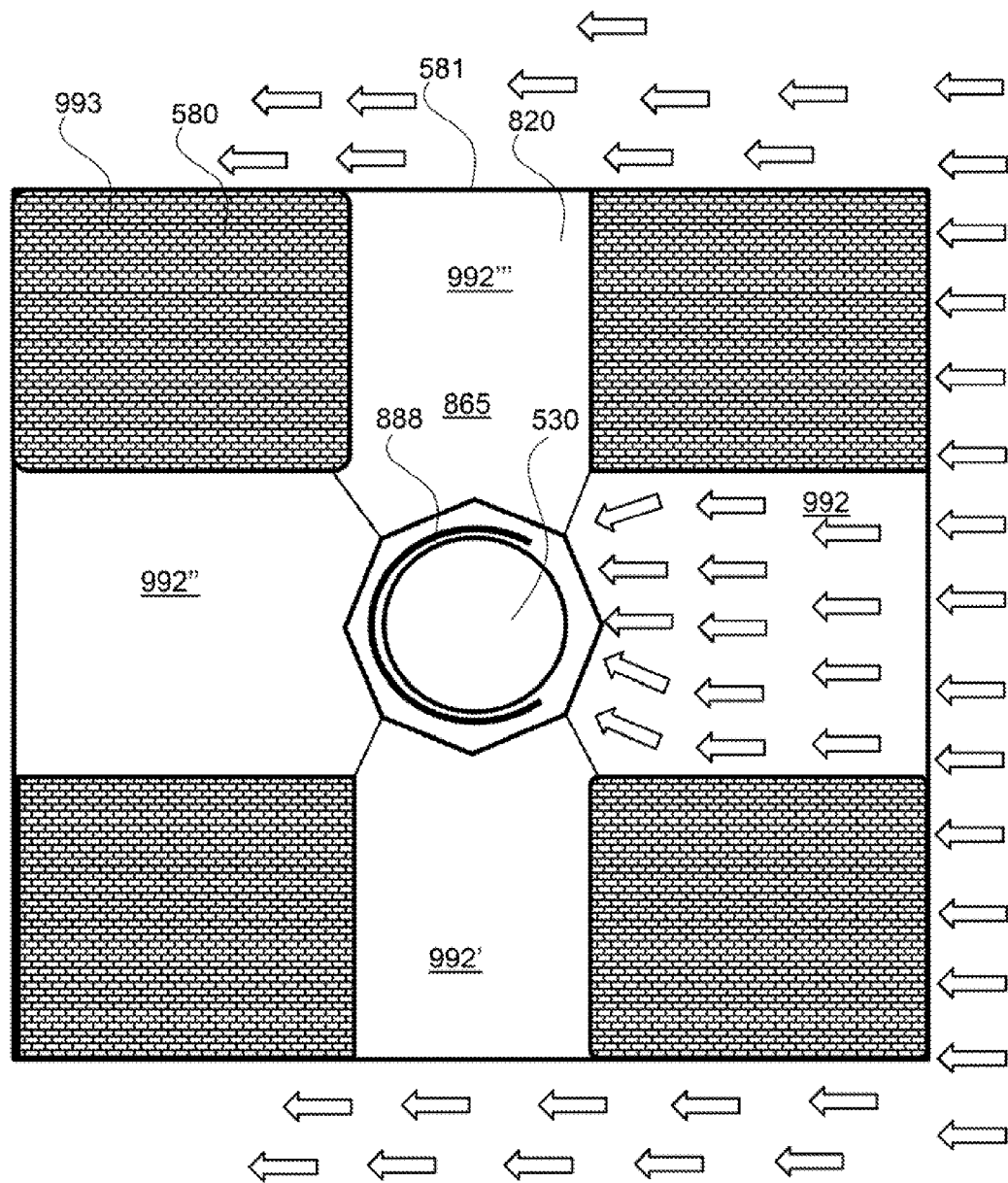
FIG. 56 is a cross-sectional view of a building integrated inflow chamber having inflow conduits that extend from an opening on the exterior of each of the sides of the building to a central inflow area and a flow tube configured in the central inflow area with a dynamic inflow deflector or inlet air scoop which may be actively or passively adjusted or rotated and configured to direct airflow most effectively and efficiently into the flow tube. This configuration allows for more machinery to be located on the same floors as for the inflow and outflow conduits or for vertical access for HVAC ducting and elevator shafts.

As shown in FIG. 56, a building integrated inflow chamber 820 has four or more inflow sections or compartments, which may be dependent on the number of sides designed into the building's structure, such as square, rectangular, hexagonal (i.e. 6), octagonal (i.e. 8), or, may be a round configuration, which could implement an indefinite number of sides and associated compartments. This floor 865 of the building has four room enclosures 993 configured on the corners of the floor. It is to be understood that FIG. 56 could represent a compartmentalized inflow chamber within a roof structure of a building. The inflow conduits 992-992''' shown in FIG. 56 extend from the exterior of the building 581 to a central region. A dynamic deflector 888 rotates about the flow tube to direct flow from the prevailing wind, and from a single inflow conduit 992, into the flow tube 530. Various types of inlet air dampers, deflectors, flexible air curtains or sheets of either a manual or automatic operation and control may be employed at the various inlet openings to better enhance the incoming wind's ability to maximize the pressure differential maintained across the wind turbine rotor assembly for improved wind turbine inlet air flow and resulting overall operation, performance and capacity factor. The adjustable and rotatable inlet air scoop or deflector system can also be expanded or contracted relative to the total number or percentage of sectors or compartments that it is connected to so as to best address optimizing the performance of the overall wind turbine system with regard to the direction of the wind flow relative to the building's orientation should it change for any significant period of time.

Figure 57:
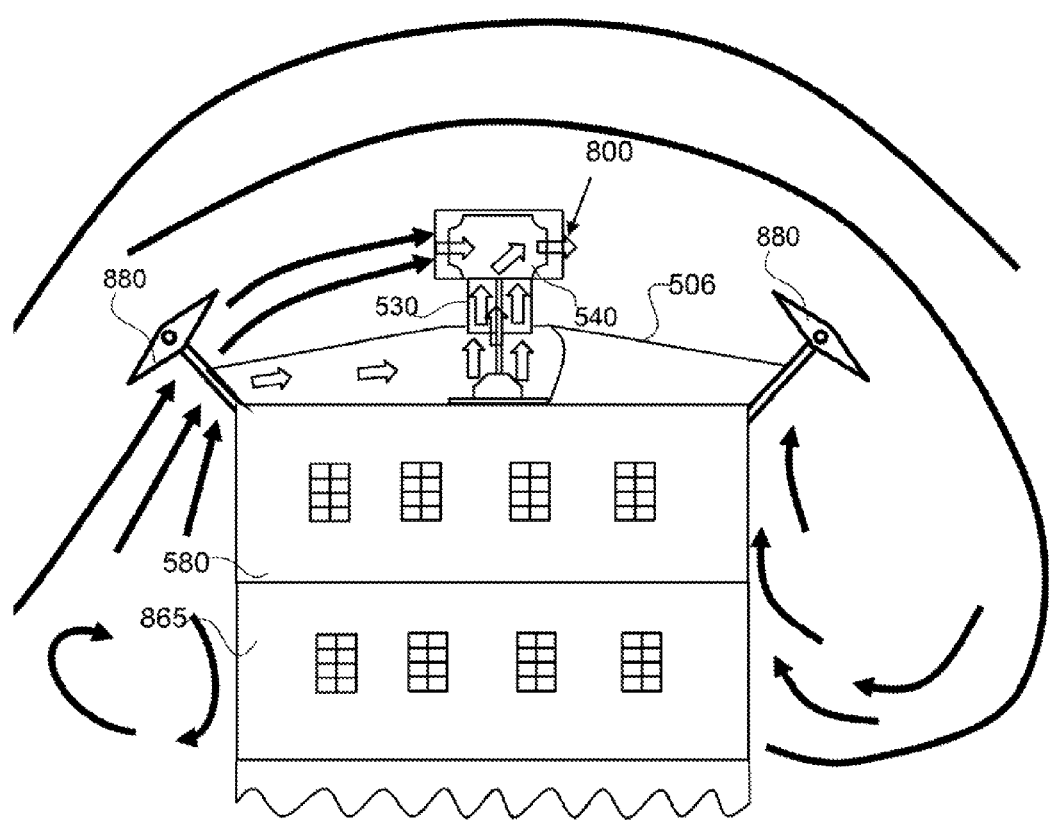
FIG. 57 is a view of an exemplary building integrated wind power system having a building integrated inflow chamber in the roof structure of the building, a wind power generating turbine configured above the roof structure and including building mounted dynamic air deflectors configured around the perimeter of the roof structure to increase the overall building's ability to create the highest possible pressure differential across the building and more focused and increased wind flow through the wind turbine rotor assembly.

As shown in FIG. 57, air deflectors 880 are configured on the perimeter of the building 580 and extend outward from the top of the perimeter of the building to help deflect and direct the uncontrolled approaching prevailing wind to impact the turbine and to enter into the inflow chamber more reliably while using a shorter extended flow tube. Note that a propeller may be used in place of radial outflow turbine shown in FIGS. 54 and 57. The wind power generating turbine is concealed, wherein it is configured within an enclosure.

Figure 58:
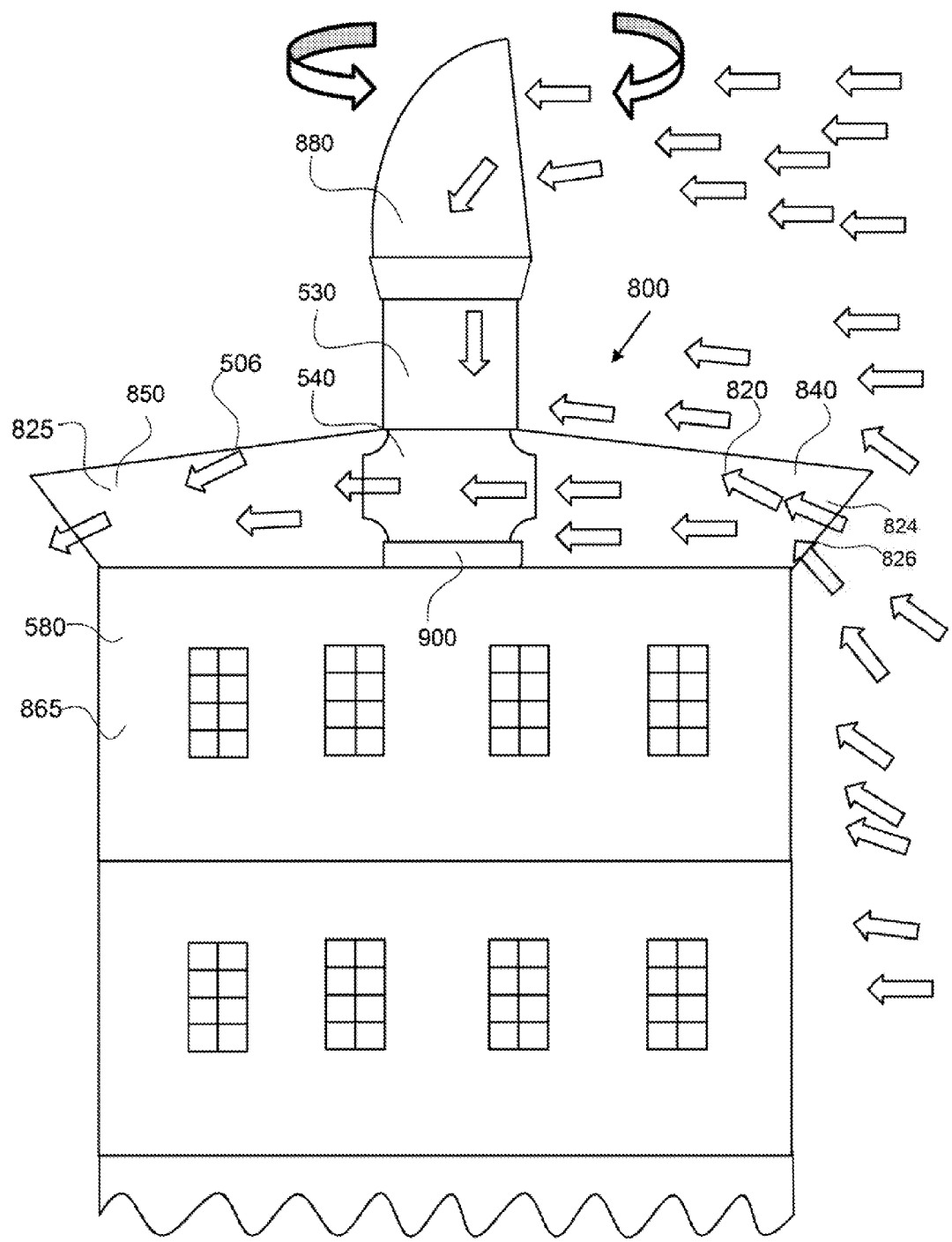
FIG. 58 is a view of an exemplary building integrated wind power system having a building integrated multi-phase wind inflow and outflow chamber in the roof structure of the building and an air scoop type inlet chamber configured above the roof.

As shown in FIG. 58, an exemplary building integrated wind power system 800 has a building integrated over sized inflow chamber 820 in the roof structure 850 of the building 580 and an air deflector 880 configured to direct first phase wind or first stage airflow through the flow tube 530 and into the power generating turbine 540. The rooftop is the separation panel 506 between the first and second phase airflows in this embodiment. The air deflector in this embodiment is configured above the roof structure and is comprised of a scoop, which may be configured to rotate passively or automatically as a function of airflow or by a controller. The roof structure inflow chamber directs airflow that impacts the air blades directly to produce second phase wind or second stage airflow to the power generating device 900. It is to be understood that second phase wind flow may or may not provide second stage airflow that is injected into the outer periphery of the wind turbine rotor assembly for increased power production in all cases. Under certain conditions of second phase wind air flow and wind turbine design and/or operation, the second phase wind air flow may simply flow around the outer periphery of the wind turbine rotor assembly in various ways that may or may not always result in increased power production from the wind turbine system. The exemplary building integrated wind power system 800 shown in FIG. 58 is a multiphase wind power system. The wind power generating turbine is concealed, wherein it is configured within the roof structure of the building.

Figure 59:
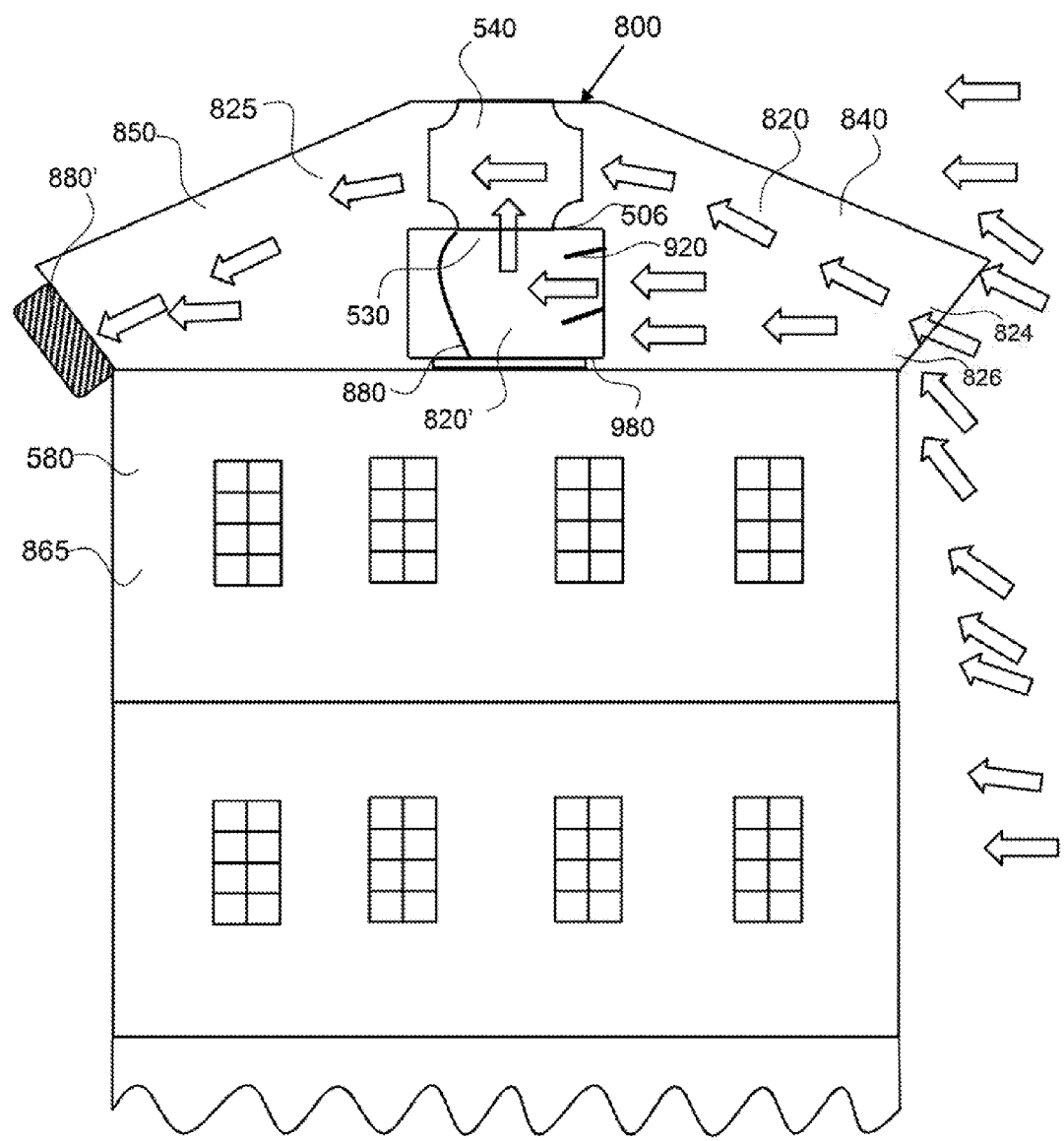
FIG. 59 is a view of an exemplary building integrated wind power system having a building integrated multi-phase wind inflow chamber in the roof structure of the building and an adjustable and rotatable air deflector configured within the roof structure inflow chamber to direct a first stage of the airflow into the power generating turbine.
Figure 60:
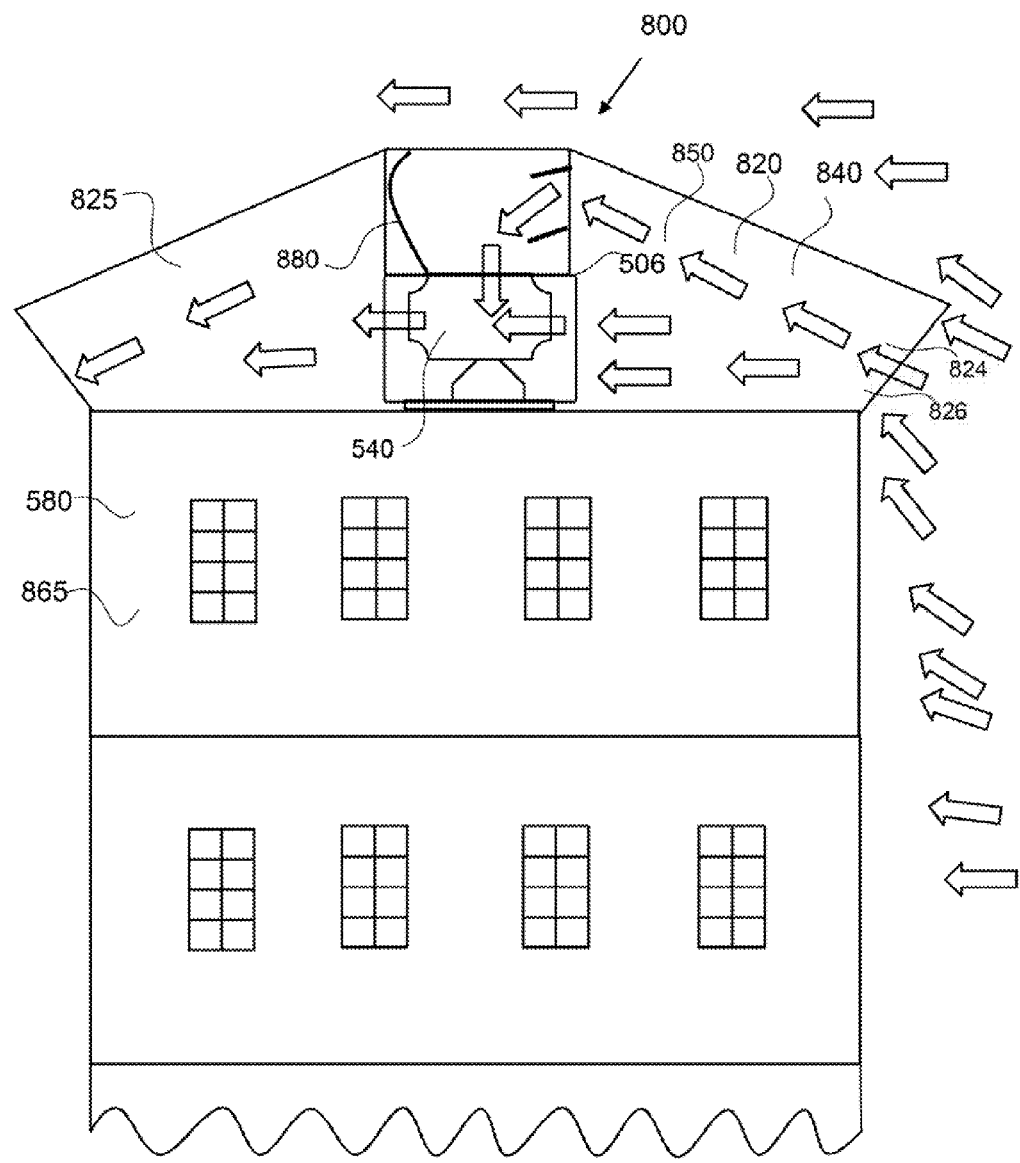
FIG. 60 is a view of an exemplary building integrated wind power system having a building integrated multi-phase wind inflow and outflow chamber in the roof structure of the building and an adjustable and rotatable air deflector configured within the roof structure inflow chamber to direct a portion of the airflow into the power generating turbine.

As shown in FIGS. 59 and 60, an exemplary building integrated wind power system 800 has a common building integrated and compartmentalized inflow chamber 820 (see FIG. 56) in the roof structure 850 of the building 580 and an adjustable and rotatable air deflector 880 configured within the roof structure inflow chamber to direct a portion of the airflow into the power generating turbine. A portion of the inflow chamber airflow is directed into the turbine as first phase airflow. The air deflector may be configured to rotate to direct the flow from the incoming airflow into the air blades. A separation panel 506 is configured between the first and second phase airflow to the turbine. An enclosure 980 with flexible air curtains 920 may be configured to capture and direct first phase airflow to the turbine. This enclosure may be considered a first phase inflow chamber coupled with the turbine. A portion of the airflow in the inflow chamber is second phase wind or second stage airflow that impacts the air blades directly. One or more air deflectors 880 may also be configured around the discharge from the outflow chamber 825 to enhance the vacuum effect from the side stream prevailing wind at the airflow exit from the outflow chamber. The wind power generating turbine is concealed, wherein it is configured within the roof structure of the building.

Figure 61:
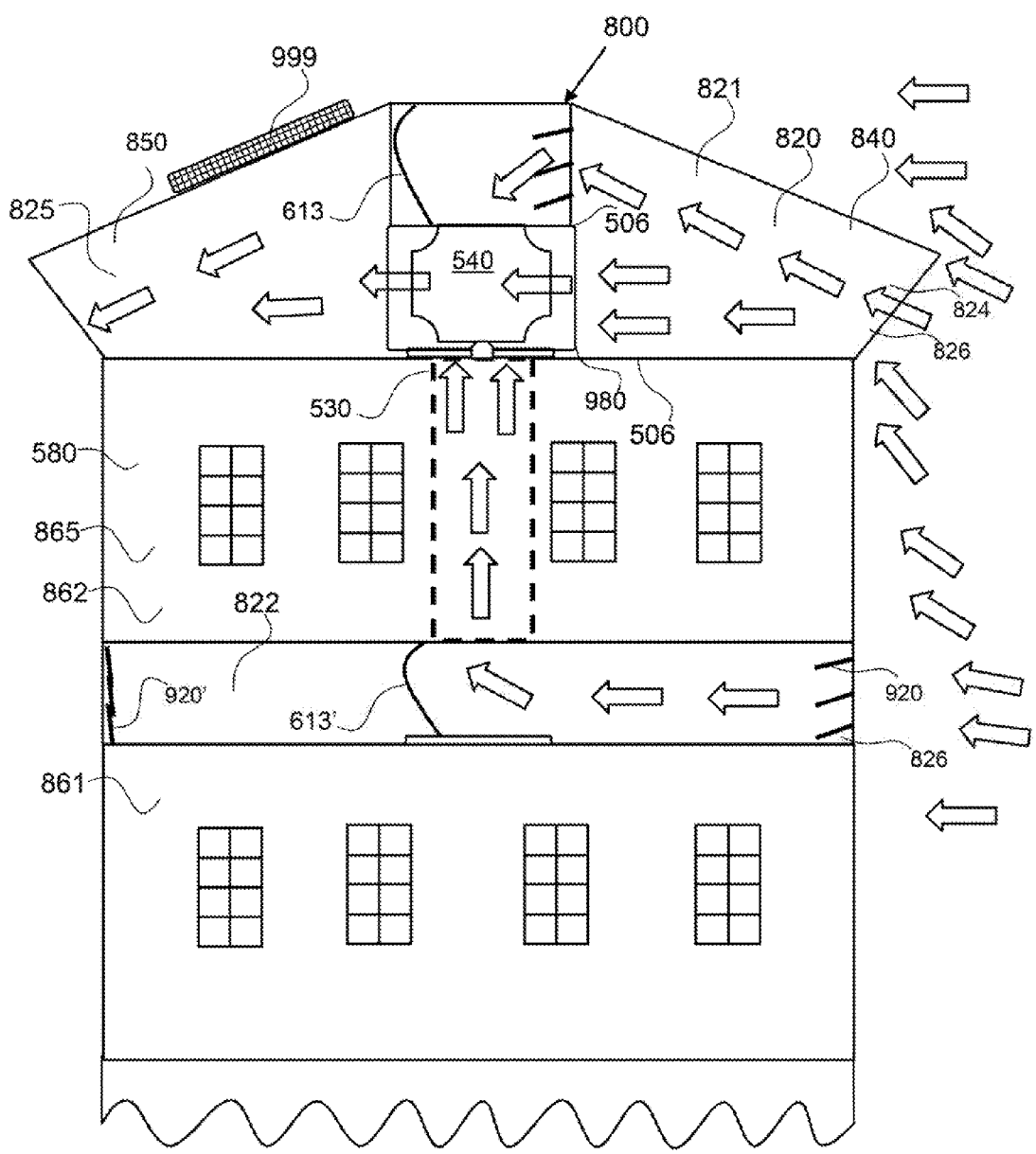
FIG. 61 is a view of an exemplary building integrated wind power system having a first building integrated inflow chamber in the roof structure of the building, a second building integrated inflow chamber between a first and second floor of the building and a wind power generating turbine configured in the roof structure.

As shown in FIG. 61, an exemplary building integrated wind power system 800 has a first building integrated and compartmentalized inflow chamber 821 in the roof structure 850 of the building, a second building integrated inflow chamber 822 between a first floor 861 and a second floor 862 of the building 580 and a wind power generating turbine 540 configured in the roof structure to create a dual wind power generating system, as described herein. Also shown in FIG. 61 are air inlet dampers 920 or flexible sheets or curtains configured on the openings 826 of the second inflow chamber 822 that allow airflow to flow into the inflow chamber, but prevent air from exiting the inflow chamber except by means of the flow tube leading to the lower wind turbine first stage air inlet. This configuration of dampers may provide a higher sustained pressure by design in the inflow chamber by preventing airflow from flowing back out through the inlet of the inflow chamber under more gusty conditions of wind conditions and operation. It is to be understood that the first and second floors may be any floors in the building, such as floor 45 and floor 46 for example. The top of the second floor 862 is a separation panel 506, as it separates first phase airflow to the turbine from second phase airflow. Also shown in FIG. 61 is an array of solar panels 999 configured on the roof-top. The solar panels may be used in combination with the building integrated wind power system 800. The combination of wind and solar power may be used in conjunction to provide power to the building and/or back to the power grid. The building integrated wind power system 800 and/or the solar panels may be used to reduce the power requirements of the building, including power for an HVAC system, and in some cases any excess energy produced may be put back into the power grid. Under certain conditions of building integrated wind turbine system design, the increased air pressure from either or both the first and second phase wind inflow chambers may be directly fed to the inlets to the HVAC fresh air fans to reduce the HVAC system parasitic electrical loads for the building. Thus, the electrical and mechanical inefficiencies of both the wind turbine system as well as for the HVAC ventilation system are thereby avoided with a net gain resulting in the overall building energy efficiency. Other fresh air fans within the building may also benefit from this more integrated design approach.

Figure 62:
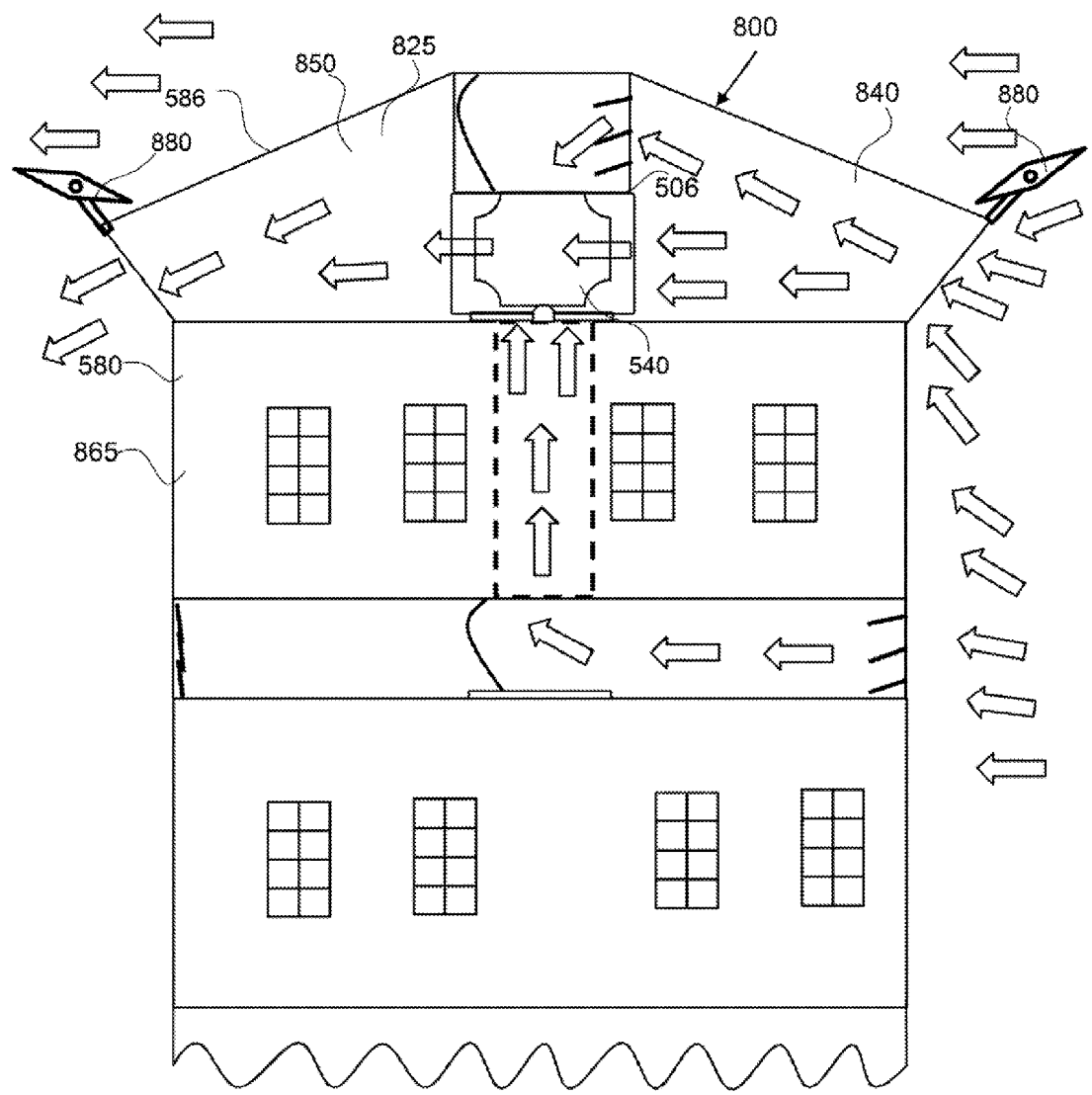
FIG. 62 is a view of an exemplary building integrated wind power system having a first building integrated multi-phase wind inflow and outflow chamber in the roof structure of the building, a second building integrated inflow chamber between a first and a second floor of the building and a wind power generating turbine configured within the roof structure and dynamic air deflectors configured around the perimeter of the roof structure for pressure differential enhancement.

As shown in FIG. 62, an exemplary building integrated wind power system 800 has a wind turbine system assembly 540 configured completely within a roof structure 850, or completely under the roof 586 of the building 580. Air deflectors 880 deflect and direct the prevailing wind into the inflow chamber 840 and also help to produce an improved vacuum effect at the airflow exit. These deflectors would need to be automatically repositioned for maximum effectiveness as the direction of the approaching wind changes.

Figure 63:
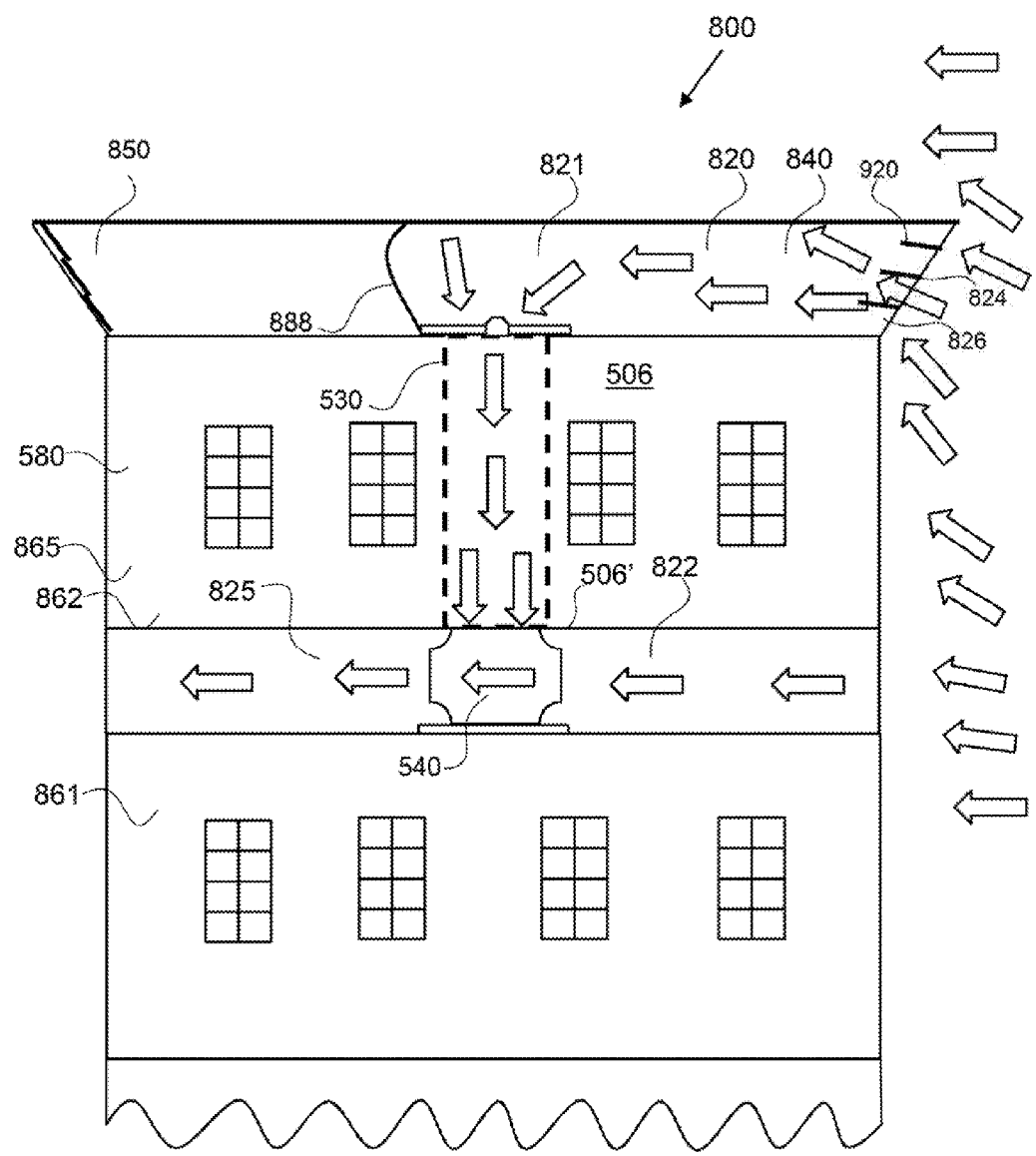
FIG. 63 is a view of an exemplary building integrated wind power system having a building integrated inflow chamber in the roof structure of the building, and an outflow chamber with a second phase wind flow impingement section included between a first and second floor of the building with a wind power generating turbine also configured between said first and second floors of the building and located within the said outlet flow chamber with second phase wind flow impingement section.

As shown in FIG. 63, an exemplary building integrated wind power system 800 has a first building integrated inflow chamber 821 in the roof structure 850 of the building 580, a second building integrated inflow chamber 822 between a first floor 861 and a second floor 862 of the building and a wind power generating turbine 540 configured between said first and second floors of the building or at least partially within the second inflow chamber. The second building integrated inflow chamber 822 provides second phase airflow to the turbine while the roof structure inflow chamber 840 provides first phase airflow to the turbine through the flow tube 530. A dynamic airflow deflector 888 is configured in the first inflow chamber to direct airflow into the flow tube 530 and to the turbine, and is configured to rotate either automatically or through a powered controller.

Figure 64:
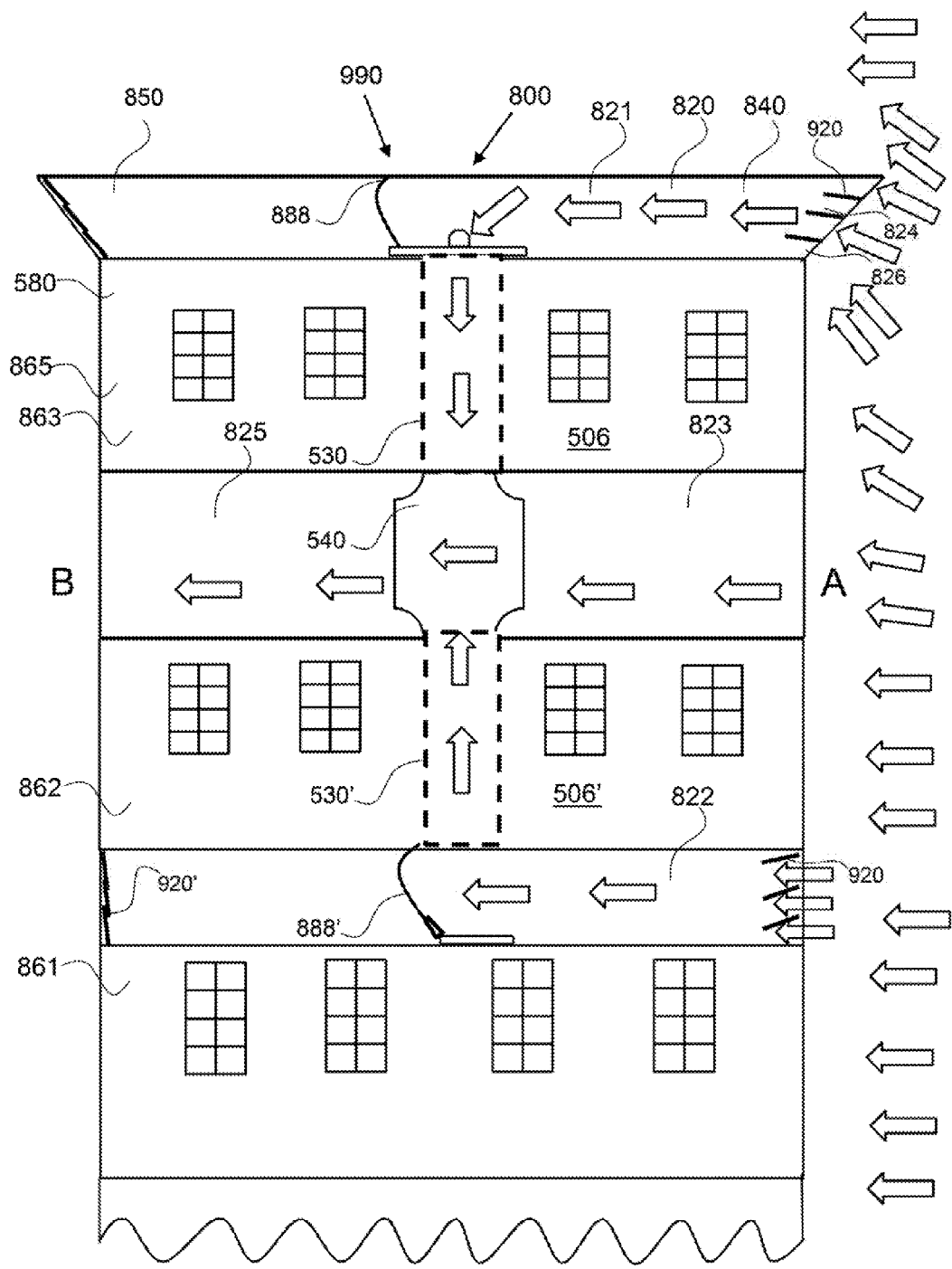
FIG. 64 is a front view of an exemplary building integrated wind power system having a first building integrated inflow chamber in the roof structure of the building, a second building integrated inflow chamber between a first and second floor of the building and a wind power generating turbine configured between the first and second building integrated inflow chambers and located within an outflow chamber having a second phase wind flow impingement section. The building has a front side shown, and sides A and B as indicated by the bold letters.

As shown in FIG. 64 an exemplary dual multiphase building integrated wind power system 800 has a first building integrated inflow chamber 821 in the roof structure 850 of the building 580, a second building integrated inflow chamber 822 between a first floor 861 and a second floor 862 of the building and a wind power generating turbine 540 configured between the first and second building integrated inflow chambers. A third inflow chamber 823 provides a second phase airflow or stage of airflow to the wind power generating turbine 540. This embodiment is an example of a dual wind power generating system 990, as described herein. It is to be understood that the turbine may be configured proximal to the first or second inflow chambers or any number of floors from the first and/or second inflow chambers. For example, five floors may separate the third inflow chamber from the first inflow chamber or roof structure and ten floors may separate the third inflow chamber from the second inflow chamber, and so on. In this embodiment, the third and second floors or a portion of the floors, such as the bottom of the third floor 863 and the top of the second floor 862 are separation panels, as they separate the first phase airflow from the second phase airflow.

Figure 65:
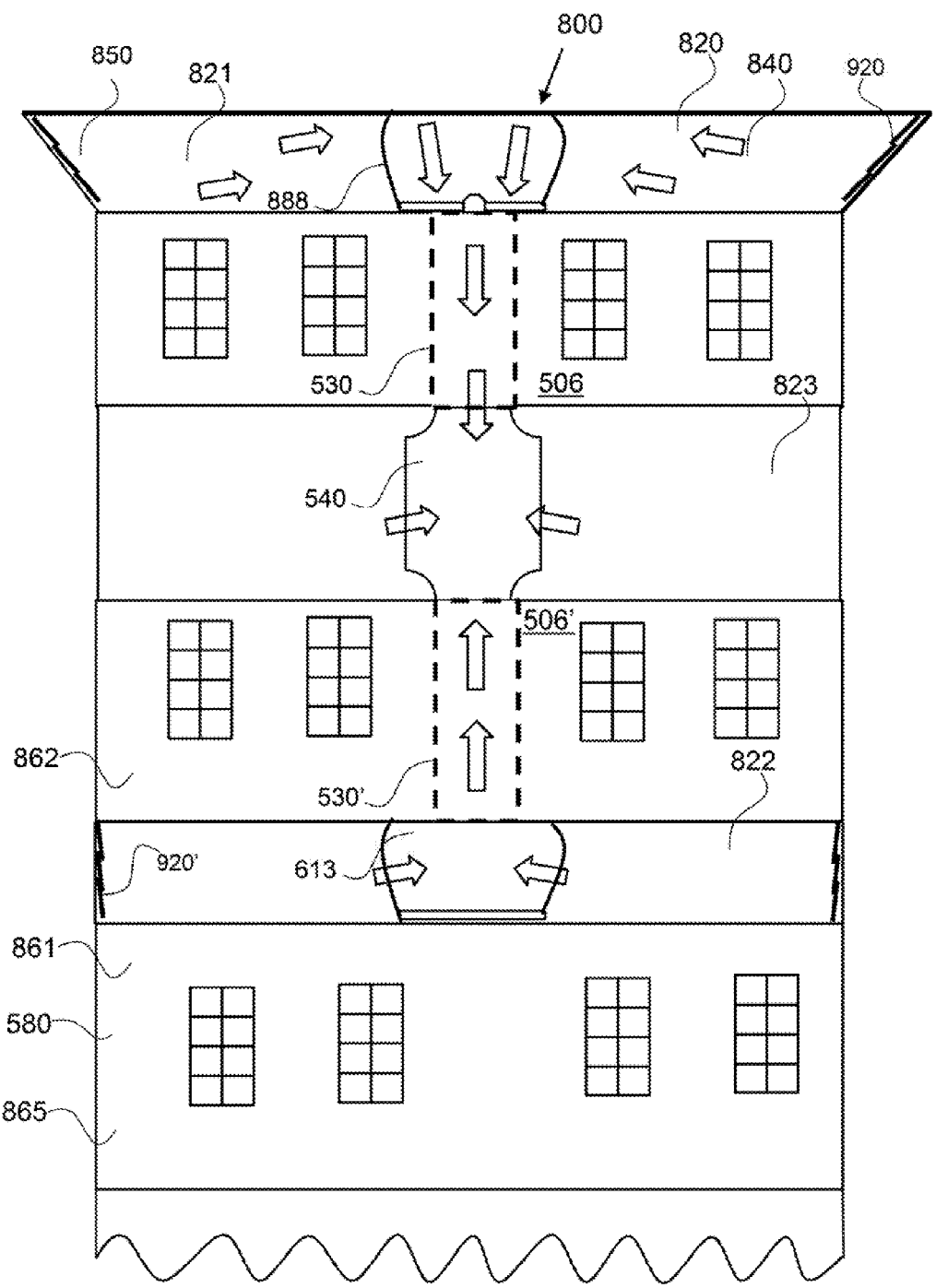
FIG. 65 is a side A, or upstream wind and air flow, view of the exemplary building integrated wind power system shown in FIG. 59.

FIG. 65 is a side view of the exemplary building integrated wind power system 800 shown in FIG. 64. The dynamic inflow chamber air deflectors 888, 888' are shown defecting airflow from the respective chambers into vertical flow tubes 530, 530' respectively. The airflow is flowing into inflow chambers from the shown face of the building in this view. As an alternative, flexible air curtains could be utilized within an open plenum inlet air chamber shown in Figure 888'.

Figure 66:
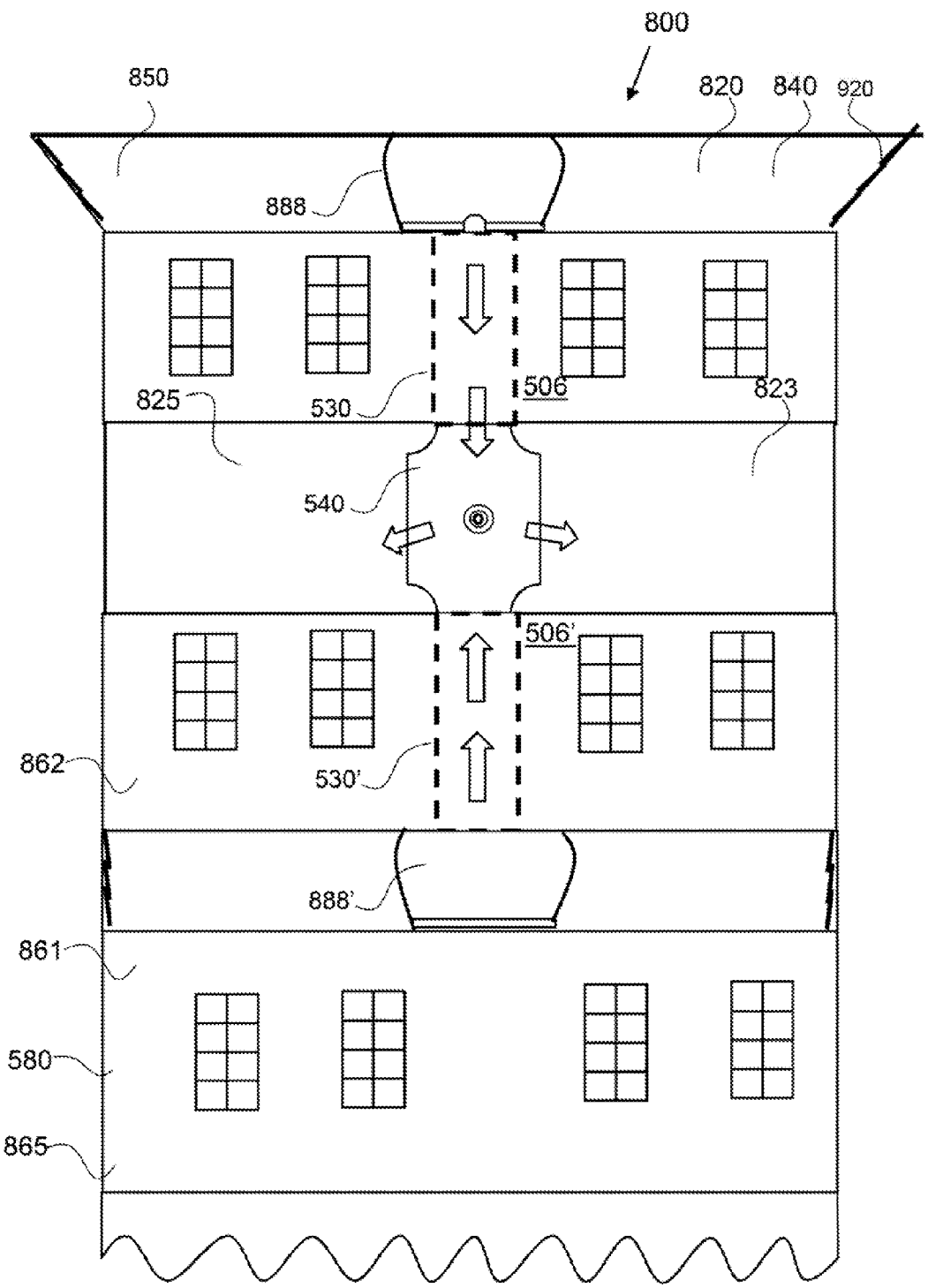
FIG. 66 is a side B, or downstream wind and air exhaust flow, view of the exemplary building integrated wind power system shown in FIG. 59.

As shown in FIG. 66 a back view of the exemplary building integrated wind power system 800 is used as shown in FIG. 64. In this view the air is exiting the third inflow chamber 823 on the two sides and on the downwind side, which serves as the exhaust or outflow section for the wind turbine rotor assembly.

Figure 67:
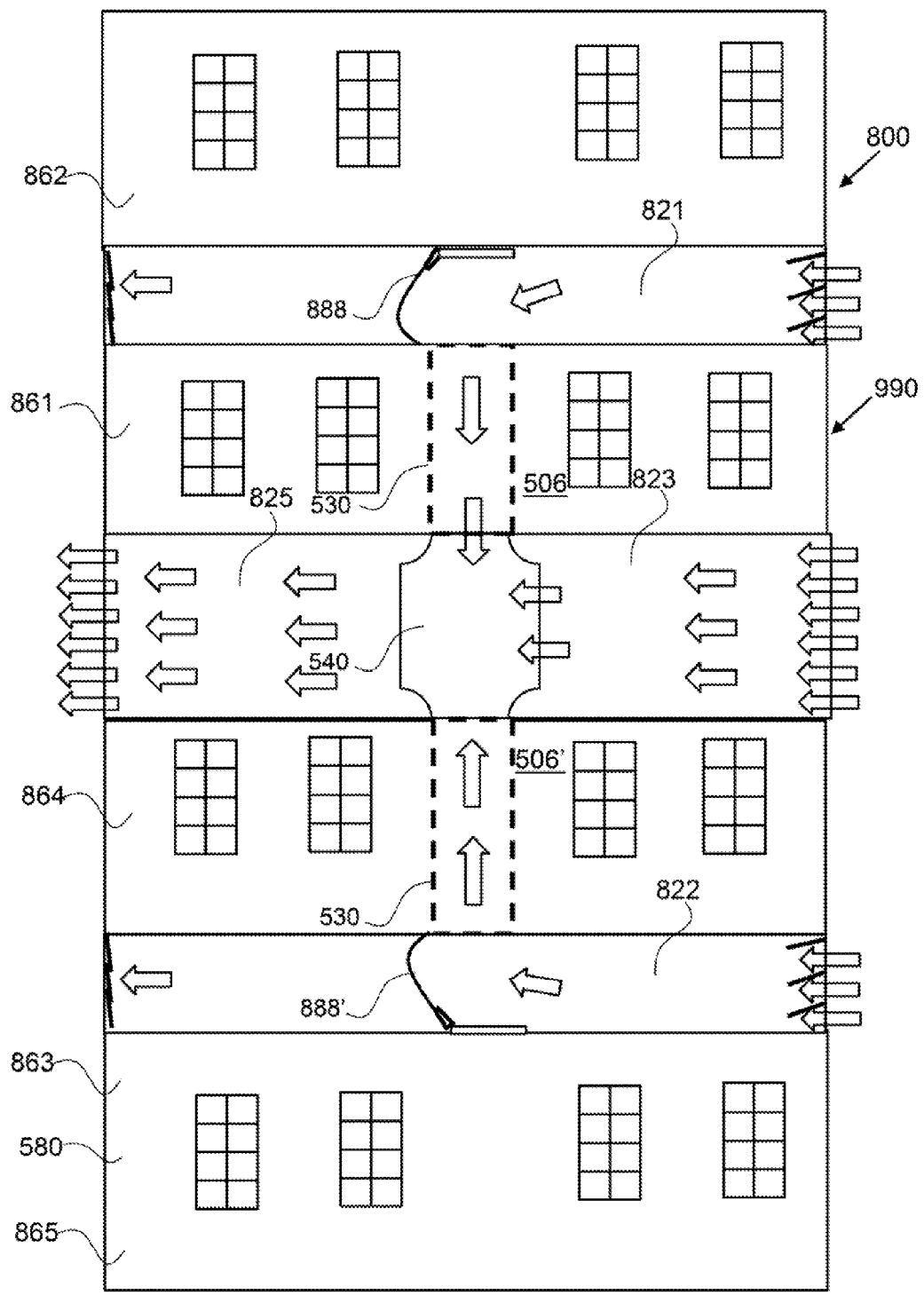
FIG. 67 is a view of an exemplary building integrated wind power system having a first building integrated inflow chamber between a first and a second floor of the building, a second building integrated inflow chamber between a third and a fourth floor of the building and a wind power generating turbine configured between the first and second building integrated inflow chambers in an outflow chamber with second phase wind impingement section

As shown in FIG. 67, an exemplary building integrated wind power system 800 has a first building integrated inflow chamber 821 between a first 861 and second floor 862 of the building 580, a second building integrated inflow chamber 822 between a third floor 863 and a fourth floor 864 of the building and a wind power generating turbine 540 configured between the first and second building integrated inflow chambers. A third inflow chamber 823 located between a fifth and sixth floor level also serves as the outflow chamber and provides a second phase wind and air inflow to the wind power generating turbine 540. This embodiment is an example of a dual wind power generating system 990, as described herein.

Figure 68:
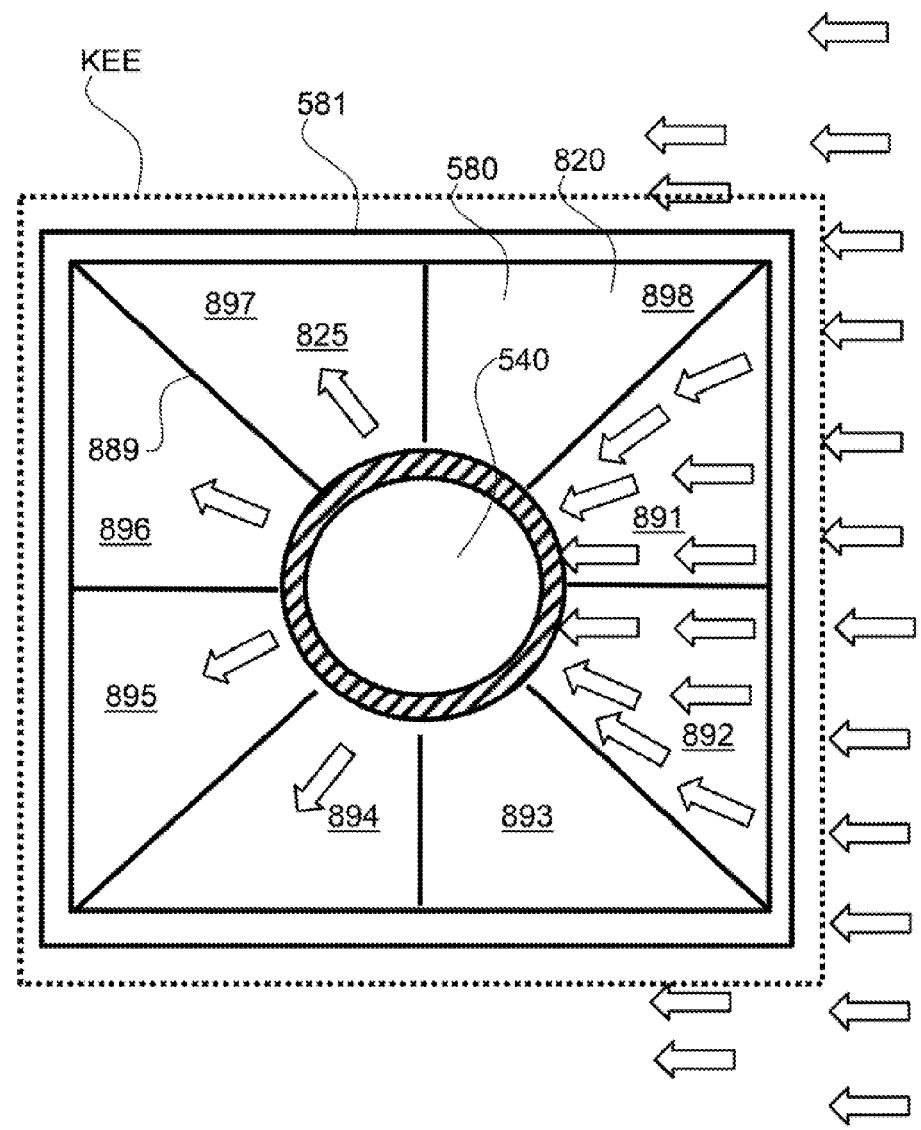
FIG. 68 is a cross-sectional view of a building integrated wind energy power enhancer system with combined single phase wind inflow and outflow chambers having a radial cross flow turbine with contained air flow at both the sides, bottom and top of the wind turbine rotor assembly for improved performance with a higher combined differential pressure and air flow total created with a resulting improved power generating capability between the inlet and outlet of the wind turbine rotor assembly in a horizontal direction while being centrally located and configured between the external air deflector and wind concentrator type sector plates.

As shown in FIG. 68, a plurality of sector deflectors 889 that separate the building integrated inflow chamber 820 into sectors or compartments that extend from the flow tube 530 to the exterior 581 of the building 580 where there are openings to receive an airflow. A radial cross flow or Darrious-giro type wind turbine 540 is centrally located within the inflow chamber 820 and receives an airflow to drive the air blades and produce useful power, with airflow being introduced into the radial cross flow turbine from sectors 891 and 892 and out through sectors 893-898. Note that a higher efficiency radial cross flow type turbine such as described in this application may also be configured in place of the Darrious-giro type wind turbine in this embodiment. Note that only two of the sectors are utilized for inflow while four to six of the sectors are utilized for outflow. This dramatic increase in area for the outflow airflow maintains a high pressure drop across the turbine. This is an example of a cross-flow inflow chamber as the airflow enters and exits across the inflow chamber, or from a first a side to a second side and back into the prevailing wind. In this embodiment, a portion of the inflow chamber receives air inflow and a larger portion, or cross sectional area allows outflow of the airflow. This larger cross-sectional area for outflow maintains a high pressure drop through the turbine. As shown, two of the sectors are receiving air inflow and four have air outflow. A ratio of inflow to outflow cross-sectional area may be maintained at 0.5 or less, or more preferably less than about 0.33 or 0.25. The number of sectors and shape of the building may impact this ratio.

Figure 69:
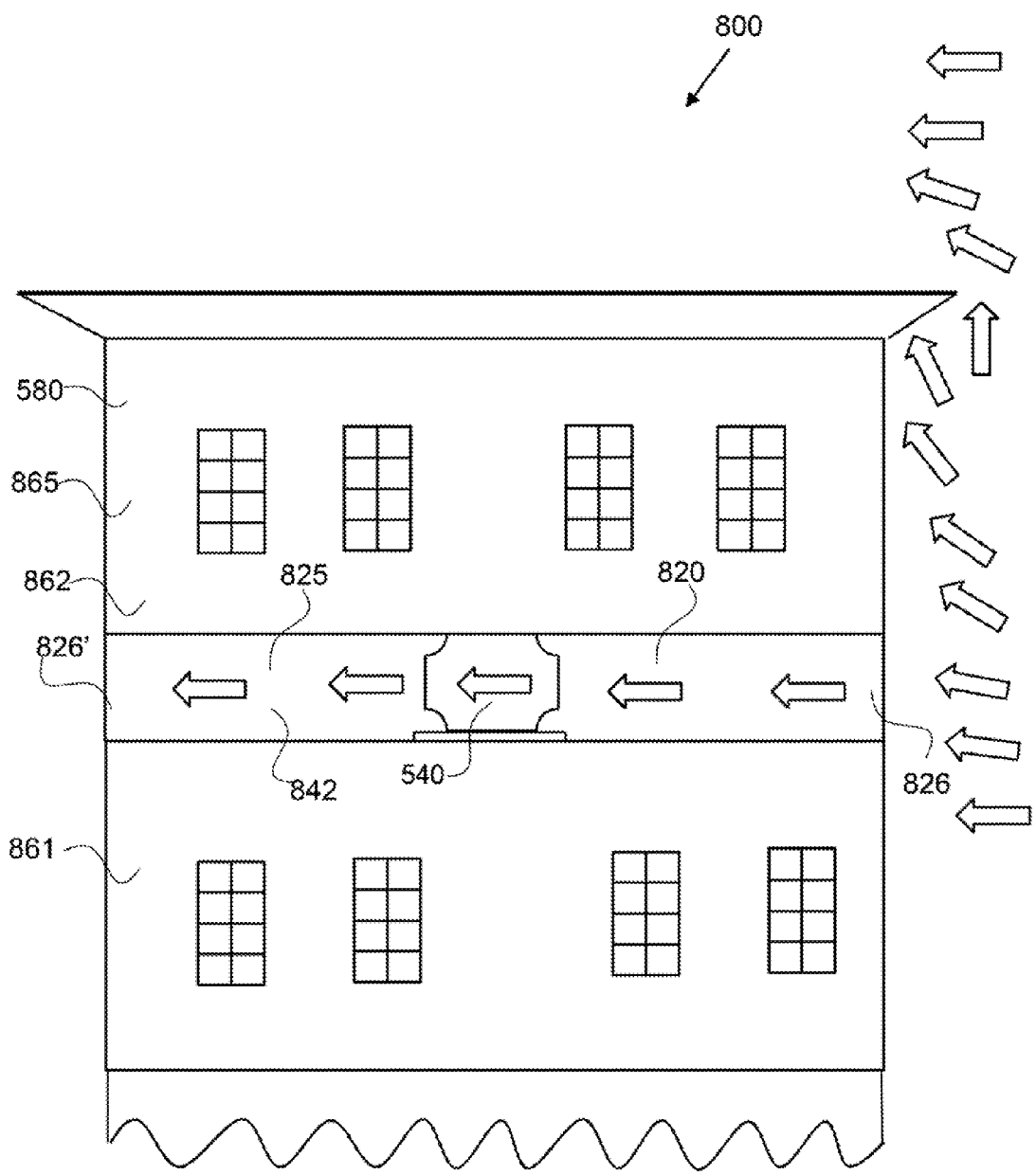
FIG. 69 is a side view of an exemplary building integrated wind power system having a building integrated inflow chamber between floors of the building and a radial cross flow type turbine centrally configured between said floors of the building.

FIG. 69 shows an exemplary cross-flow building integrated wind power system 800 comprising a radial cross flow turbine having air foil air blades or a Darrious-giro type wind turbine configured in a common building inflow and outflow chamber between a first and second floor of the building 580. In this embodiment, the power generating turbine 540 receives first phase wind or first stage air flow only from the floor inflow chamber 842 to generate power. Both the inlet and outlet are configured on the same floor in this example of a cross-flow building integrated wind power system. Passively actuated, vertically orientated wind deflection dampers may be useful at the inlets and outlets of the common inflow/outflow chambers to help improve wind capture and vacuum creation characteristics for the overall wind turbine system in some cases. These dampers or deflectors would not be intended for a tight shut off design condition. The cross-flow inflow chamber 820 has openings 826 around the perimeter of the building, or on a first side to receive incoming airflow from the prevailing wind and openings 826 to allow air outflow from the inflow chamber back into the prevailing wind on a second side of the inflow chamber or building.

Figure 70:
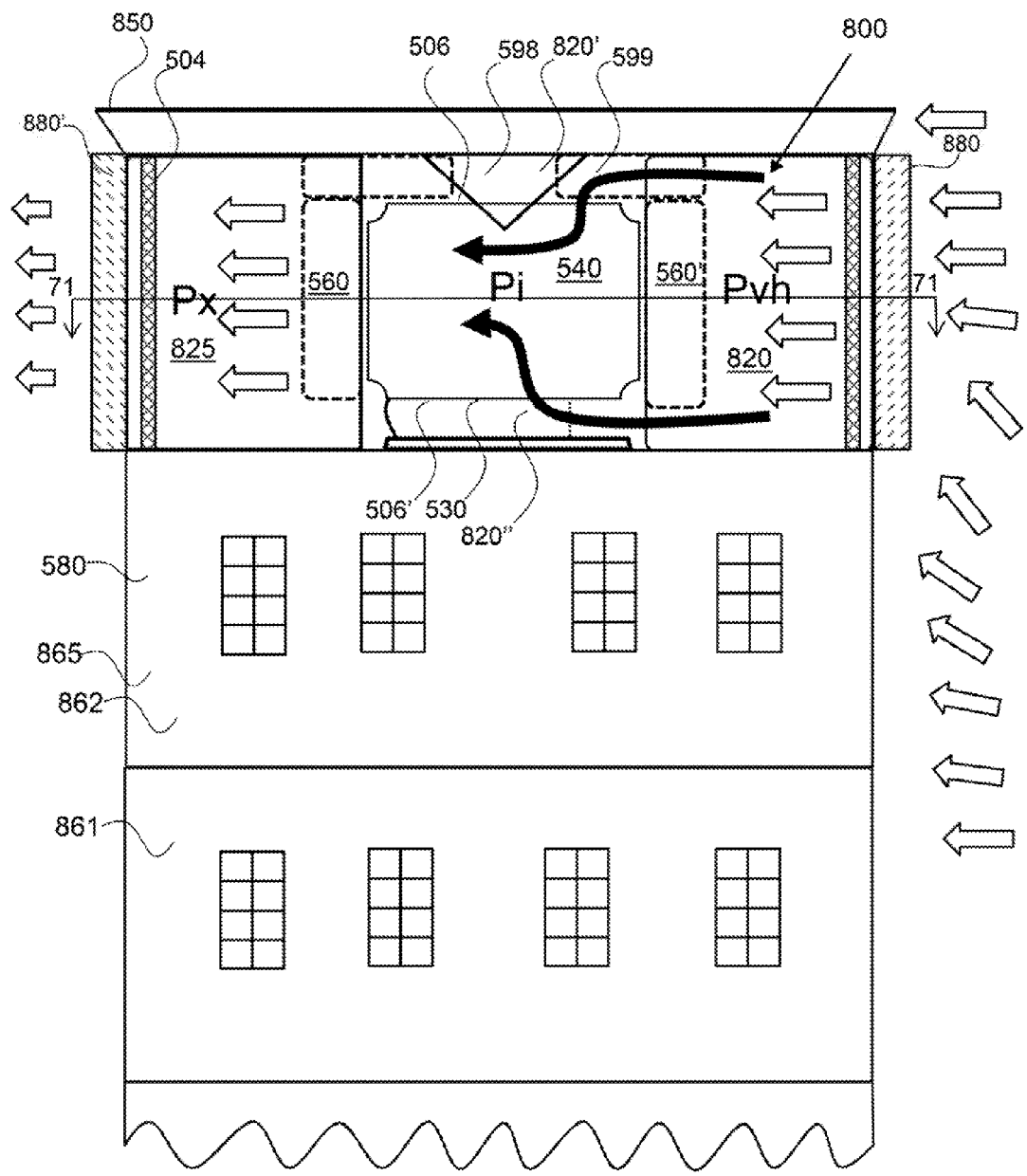
FIG. 70 shows a side view of an exemplary dual multi-phase, double inlet with single radial outflow turbine configured in a common cross-flow type inflow and outflow chamber type duct system design located 100 percent within a building.
Figure 71:
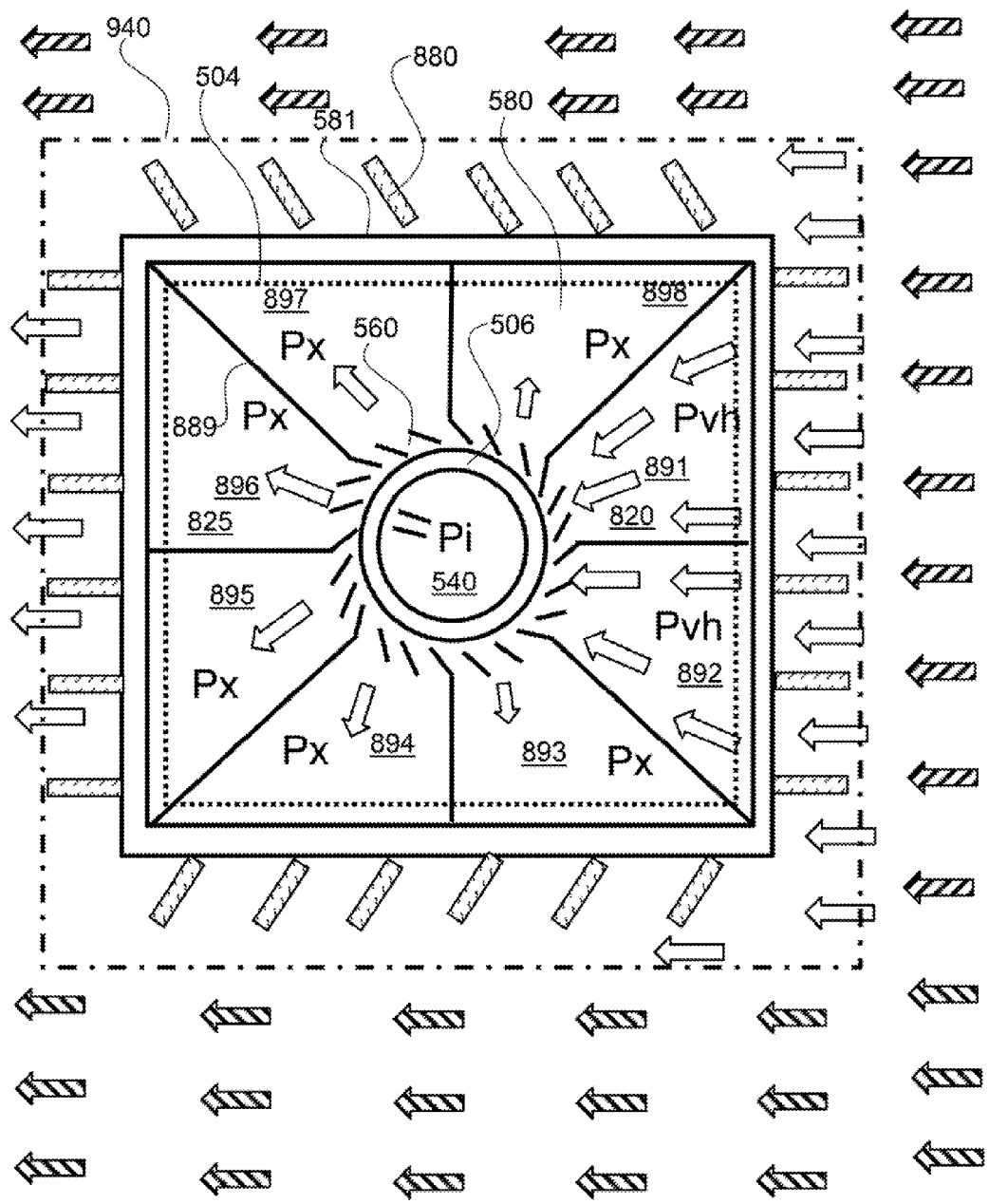
FIG. 71 shows a plan view of an exemplary dual multi-phase, double inlet with single radial outflow turbine configured in a common cross-flow type inflow and outflow chamber type duct system located 100 percent within a building and showing the boundaries of a kinetic energy envelope around the building.

As shown in FIG. 70 and FIG. 71, an exemplary radial outflow wind turbine 540 is configured within a cross-flow duct within a building and is of a cross-flow dual multi-phased wind energy power enhancer system design having a double or top and bottom first stage air inlet to the wind turbine rotor. This is another example of a cross-flow building integrated wind power system. The integrated inflow chamber 820 receives first and second phase airflow that is then separated, wherein first phase airflow is received in the integrated inflow chambers 820' and 820". The first phase airflow passes through separation panels 506, 506' into the power generating turbine 540. The separation panels are enclosure plates around the wind power generating turbine and separate the first phase airflow from the second phase airflow. The flow tube 530' in the inlet to the turbine 540. The first phase airflow enters the wind power generating turbine in a direction essentially perpendicular to the direction of the second phase airflow entering the turbine. The second phase airflow impacts the air blades after passing through the deflector plates 560. Passively positioned wind deflectors 880 are provided in an unbalanced or off center vertically orientated support shaft configuration that extend outward from the outside of the building to enhance the air flow capture effectiveness from the prevailing wind into the inlet airflow chamber. This is especially effective when the wind flow approaching the building is coming from angles other than perpendicular to the side walls of the building. The wind deflectors also passively position themselves in the wind on the sides and downstream walls of the building relative to the direction of the approaching wind to help enhance the wind turbine downstream aspiration or vacuum effect, with an increased total pressure differential created across the wind turbine rotor air blades. Sector deflectors 889 further direct airflow within the airflow chamber 820 toward and away from the turbine as required. Additional directional deflectors 560 are configured around the outer perimeter of the turbine to further direct flow into the turbine in the direction of rotation of the turbine. These directional deflectors reduce power loss by preventing the approaching second phase wind flow from impacting the air blades on the turbine rotor "up spin" side as they approach in a counter-rotational direction to the incoming air flow. Vortex deflectors 599 extend over the top of the turbine to direct first phase air flow into the top inlet of the turbine in a rotational direction that is the same as the direction of rotation of the turbine blades. A vortex baffle 598 further directs the flow of air into the turbine under positive pressure conditions to enhance the pressure differential across the wind turbine air blades. Any of these deflectors described may be fixed or may be passive and move automatically with the change in direction of the wind and/or airflow, or could be adjustable either automatically or manually. This configuration helps to increase the pressure within the turbine by directionally guiding the airflow into the turbine. The airflow within the inflow chamber has a total pressure that is increased over that from the approaching wind by the directional deflectors, including the converging sector deflectors. The outlet pressure from the wind turbine rotor is further reduced by the large diverging cross sectional area provided by the multiple outlet airflow chambers. This particular configuration provides a very high total pressure differential to be created from the inside to the outside of the wind turbine rotor assembly which results in the maximum creation of wind flow through the wind turbine rotor with resulting increased power production.

Figure 72:
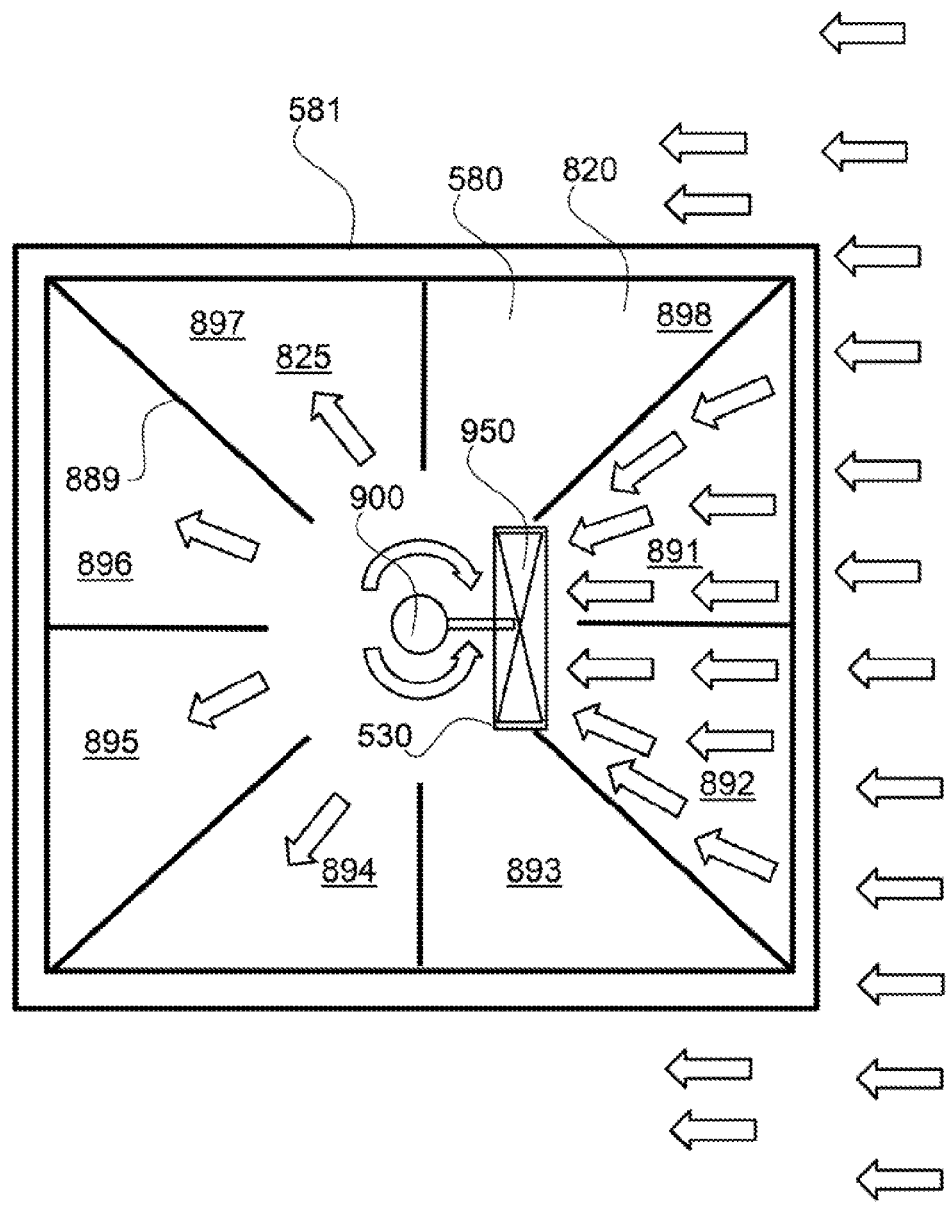
FIG. 72 is a top-down cross-sectional view of an upstream yawed horizontal propeller or axial flow type wind turbine system making direct contact with the wind flow coming from the inflow sections and exhausting directly to the low velocity outflow sections.

As shown in FIG. 72, a building integrated inflow chamber 820 has a horizontal propeller mounted upstream of the support tower 950 type power generating device configured to rotate into the direction of the airflow. The propeller 950 is configured to rotate toward the sector(s) having the highest air inflow and wind pressure. This type of power generating system may be configured between floors of a building at a single floor elevation or in a roof structure. These inflow and outflow sections automatically change function most effectively as the wind direction changes around the building, and the actively yawed wind turbine system is automatically relocated to more effectively line up with those sections where the incoming wind/air flow is most productive from the incoming wind/air flow conditions on an instant by instant basis. A ring type flow tube 530 extends around the propeller and moves with the propeller.

Figure 73:
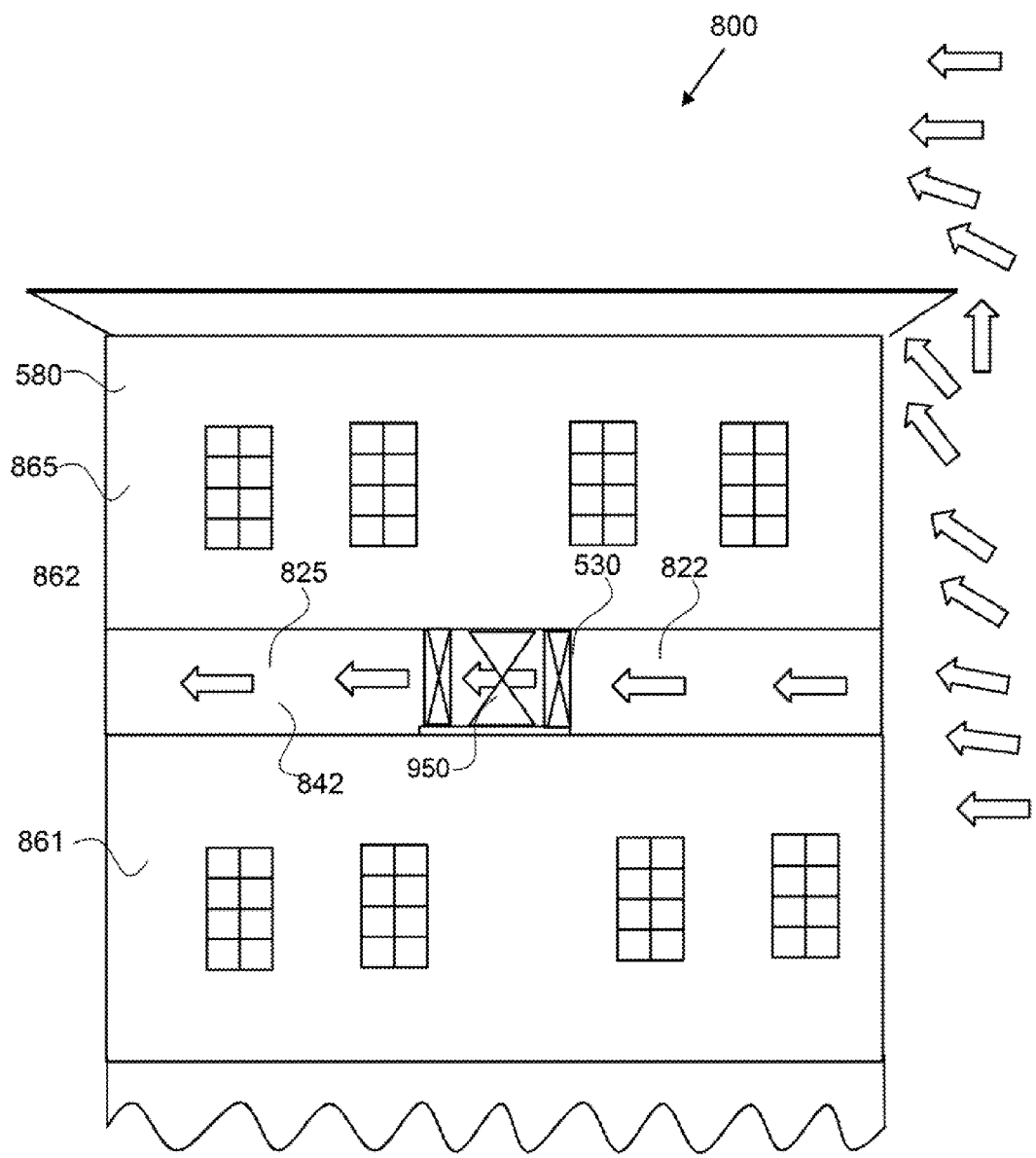
FIG. 73 is a side view of an exemplary building integrated wind power system having a single phase wind building integrated combined inflow and outflow chambers between floors of the building and a plurality of propellers configured within or just before or just after said chambers between said floors of the building.
Figure 74:
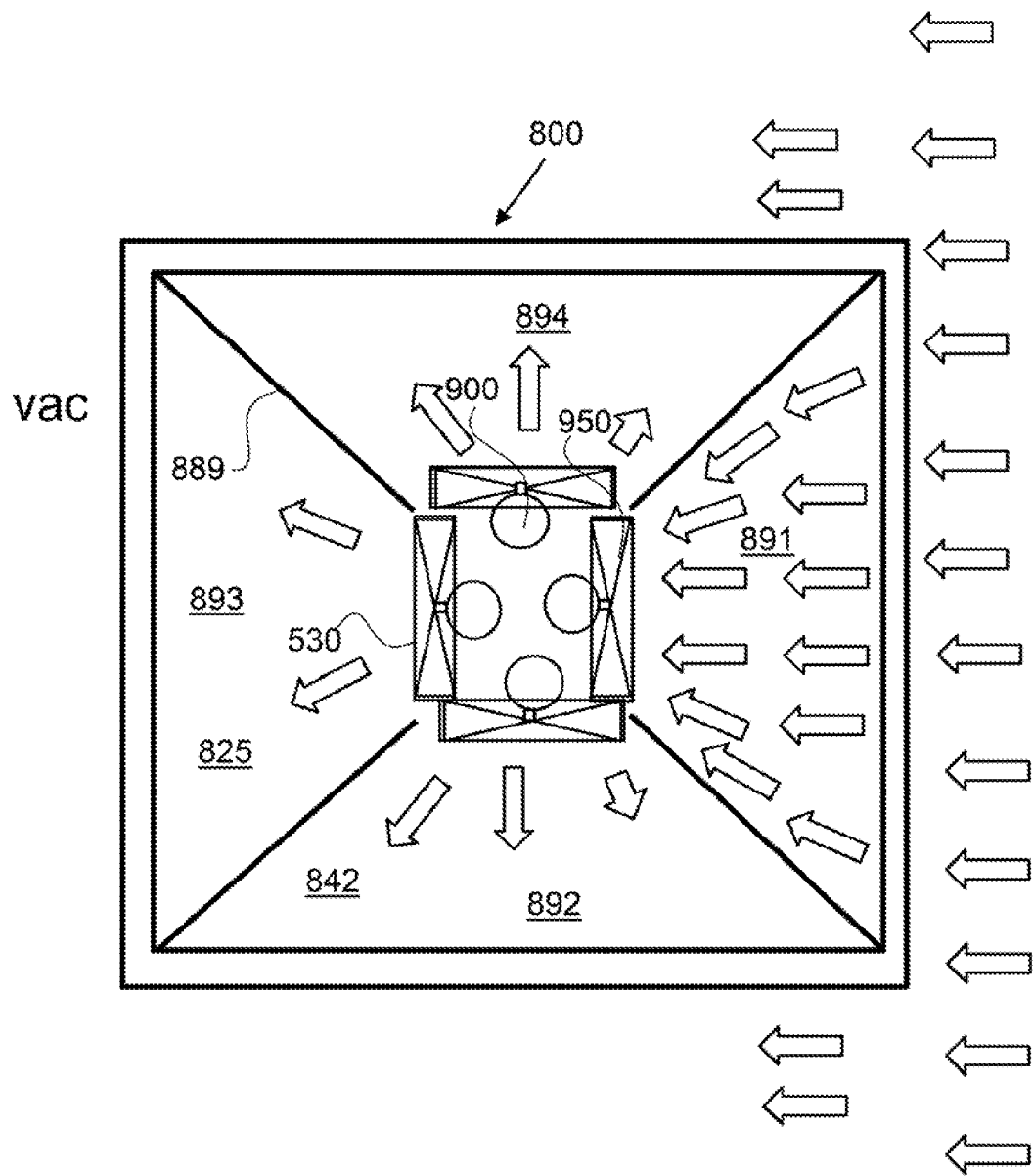
FIG. 74 is a top-down cross-sectional view the exemplary building integrated wind power system shown in FIG. 71, having a building integrated inflow chamber between floors of the building and a plurality of propellers configured between said floors of the building and located at the point of highest possible total pressure differential across the propellers for maximum power production.
Figure 75:
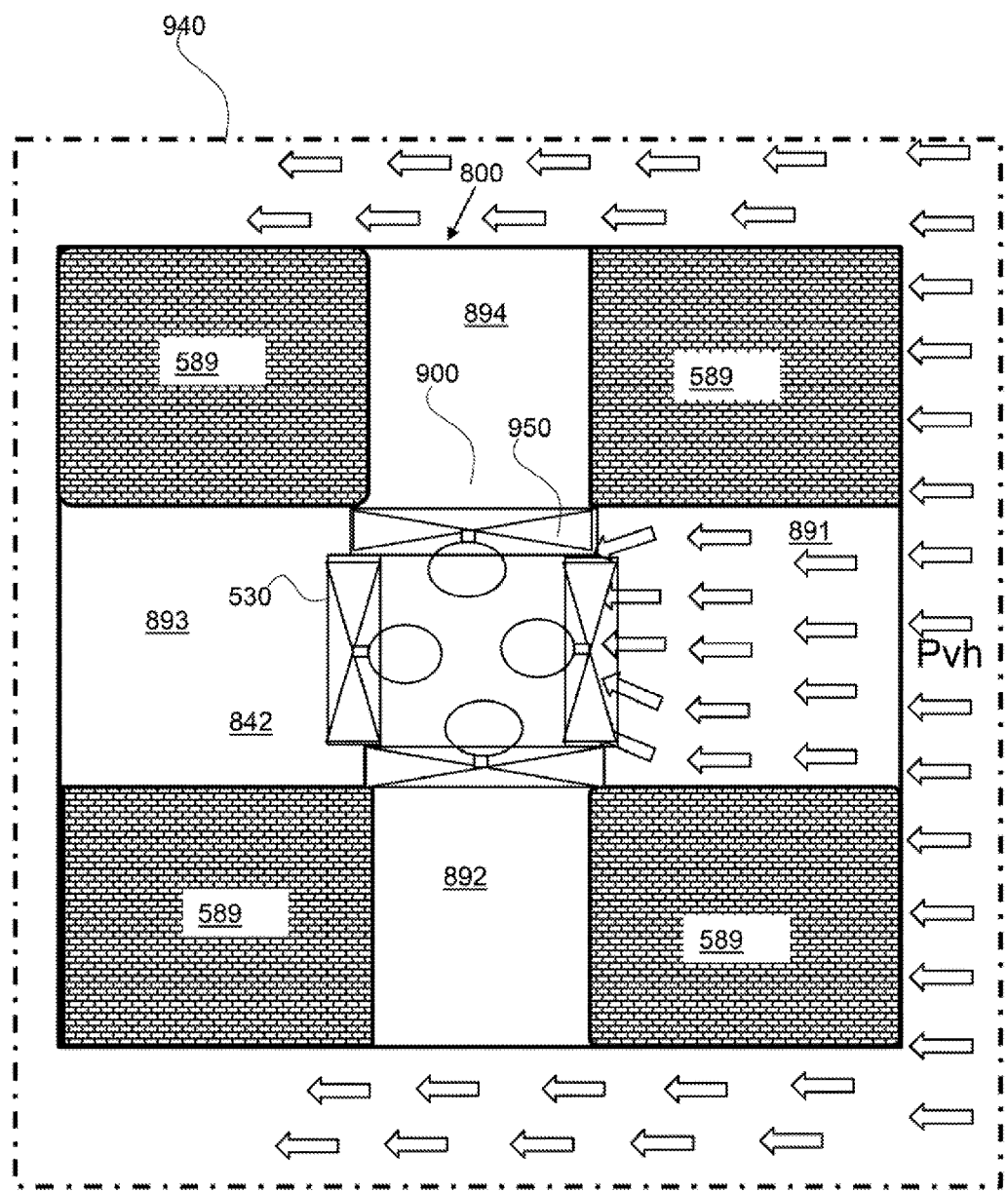
FIG. 75 is a top-down cross-sectional plan view of an exemplary building integrated wind power system having a plurality of propellers configured to receive air flow from between enclosures within a building or a roof structure.

FIGS. 73 to 75 shows an exemplary building integrated wind power system 800 comprising a plurality of horizontal axis orientated, variable pitched propeller air blades 950. In this embodiment, the power generating device 900 is electrically coupled with each of the variable pitch type propeller air blades. As shown in FIG. 74, the floor inflow chamber 842 is separated into four sectors, 891-894. A propeller is configured to receive useful energy from the wind to produce power from each of the sectors when available. The combined and integrated design and operation of the four or more propellers installed in the four or more inflow and outflow chambers will be best controlled by an artificial intelligence type control system which will determine on an instant by instant basis which propellers should be operating and at what load in order to obtain the most effective and efficient operation and performance of the overall wind turbine system at any given time and conditions of wind flow relative to the building. As shown in FIG. 75, there are four room enclosures 589 configured on the corners of the building while the floor inflow chambers 842 are configured between the room enclosures. Both the inlets and outlets are configured on the same floor in this embodiment. In FIGS. 73 to 75, the propellers may change pitch angle or direction or rotational speed automatically as necessary to most effective and efficiently maximize the overall production of power from the four propeller systems when operated together or with one or more propeller systems taken out of service at a zero pitch or at their wide open position as best suits the actual wind conditions present at any given time or condition. With this FIG. 75 configuration, the propellers can be located at any point within the common inflow-outflow chambers as they are straight sided ducts with a common cross sectional area used throughout. However, with the FIG. 74 configuration the propeller location must be restricted to the point of highest or near highest wind velocity as will be experienced at close to the center of the overall arrangement in order to produce efficient power from the wind.

Figure 76:
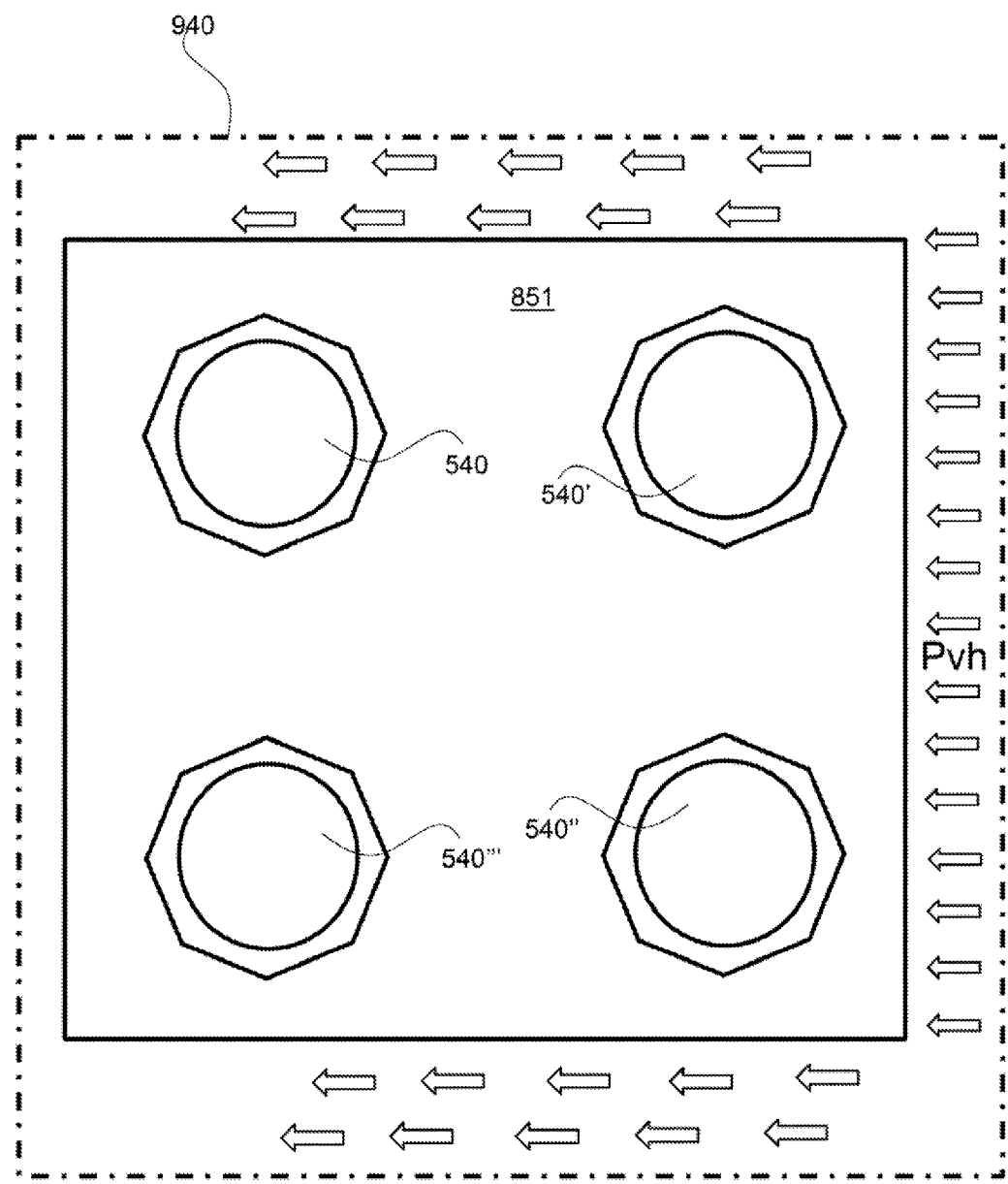
FIG. 76 is a top down plan view of a multiple unit installation showing four building integrated wind energy power enhancer systems using a common first phase wind or first stage air inflow chamber provided with either passively or actively actuated inlet air flow control dampers.

FIG. 76 shows an exemplary building integrated wind power system 800 comprising a plurality of vertical axis orientated single phase wind turbines of either an axial flow propeller or a radial outflow or reverse flow fan type wind turbine design as previously discussed in this application. As shown, the air inflow chamber is designed to be a common air inlet air supply plenum using inlet air dampers and deflectors and/or flexible air curtains or sheets to control the air flow into, as well as the overall pressure maintained within, the inlet air plenum from the upstream prevailing wind. These wind turbines may discharge to an enclosed common outflow chamber located on either an upper or lower floor, or, be extended out through the rooftop of the building and be close coupled to the roof as described with previous examples shown herein.

Figure 77:
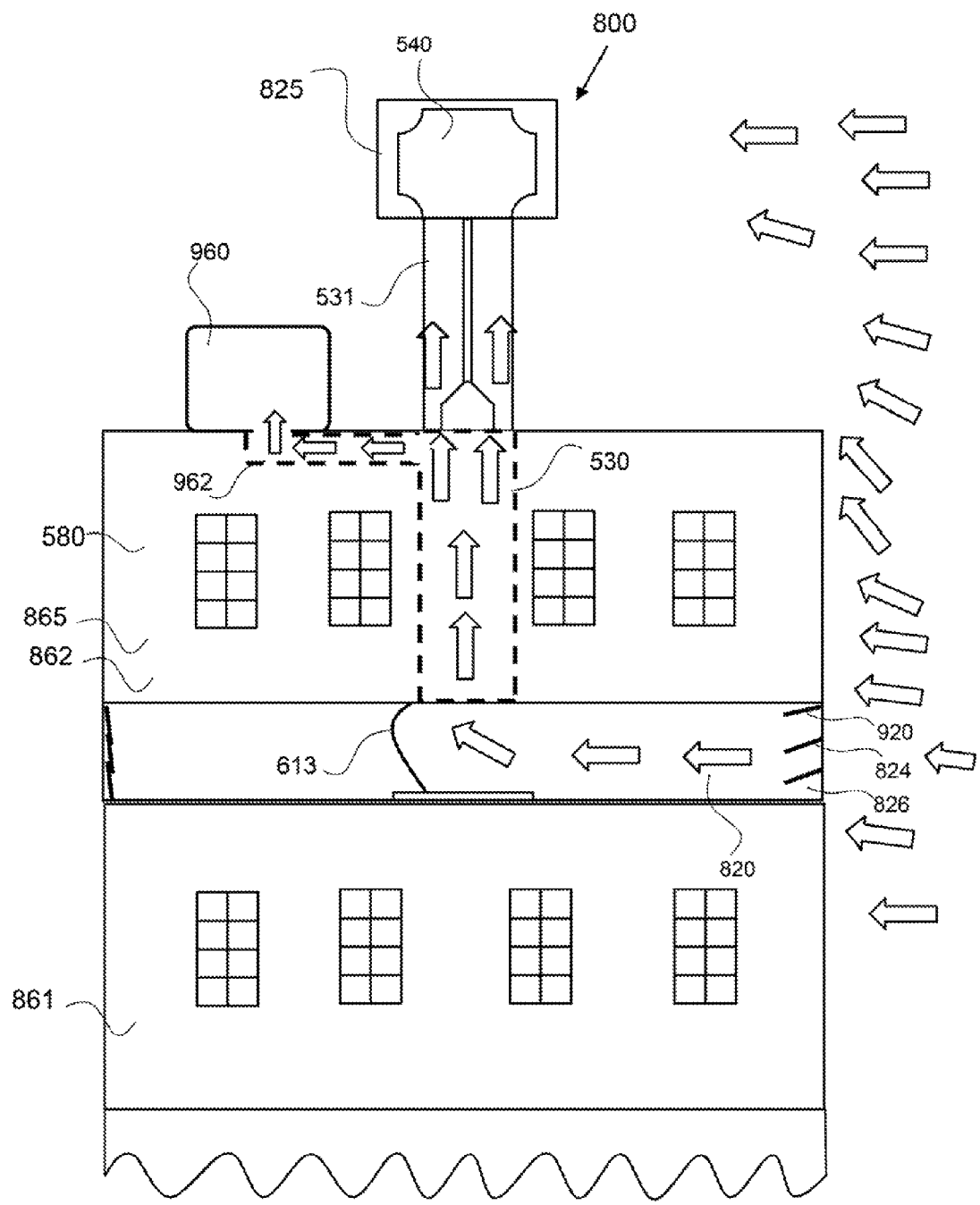
FIG. 77 shows a side view of an exemplary multi-phase building integrated wind power system having a diverting conduit to direct a flow of air from or to the wind or air inflow chamber a flow tube to an HVAC system and which could optionally have a first stage propeller type wind turbine (ghosted in) located within or just upstream of the flow tube and before the diverting conduit.

FIG. 77 shows an exemplary building integrated wind power system having one or more converging compartmented sections coupled with the vertical flow tube 530. The converging compartments receive a flow of air from the upstream wind that can be at least partially diverted from the reverse flow fan or radial outflow type wind turbine 540 to a heating, ventilation and air-conditioning, HVAC, system by means of a diverting air flow control damper, not shown, and diverting conduit 962 to a pressurized fresh air supply plenum or duct 960. This diverted flow of pressurized air may then be distributed throughout the building by means of this pressurized fresh air supply provided to the inlets to the existing HVAC blowers and fans to help reduce the overall power demand for the building.

Figure 78:
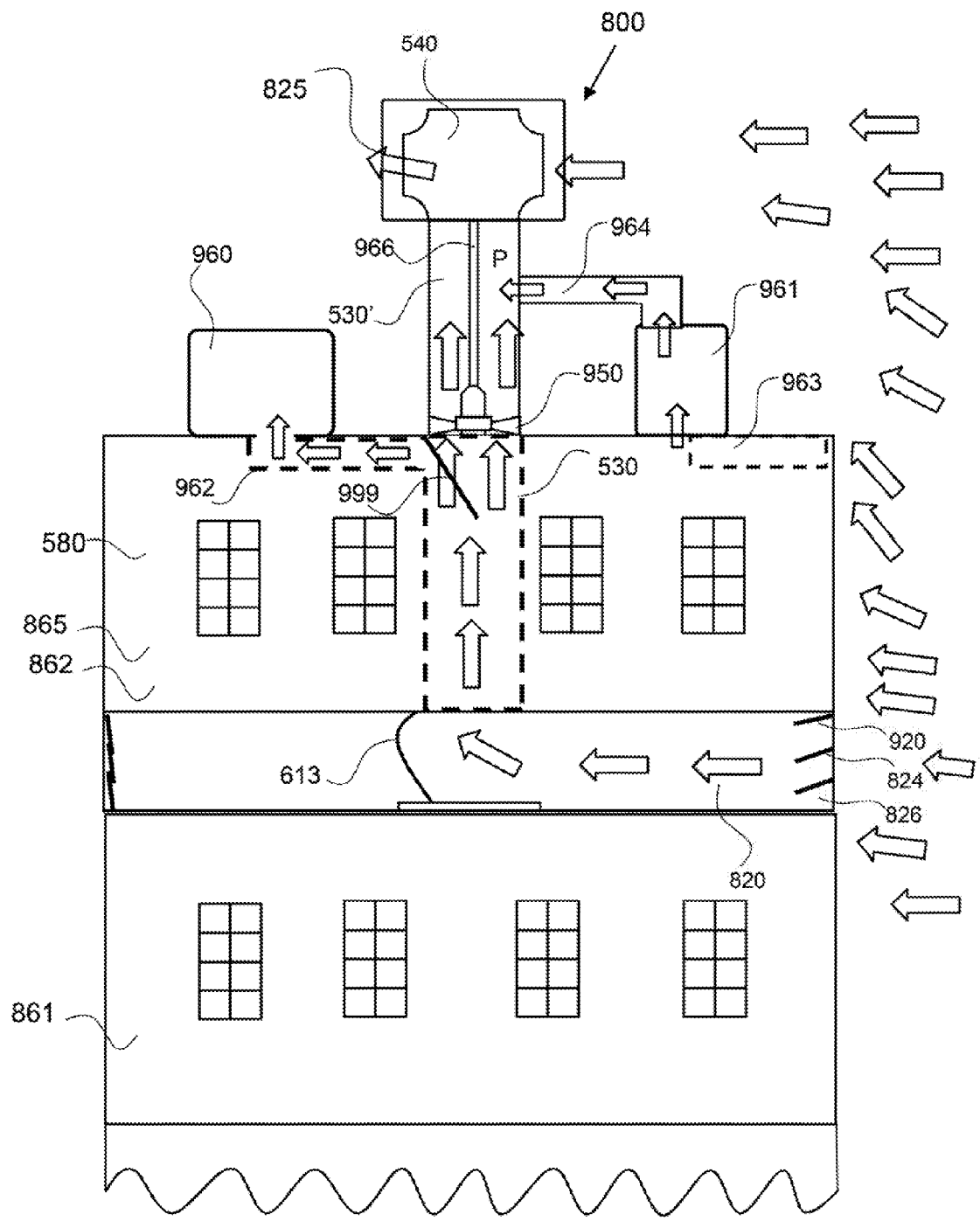
FIG. 78 new shows a side view of an exemplary building integrated wind power system and showing the boundaries of a kinetic energy envelope around the building.
Figure 79:
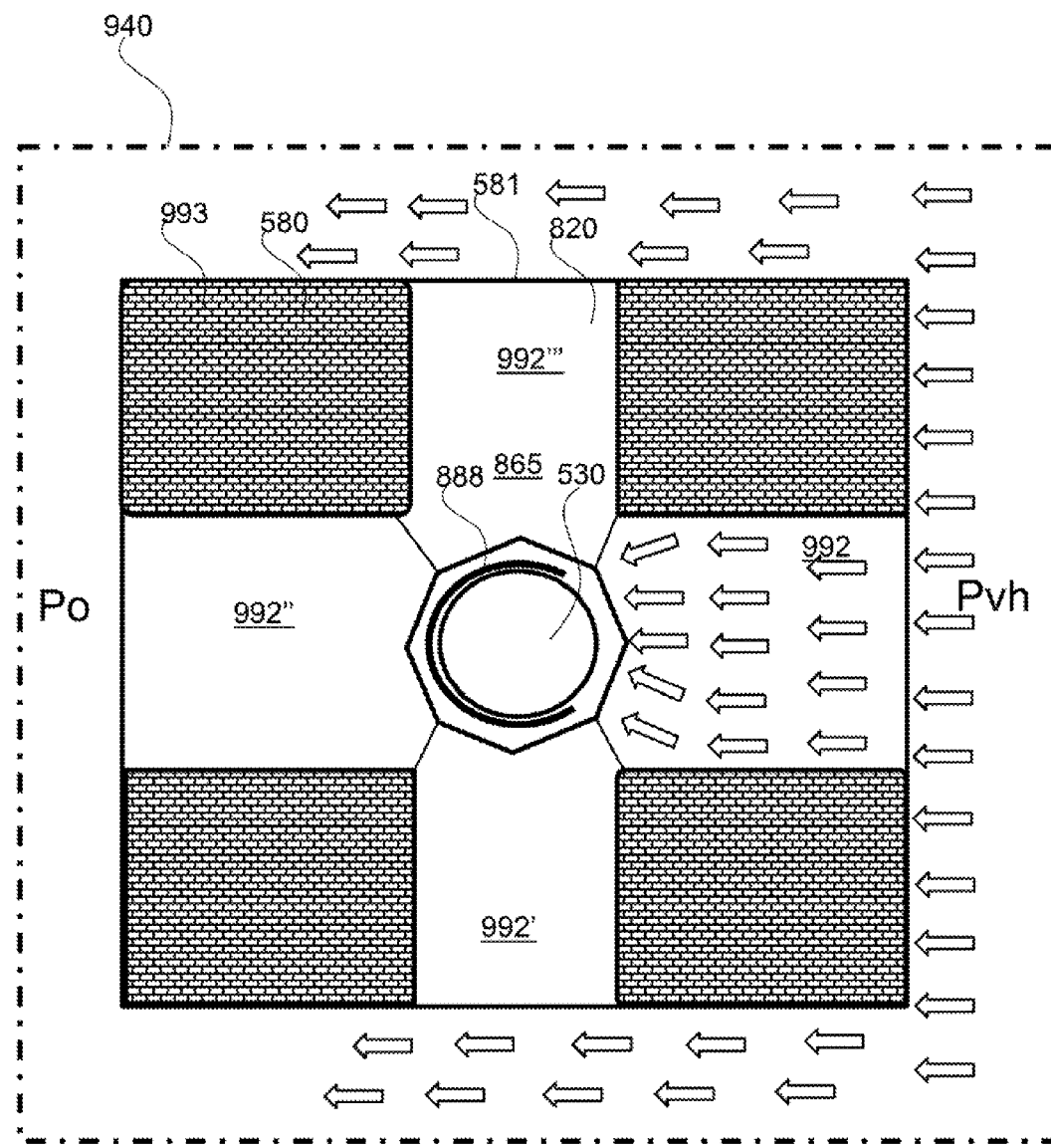
FIG. 79 top down view of an exemplary building integrated wind power enhancer system and a kinetic energy envelope there around the building.

FIG. 78 shows an exemplary building integrated wind power system similar to that in FIG. 77, having an additional first stage variable pitch blade propeller 950 configured within the vertical flow tube 530 downstream of the diverting conduit 962 and diverting air flow control damper, not shown, and upstream of a second converging conduit 964 containing waste vitiated air and building waste heat. A flow of this waste air and heat, coming from the building, such as from a building air duct 963 and waste air exhaust plenum 961 provides a flow of waste air and heat into the flow tube 530' for potentially increased electrical power production from the second stage reverse flow fan type wind turbine 540. The waste air may be moisture and CO2 laden re-circulated HVAC air that may additionally be mixed, vitiated and heated directly with warm flue gases from clean fuel combustion sources from within the building or may be otherwise contaminated or simply not fresh. Additional waste heat from the HVAC system can also be transferred to the waste air by means of indirect heat exchangers located at the HVAC systems and subsequently conveyed with the waste air to the waste air exhaust plenum. The air coming into the building integrated inflow chamber 820 is fresh and from the prevailing upstream wind. This air may be at least partially diverted to the HVAC system for delivery to the building. The pressure P within this portion of the flow tube 530' may be controlled by the variable pitch of the propeller 950 blades and/or by the rate of rotation of the propeller blades when coupled to a second generator electrically, not shown. In some embodiments the second stage radial outflow type wind turbine 540 and the first stage propeller 950 are coupled to the same shaft 966 and electric generator, not shown, and they therefore rotate at the same rate. In this case, the pitch of the propeller blades would have to be changed to adjust the pressure P, within the flow tube.

While various embodiments of the present invention have been described, the invention may be easily modified and adapted to suit various wind turbines or highly customized buildings of either an existing or new design or as may be developed by those most skilled in the art. Therefore, this invention is not limited to the description and figures as shown herein, and includes all such embodiments, changes, and modifications that are encompassed by the scope of the claims. Various features shown throughout the figures may be combined where appropriate in a customized building wind power generating system. Modularization of the Building Integrated Wind Energy Power Enhancer System design to the maximum extent possible is a primary objective of any and all overall system product improvement efforts. However, due to the significant variations in building designs and configurations currently existing or anticipated by future architectural firms in the interest of their continued and future artistic freedom, only modularization of the core structural components for the generic wind power system as envisioned by this application may be practicable. Some auxiliary component systems and equipment, such as with certain control damper and deflector systems modules, may also be capable of some modularization of design as various applications are attempted, improved and standardized on actual installed and operated systems of this type in the years to come, and as an empirical data base is developed. Also, as more is learned as to the relative value of various performance and cost effects of certain manually and automatically controlled components as is initially suggested by this application at this time, some if not all of these adjustable and positional equipment or component features may be able to be eliminated to result in a more cost effective design for commercial marketing purposes and/or in competition with other renewable energy alternatives that may also be on a steep initial learning curve.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

It will be apparent to those skilled in the art that various modifications, combination and variations can be made in the present invention without departing from the spirit or scope of the invention. Specific embodiment, features and elements described herein may be modified, and/or combined in any suitable manner. Thus, it is intended that the present invention cover the modifications, combinations and variations of this invention provided they come within the scope of the appended claims and their equivalents.

What is claimed is:

1. An omnidirectional building integrated wind energy power enhancer system comprising:
 a) a concealed power generating turbine comprising air blades that rotate about an axis,
   wherein the power generating turbine is configured above the roof structure of the building and is coupled to the first building integrated inflow chamber by the first flow tube;
 b) a first building integrated inflow chamber comprising:
   a plurality of openings configured about a perimeter of a building to receive a first chamber airflow from the prevailing wind omnidirectionally;
   wherein at least a portion of the first chamber airflow is directed into said power generating turbine as a first phase airflow;
 c) a first separation panel extending between the first inflow chamber and the power generating turbine;
 d) a first flow tube coupled with the first building integrated inflow chamber and configured to direct said first phase airflow from the first building integrated inflow chamber into the wind power generating turbine;
   wherein the power generating turbine is configured to utilize both the first phase air flow from the first building integrated inflow chamber and a second phase air flow from the prevailing wind that impacts the air blades directly to create power; and wherein the omnidirectional building integrated wind energy power enhancer system is a multi-phased wind power generating system; and wherein the omnidirectional wind energy power enhancer system is configured to utilize air flow from said first building integrated inflow chamber to create power and whereby said omnidirectional building integrated wind energy power enhancer system creates useful power from the prevailing wind.

2. The omnidirectional building integrated wind energy power enhancer system of claim 1 wherein the concealed power generating turbine is selected from the group consisting of: a propeller or an axial flow type wind turbine, a cross flow or helical type wind turbine, or a reverse flow fan or radial outflow type wind turbine.

3. The omnidirectional building integrated wind energy power enhancer system of claim 1, comprising flexible curtains or sheets that extend over the plurality of openings in the first building integrated inflow chamber and that allow airflow into said first building integrated inflow chamber but prevent airflow from exiting said first building integrated inflow chamber through said plurality of openings.

4. The omnidirectional building integrated wind energy power enhancer system of claim 1, wherein said first building integrated inflow chamber is configured between a first and a second floor of the building and extends across a floor between said first and second floors or wherein said first building integrated inflow chamber extends in a space between said first and second floors when the first and second floors are adjacent floors;

the plurality of openings are configured about a perimeter of the building and between said first and second floors.

5. The omnidirectional building integrated wind energy power enhancer system of claim 1, further comprising an enclosure around the power generating turbine which is an outlet chamber.

6. The omnidirectional building integrated wind energy power enhancer system of claim 1, comprising a plurality of sector deflectors configured within the first building integrated inflow chamber that extend from the perimeter of the building to a central area of said first building integrated inflow chamber and that divide said first building integrated inflow chamber into at least three sectors;

wherein the sector deflectors direct and segment airflow entering through said plurality of openings to the central area.

7. The omnidirectional building integrated wind energy power enhancer system of claim 6, wherein the first flow tube is configured within the central area and is configured to direct first phase airflow to the power generating turbine.

8. The omnidirectional building integrated wind energy power enhancer system of claim 1, comprising a plurality of air deflectors configured on an exterior of the building and configured to direct a first phase air flow into the first building integrated inflow chamber.

9. The omnidirectional building integrated wind energy power enhancer system of claim 1, further comprising a plurality of directional deflectors configured around a perimeter of the wind power generating turbine and configured to direct airflow in the same direction of rotation as the air blades.

10. An omnidirectional building integrated wind energy power enhancer system comprising:
a) a concealed power generating turbine comprising air blades that rotate about an axis, b) a first building integrated inflow chamber comprising:
a plurality of openings configured about a perimeter the building to receive a first chamber airflow from the prevailing wind omnidirectionally;
wherein at least a portion of the first chamber airflow is directed into said power generating turbine as a first phase airflow;
c) a first separation panel extending between the first inflow chamber and the power generating turbine;
d) a first flow tube coupled with the first building integrated inflow chamber and configured to direct said first phase airflow from the first building integrated inflow chamber into the wind power generating turbine
wherein the omnidirectional wind energy power enhancer system is configured to utilize air flow from said first building integrated inflow chamber to create power and whereby said omnidirectional building integrated wind energy power enhancer system creates useful power from the prevailing wind;
e) a dynamic air scoop configured to rotate to block a first inflow chamber air flow from passing through the building and to direct said first inflow chamber air flow to the turbine.

11. An omnidirectional building integrated wind energy power enhancer system comprising:
a) a concealed power generating turbine comprising air blades that rotate about an axis,
b) a first building integrated inflow chamber comprising:
a plurality of openings configured about a perimeter the building to receive a first chamber airflow from the prevailing wind omnidirectionally;
wherein at least a portion of the first chamber airflow is directed into said power generating turbine as a first phase airflow;
c) a first separation panel extending between the first inflow chamber and the power generating turbine;
d) a first flow tube coupled with the first building integrated inflow chamber and configured to direct said first phase airflow from the first building integrated inflow chamber into the wind power generating turbine;
wherein said first building integrated inflow chamber is configured between a first and a second floor of the building and extends across a floor between said first and second floors or wherein said first building integrated inflow chamber extends in a space between said first and second floors when the first and second floors are adjacent floors;
the plurality of openings are configured about a perimeter of the building and between the first and second floors; and
wherein the omnidirectional wind energy power enhancer system is configured to utilize air flow from said first building integrated inflow chamber to create power and whereby said omnidirectional building integrated wind energy power enhancer system creates useful power from the prevailing wind.

12. The omnidirectional building integrated wind energy power enhancer system of claim 11, wherein the concealed power generating turbine is vertically offset from and connected to the first building integrated inflow chamber by said flow tube that directs first phase airflow into said power generating turbine.

13. The omnidirectional building integrated wind energy power enhancer system of claim 12, comprising a second building integrated inflow chamber comprising:

a plurality of openings configured about a perimeter the building to receive a second chamber airflow from the prevailing wind omnidirectionally;

wherein at least a portion of the second chamber airflow impacts the air blades directly as a second phase airflow;

wherein the omnidirectional building integrated wind energy power enhancer system is a multi-phased wind power generating system.

14. The omnidirectional building integrated wind energy power enhancer system of claim 11, further comprising:

a) second building integrated inflow chamber comprising:
a plurality of openings configured about a perimeter the building to receive a second chamber airflow from the prevailing wind;
wherein at least a portion of the second chamber airflow is directed into the power generating turbine as first phase airflow;

b) a third building integrated inflow chamber comprising:
a plurality of openings configured about a perimeter of the building to receive a third chamber airflow from the prevailing wind;
wherein the third chamber airflow impacts the air blades directly as a second phase airflow;
wherein said third building integrated inflow chamber is configured between said first and the said second building integrated inflow chambers;
wherein the first and second chamber airflows enter into the power generating turbine as first phase airflow from opposing sides; and
wherein the omnidirectional building integrated wind energy power enhancer system is a dual multi-phased wind power generating system
wherein the omnidirectional wind energy power enhancer system is configured to utilize air flow from said first building integrated inflow chamber to create power and whereby said omnidirectional building integrated wind energy power enhancer system creates useful power from the prevailing wind.

15. The omnidirectional building integrated wind energy power enhancer system of claim 11, wherein said omnidirectional building integrated wind energy power enhancer is a cross-flow type omnidirectional building integrated wind energy power enhancer wherein said first integrated inflow chamber extends across a single level of the building.

16. The omnidirectional building integrated wind energy power enhancer system of claim 15, having interchangeable inflow and outflow chambers extending through said single level of the building and wherein the wind power generating turbine is as a helical or single phase cross flow type.

17. An omnidirectional building integrated wind energy power enhancer system comprising:

a) a concealed power generating turbine comprising air blades that rotate about an axis,
b) a first building integrated inflow chamber comprising:
a plurality of openings configured about a perimeter the building to receive a first chamber airflow from the prevailing wind omnidirectionally;
wherein at least a portion of the first chamber airflow is directed into said power generating turbine as a first phase airflow;
c) a first separation panel extending between the first inflow chamber and the power generating turbine;
d) a first flow tube coupled with the first building integrated inflow chamber and configured to direct said first phase airflow from the first building integrated inflow chamber into the wind power generating turbine;

an axial flow propeller type wind turbine configured in said first flow tube that receives a first phase airflow from the first building integrated inflow chamber;
a conduit that is coupled with said flow tube downstream of said first stage axial flow propeller type wind turbine,
wherein said conduit delivers a portion of a building's waste air and heat from a heating/ventilation/air-conditioning system back into said flow tube between said first stage axial flow propeller and a reverse flow fan type wind turbine; and
wherein the omnidirectional wind energy power enhancer system is configured to utilize air flow from said first building integrated inflow chamber to create power and whereby said omnidirectional building intergrated wind energy power enhancer system creates useful power from the prevailing wind.

18. An omnidirectional building integrated wind energy power enhancer comprising:

a) a concealed power generating turbine comprising blades that rotate about an axis,
b) a first building integrated inflow chamber comprising:
a plurality of openings configured about a perimeter the building to receive a first chamber airflow from the prevailing wind omnidirectionally;
wherein the inflow chamber comprises:
air deflectors configured to deflect a portion of the first chamber airflow into the power generating turbine as a first phase air flow, and a portion of the first chamber airflow into the air blades directly as a second phase air flow;
wherein at least a portion of the first chamber airflow is directed into said power generating turbine as a first phase airflow;
c) a first separation panel extending between the first inflow chamber and the power generating turbine;
d) a first flow tube coupled with the first building integrated inflow chamber and configured to direct said first phase airflow from the first building integrated inflow chamber into the wind power generating turbine;
wherein said omnidirectional building integrated wind energy power enhancer is a cross-flow type omnidirectional building integrated wind energy power enhancer system having a single building integrated inflow chamber that is the first building integrated inflow chamber that extends across a single level of the building;
wherein said plurality of openings are configured about a perimeter of said single level of the building to receive a first chamber airflow from the prevailing wind omnidirectionally; and
wherein the power generating turbine is configured within said first chamber building integrated inflow chamber;
wherein said first chamber airflow enters the single building integrated inflow chamber from a first side of the building and exits from a second side and opposing side of the building;
wherein the omnidirectional building integrated wind energy power enhancer system is a multi-phased wind power generating system; and
wherein the omnidirectional wind energy power enhancer system is configured to utilize air flow from said first building integrated inflow chamber to create power and whereby said omnidirectional building integrated wind energy power enhancer system creates useful power from the prevailing wind.

19. The omnidirectional building integrated wind energy power enhancer system of claim 18, further comprising a plurality of sector deflectors configured within the single building integrated inflow chamber that extend from the perimeter of the building to a central area of said inflow chamber and that divide said inflow chamber into at least three sectors;
- wherein the sector deflectors direct and segment airflow entering through said plurality of openings to the central area;
- wherein the power generating turbine is configured within said central area.

20. The omnidirectional building integrated wind power generating wind energy power enhancer system of claim 19, wherein the power generating turbine receives first phase airflow into two separate inlets; and
- wherein the omnidirectional building integrated wind power generating wind energy power enhancer system is a dual multi phased wind energy power enhancer system.

* * * * *